US008606903B2

(12) United States Patent
Al-Wakeel et al.

(10) Patent No.: US 8,606,903 B2
(45) Date of Patent: Dec. 10, 2013

(54) COOPERATIVE PACKET ROUTING FOR WIRELESS SENSOR NETWORKS

(75) Inventors: Sami Saleh Ahmed Al-Wakeel, Riyadh (SA); Najla Abdul-Rahman Ibrahim Al-Nabhan, Riyadh (SA)

(73) Assignee: King Saud University, Riyadh (SA)

( * ) Notice: Subject to any disclaimer, the term of this patent is extended or adjusted under 35 U.S.C. 154(b) by 878 days.

(21) Appl. No.: 12/328,662

(22) Filed: Dec. 4, 2008

(65) Prior Publication Data

US 2010/0142422 A1    Jun. 10, 2010

(51) Int. Cl.
G06F 15/173 (2006.01)
G06F 15/16 (2006.01)

(52) U.S. Cl.
USPC ............ 709/224; 709/245; 709/241; 709/242

(58) Field of Classification Search
USPC .................................. 709/224, 241, 242, 245
See application file for complete search history.

(56) References Cited

U.S. PATENT DOCUMENTS

| | | | | |
|---|---|---|---|---|
| 4,757,747 A | * | 7/1988 | Blatter et al. | 91/362 |
| 7,295,115 B2 | * | 11/2007 | Aljadeff et al. | 340/572.1 |
| 7,426,190 B2 | * | 9/2008 | Manjeshwar et al. | 370/254 |
| 7,515,042 B2 | * | 4/2009 | Benco et al. | 340/539.11 |
| 7,636,038 B1 | * | 12/2009 | Nof et al. | 340/506 |
| 2002/0027495 A1 | * | 3/2002 | Darby et al. | 340/298 |
| 2005/0137827 A1 | * | 6/2005 | Takamiya | 702/150 |
| 2005/0193226 A1 | * | 9/2005 | Ahmed et al. | 714/4 |
| 2006/0013154 A1 | * | 1/2006 | Choi et al. | 370/312 |
| 2007/0076650 A1 | * | 4/2007 | Manjeshwar et al. | 370/328 |
| 2010/0118698 A1 | * | 5/2010 | Yokobori et al. | 370/230 |

FOREIGN PATENT DOCUMENTS

WO    WO 2009057884 A1 *   5/2009

OTHER PUBLICATIONS

Akyildiz et al.; "A Survey on Sensor Networks,"; IEEE Communications Magazine; vol. 40, No. 8; pp. 102-116; Aug. 2002.
Al-Karaki et al.; "Routing Techniques in Wireless Sensor Networks: A Survey"; IEEE Wireless Communications; vol. 11, No. 6; pp. 6-28; Dec. 2004.
Chakrabarty et al.; "Scalable Infrastructure for Distributed Sensor Networks"; Springer; London; Dec. 14, 2005.
Chandrakasan et al.; "Design Considerations for Distributed Microsensor Systems"; Proceedings of the IEEE 1999 Custom Integrated Circuits; San Diego, 1999; pp. 279-286.

(Continued)

*Primary Examiner* — Hieu Hoang
(74) *Attorney, Agent, or Firm* — Hart IP Law & Strategies

(57) ABSTRACT

A cooperative packet routing for wireless sensor networks is described. In one aspect, a transient sensor node in a wireless sensor network receives a packet from a source node, wherein the packet is targeted for receipt by a base station. The transient sensor node, responsive to receiving the packet, estimates how much operational energy remains in the sensor node. If the determined amount of energy meets a configurable threshold, the transient sensor node implements a set of cooperative packet routing operations for conditional re-transmission of the packet to the base station. The configurable threshold is set to ensure substantially optimal usage and lifetime of the sensor node in the wireless sensor network. The conditional re-transmission of the packet is based on a set of randomized packet re-transmission criteria.

18 Claims, 48 Drawing Sheets
(43 of 48 Drawing Sheet(s) Filed in Color)

(56) References Cited

OTHER PUBLICATIONS

Doss et al.; "Reliable Event Transfer in Wireless Sensor Networks Deployed for Emergency Response"; from Proceeding of Parallel and Distributed Computing and Systems (Australia); ACTA press, 2005.

Fang et al.; "EDDS: An Efficient Data Delivery Scheme for Address-free Wireless Sensor Networks"; Proceedings of the Sixth International Conference on Networking (ICN '07); IEEE; 2007.

Gandham et al.; "Energy efficient schemes for wireless sensor networks with multiple mobile base stations"; Proceeding for Global Telecommunications Conference, 2003 (GLOBECOM '03); IEEE; vol. 1; pp. 377-381; Dec. 2003.

Heinzelman et al.; "An application-specific protocol architecture for wireless microsensor networks"; IEEE Transactions on Wireless Communications; vol. 1, No. 4; pp. 660-670; Oct. 2002.

Heinzelman et al.; "Energy-Efficient Communication Protocol for Wireless Microsensor Networks"; Proceedings of the 33rd Hawaii International Conference on System Sciences—2000; IEEE; 2000.

Karp et al.; "GPSR: Greedy Perimeter Stateless Routing for Wireless Networks"; Proceedings of the 6th Annual International Conference on Mobile Computing and Networking (MOBICOM '00); ACM Press; New York; 2000.

Kulik et al.; "Adaptive Protocols for Information Dissemination in Wireless Sensor Networks", Washington; pp. 174-185; 1999 ISBN:1-58113-142-9.

Law et al.; "Simulation Modeling and Analysis"; McGraw-Hill Science/Engineering/Math; Third Edition; Dec. 30, 1999.

Liang et al.; "Energy Adaptive Cluster-Head Selection for Wireless Sensor Networks"; Proceedings of the Sixth International Conference on Parallel and Distributed Computing Applications and Technologies (PDCAT'05); IEEE; 2005.

Lukachan et al.; "SELAR: Scalable Energy-Efficient Location Aided Routing Protocol for Wireless Sensor Networks"; Proceedings of the 29th Annual IEEE International Conference on Local Computer Networks (LCN '04); IEEE; pp. 694-695; Nov. 16-18, 2004.

Olariu et al.; "An Energy-Efficient Self-Organization Protocol for Wireless Sensor Networks"; Proceedings of the 2004 Intelligent Sensors, Sensor Networks and Information Processing Conference (ISSNIP 2004); pp. 55-60; IEEE; Dec. 14-17, 2004.

Random.org; "www.random.org <http://www.random.org>"; Dublin, Ireland.

Sattar; "A Survey on Routing Protocols in Sensor Networks"; Communication Networks Laboratory; Nov. 10, 2004.

Stallings; "A Practical Guide to Queuing Analysis"; BYTE; vol. 16, Issue 2; pp. 309-316; Feb. 1991.

Teng; "RBR: A Region-Based Routing Protocol for Mobile Nodes in Hybrid Ad Hoc Networks"; IEEE Communications Magazine; vol. 44, No. 11; pp. 124-132; Nov. 2006.

Tubaishat et al.; "Sensor networks: an overview"; appeared in IEEE Potentials; vol. 22, Issue 2; pp. 20-23; Apr./May 2003.

Whitt; "Analysis for the Design of Simulation Experiments"; Columbia University; New York; Jan. 4, 2005.

Zhao et al.; "Distributed and Energy Efficient Self-Organization for On-Off Wireless Sensor Networks"; IEEE International Symposium on Personal, Indoor and Mobile Radio Communications (PIMRC 2004); IEEE, No. 1; pp. 211-215; Sep. 2004.

\* cited by examiner

Fig73.d

COOPERATIVE PACKET ROUTING FOR WIRELESS SENSOR NETWORKS

BACKGROUND

Advances in the miniaturization of micro-electromechanical systems have led to small form-factor battery-powered sensor nodes that have sensing, communication and processing capabilities. These sensor nodes are often networked in an ad hoc manner to perform distributed sensing and information processing. Wireless sensor networks differ from other ad hoc networks by requiring a deployment phase. In general, deployment is either random or deterministic. In random deployment, sensor nodes are deployed, for example, by air-dropping them or distributing them randomly in a target environment. Using a deterministic scheme, sensors are placed at pre-determined locations.

Protocols for self-configuration of sensor nodes in a randomly-deployed wireless sensor network may not be suited for a deterministically-deployed sensor network. Similarly, node-to-node data dissemination algorithms designed for deterministic wireless sensor networks may not perform well when used in randomly-deployed sensor networks. Once deployed, however, a wireless sensor network needs very little human intervention and can generally function autonomously to provide continuous monitoring and processing capabilities. Each sensor node collects data (e.g., temperature, sound, vibration, pressure, motion, pollutants, etc.) from a monitored area. The sensing area of a sensor node is typically dependent on the type of physical sensors used by the node.

Nodes systematically route sensed data according to pre-configured communication protocols to a remote base station, where parameters characterizing the collected data are utilized for arbitrary purposes. In such scenarios, data transmission is generally node-to-node multi-hop toward the base station. Since sensor nodes are typically powered by batteries, and because route discovery and data transmission are energy-expensive operations, conserving sensor node battery power during route discovery and/or data transmission operations is a significant consideration when assessing the life of the sensor nodes in a wireless sensor network.

SUMMARY

Cooperative packet routing for wireless sensor networks is described. In one aspect, a sensor node in a wireless sensor network receives a packet from a source node or from another transient node, wherein the packet is targeted for receipt by a base station. The sensor node, responsive to receiving the packet, estimates how much operational energy remains in the sensor node. If the determined amount of energy meets a configurable threshold, the sensor node implements a set of cooperative packet routing operations for conditional re-transmission of the packet to the base station. The configurable threshold is set to ensure substantially optimal usage and lifetime of the sensor node in the wireless sensor network. The conditional re-transmission of the packet is based on a set of randomized packet re-transmission criteria.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

In the Figs., the left-most digit of a component reference number identifies the particular Fig. in which the component first appears.

DETAILED DESCRIPTION

Overview

Sensor nodes in wireless sensor networks are prone to failure. This may be due to a variety of reasons. Loss of battery power, for example, may lead to failure of the sensor nodes. Thus, a relevant consideration in a wireless sensor network is the amount of energy and storage required for a sensor node to implement sensing, computation, and communication operations. Due to a sensor node's limited processing, memory, and power resources, standard packet routing methodologies developed for the Internet and mobile ad hoc networks typically cannot be directly applied to sensor networks. Furthermore, radio communication typically costs more in terms of energy, as compared to computation costs in a sensor node. Systems and methods for cooperative energy efficient packet routing (CEER) among sensor nodes in a wireless sensor network address these limitations of conventional wireless sensor networks.

Figure 1:
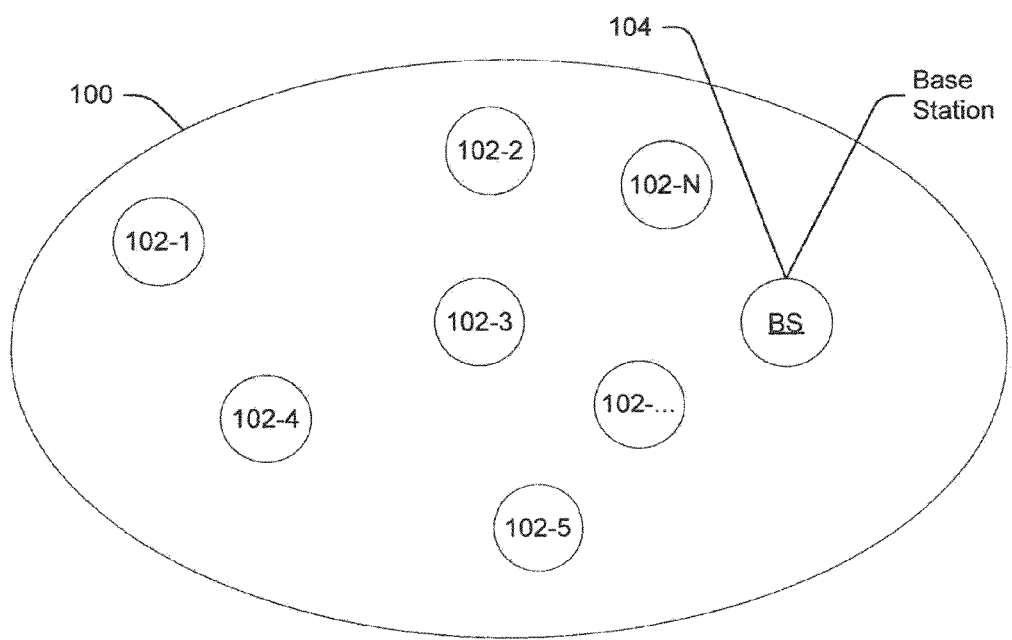
FIG. 1 shows an exemplary wireless sensor network according to one embodiment.
Figure 84:
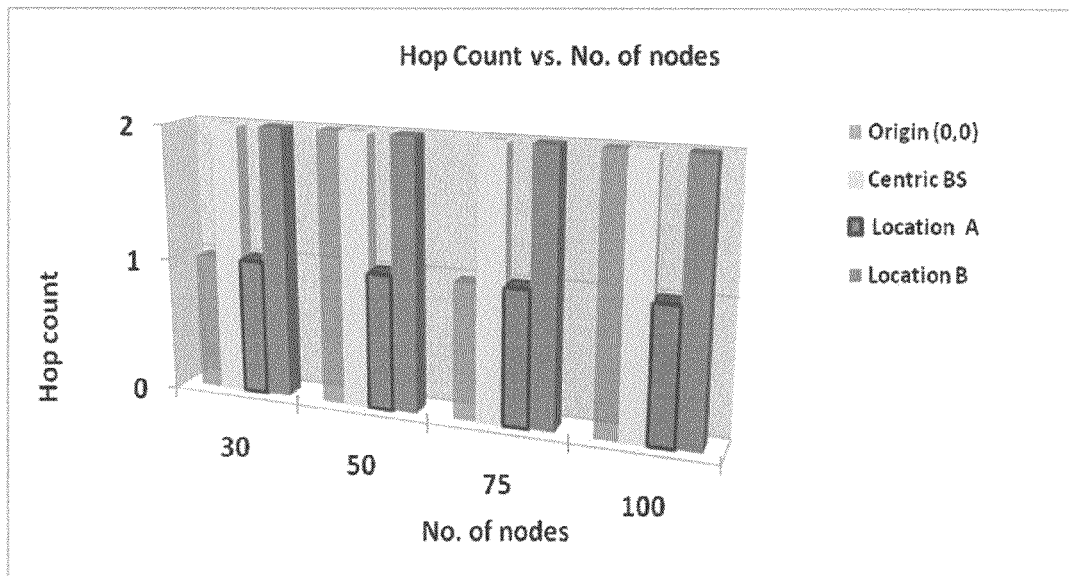
FIG. 84 shows an exemplary graph of hop count vs. number of nodes according to one embodiment.

More particularly, systems and methods for CEER, as described below in reference to FIGS. 1 through 84, provide an energy efficient wireless sensor node communication protocol that:

Eliminates sensor node route discovery and reconfiguration operations (e.g., cluster head selection, routing table updates, etc.);

Utilizes minimal control messages (e.g., only base station acknowledgments);

Substantially reduces or avoids redundant message transmission and duplicated arrival by delaying transmission to a variable amount of time relevant to node address and an arbitrary scalar factor;

Manages congestion and node memory utilization associated with inappropriate message storage and/or packet transmission using duplication factor and base station acknowledgments;

Accounts for randomization at different stages of deployment of the sensor array (e.g., at sensor node deployment, message origin and arrival time, and adjustment to base station location) and provides a robust system that can function efficiently and effectively in a variety of deployment schemes.

Message Origin: Random numbers generating software is used to decide which node will generate the next message. The generated randomness comes from atmospheric noise, which for many purposes is better than the pseudo-random number algorithms typically used in computer programs.

Message Arrival Time: In the traffic model, the arrival process of a new message is characterized by Poisson process, which is a stochastic time process that is used for modeling random events in time that occur to a large extent independent of one another.

Adjustment to Base Station Location: To evaluate the efficiency of CEER, a sample number (e.g., four) of different locations for the base station are used. In this implementation such locations are: at the origin of network map (x=0, y=0), center of network map (x=25, y=25), and two random locations (A and B). At location A, the base station is randomly placed approximately at the middle of a deployment area with a very high nodes density. At location B, the base station is also randomly placed at the middle of a deployment area with low node density.

Node Deployment: Ns-2 is a discrete event simulator targeted at networking research. Ns provides substantial support for simulation of TCP, routing, and multicast protocols over wired and wireless (local and satellite) networks. In this exemplary implementation, network simulator-2 (Ns-2) was used to generate a random network topology.

Using CEER, wireless sensor network sensor nodes cooperate in delivering sensed data to a base station, in part by controlling data packet re-transmission through an address-based timer. Moreover, a sensor node that implements CEER of packets achieves overhead reduction by controlling various parameters that affect energy dissipation.

These and other aspects of the systems and methods for cooperative energy efficient packet routing in wireless sensor networks are now described in greater detail.

An Exemplary System

Although not required, systems and methods for cooperative packet routing for wireless sensor networks are described in the general context of computer program instructions executed by one or more computing devices. Computing devices typically include one or more processors coupled to data storage for computer program modules and data. Such program modules generally include computer program instructions such as routines, programs, objects, components, etc., for execution by a processor to perform particular tasks, utilize data, data structures, and/or implement particular abstract data types. While the systems and methods are described in the foregoing context, acts and operations described hereinafter may also be implemented in hardware.

FIG. 1 shows an exemplary wireless sensor network 100 with sensor nodes 102 (e.g., 102-1 through 102-N, and including a base station ("base station") 202), according to one embodiment. Sensor nodes 102 within wireless sensor network 100 are randomly deployed. The network topology of FIG. 1 is only one example of an exemplary network topology. For example, although this particular example shows base station 202 located on the perimeter of the sensor node topology, in a variable node such as a topology layout, the base station 104 may be centrally located, on a different perimeter, and/or so on.

Figure 2:
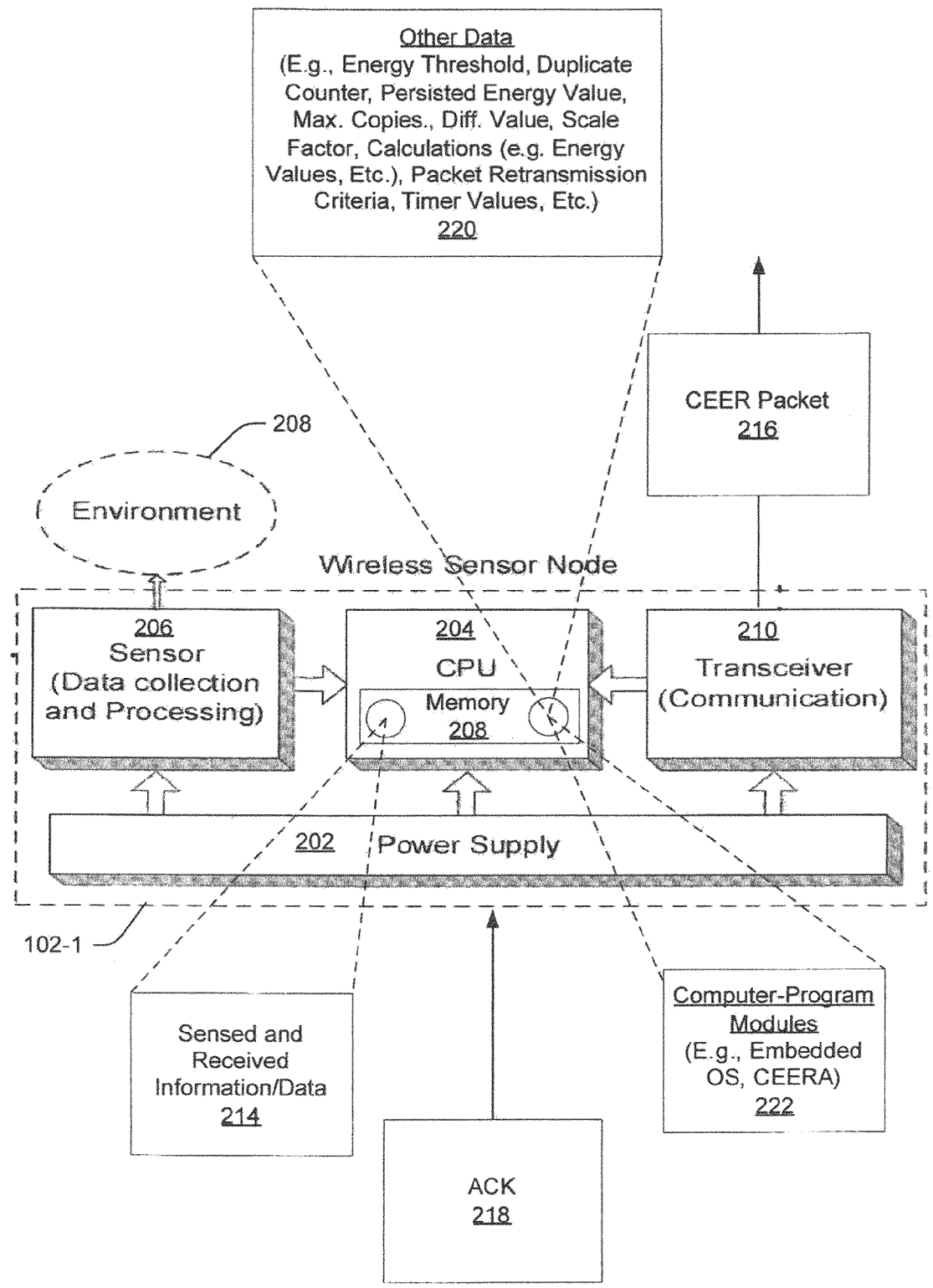
FIG. 2 shows an exemplary wireless sensor node architecture and operating environment according to one embodiment.

FIG. 2 shows an exemplary wireless sensor node according to one embodiment. For purposes of exemplary reference and description, the first numeral of a component reference number in a Fig. is indicative of the particular Fig. where the component was first introduced. For example, referring to FIG. 2, the first numeral of reference number 102-1 is a "1", indicating that sensor node 102-1 was first introduced in the description of FIG. 1. Referring to FIG. 2, in this implementation, a sensor node 102 (a respective sensor node 102-1 through 102-N) is a small form-factor device, characterized by limited battery power and a limited amount of memory. A sensor node 102 relies on wireless channels for receiving and transmitting data respectively from/to other nodes 102. For example, each sensor node 102 (e.g., node 102-1) includes, for example, power supply 202. In one implementation, power supply 202 is supported by power scavenging units such as solar cells. Power supply 202 is operatively coupled to a processor 204 (e.g., a central processing unit (CPU)), which in turn is operatively coupled to sensor 206 for collecting and processing data from environment 208, and transceiver 210 for communication with other sensor nodes 102.

In one implementation, sensor 206 includes respective sub-units of sensors and analog-to-digital converters (ADCs). In this scenario, analog signals produced by sensor 206 based on detected phenomena are converted to digital signals by an ADC and then fed into processing unit 204. The transceiver 210 connects the corresponding sensor node 102 to at least a subset of other nodes 102 and/or base station 104.

Each sensor node 102 includes computer-readable memory ("memory") 212 comprising computer-program instructions implemented as program modules executable by processor 204. The computer program instructions, when executed by the processor, direct the sensor node 102 to collaborate with the other sensor nodes to implement sensing and data communication tasks. For example, responsive to a node 102 sensing a set of information (i.e., sensed data 214 such as temperature, sound, vibration, pressure, motion, pollutants, and/or so on) from environment 208, or responsive to the sensor node receiving such information from another sensor node 102, the computer program instructions direct the sensor node to communicate the sensed information in a CEER packet 216 to base station 104, possibly via other sensor node(s) 102, using CEER.

In the random node distribution environment of wireless sensor network 100, receipt by another sensor node 102 of a transmitted packet 216 (the "message arrival process") is characterized by Poisson process, which is a stochastic process time used for modeling random events in time that occur to a large extent independent of one another. In system 100, base station 104 (base station) sends an acknowledgment for every received packet 216. Transmissions from the base station 104 can be received by all sensor nodes 102. Such acknowledgments include, for example, information for controlling both sensor node message transmission and storage.

Figure 3:
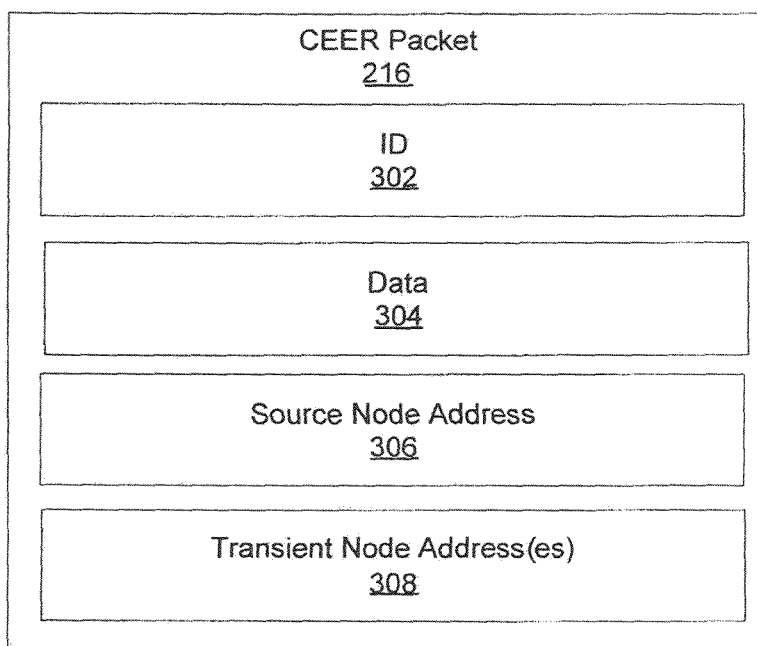
FIG. 3 shows an exemplary packet for communication by a first sensor node and for receipt by one or more other sensor nodes in a wireless sensor network, according to one embodiment.

FIG. 3 shows an exemplary CEER packet 216 for communication by a first sensor node and for receipt by one or more other sensor nodes in a wireless sensor network according to one embodiment. For purposes of exemplary reference and description, the first numeral of a component reference number in FIG. 3 is indicative of the particular Fig. where the component was first introduced. For example, referring to FIG. 3, the first numeral of CEER packet 216 is a "2", indicating that the CEER packet 216 was first introduced in FIG. 2. Referring to FIG. 3, in one implementation, CEER packet 216 includes a substantially unique identification number (ID) 302, a data portion 304, source node address 306, and transient node address(es) 308. ID 302 is represented in X bits. Up to $2^X$ messages can be transmitted simultaneously by a node 102 before the node refreshes its counter (ID 302). The size of message content (data 304) is K bits. Each node 102 also has a source node address 306, denoted by M-bits, as well as an M-bits transient node address 308 for every transient node 102. Also, in the exemplary implementation, an acknowledgment packet (ACK) 218 includes a source node address (M-bits), and message ID (X-bits).

When a source node 102 determines to transmit sensed data, the transmitting node generates a packet 216 with a substantially unique ID 302 and transmits the packet. If a transmitting node 102 is the original source of the data 304, the node is operating in source-route mode. If the node is an intermediate/transient node receiving the signal of the source node and potentially resending the packet, if necessary, the node is operating in cooperative mode. The transmitting node also flags the data message for transmission by other receiving nodes 102 in either source-route mode or cooperative mode. Based on a receiving node's respective energy level, a node may not participate in data transmission. In one implementation, if a receiving node's calculated energy level is less than a predefined energy threshold ($E_{min}$), the receiving node will not retransmit a received data packet 216.

In CEER, data transmission from a source node whose energy level is greater than or equal to $E_{min}$, can be direct to the base station 104, if the transmission range is acceptable. Transmission of a packet 216 is cooperative as each transient sensor node 102 in N receiving the packet will implement the following operations:

Calculate the node's ID difference:=$ID_d$=$ID_t$-$ID_s$, $ID_T$-$ID_S$ represents the absolute value of the ID difference between 1) the address of the node that generates the message and 2) the address of the transient node that receives the message.
Start a timer counter with value $ID_d$*scale factor.
Listen for base station's acknowledgment (ACK), and periodically, according to a predetermined amount of time between decrements, decrement its timer.

If the transient node does not receive the base station acknowledgment before the timer counter has timed out, the transient node retransmits the received packet 216 with its particular transient node network address appended to transient node address field 308. This process is repeated by every transient node until the respective transient node receives an ACK 218 corresponding to the transmitted packet from the base station 104. Upon ACK reception, each receiving node 102 clears the call and resets their ID counters 302.

Please note that in addition to functioning as a transient node 102, sensor nodes 102 also operate respective sensor(s) 206. Thus, a node may originate a packet 216 responsive to sensing data 214, perform intermediate/transient node operations by transmitting a packet 216 received from a different node, and/or be simultaneously functioning as a packet originating node and a transient node.

An Exemplary Procedure

Figure 4:
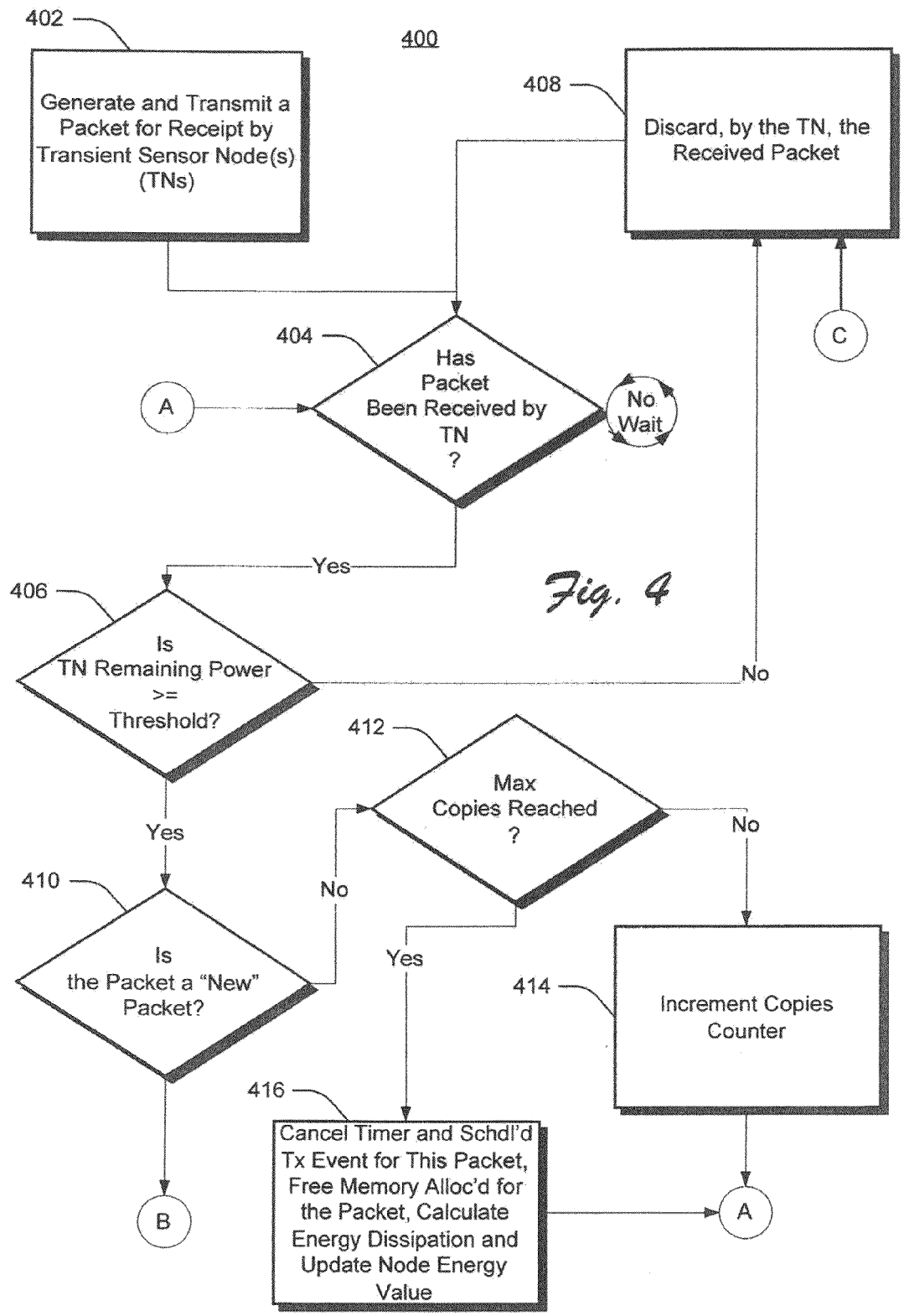
FIG. 4 shows an exemplary procedure for cooperative packet routing for wireless sensor networks according to one embodiment.

FIG. 4 shows an exemplary procedure 400 for wireless sensor node cooperative packet routing according to one implementation. For purposes of exemplary illustration and description, operations of procedure 400 are described with respect to aspects of FIGS. 1 through 3. In the description, the left-most numeral of a component reference number indicates the particular Fig. where the component was first introduced. In this implementation, operations of procedure 400 are implemented in the system 100 by respective sensor nodes 102.

Referring to FIG. 4, operations of block 402 generate and transmit a packet/message for receipt by a base station or one or more transient sensor node(s) (TNs) for subsequent relay to the base station. For example, responsive to a sensor node 102-1 sensing/detecting data 214, the sensor node generates and broadcasts a packet 216 for receipt by base station 104. In this scenario, the original packet transmitting node 102 is the source node. At block 404, if a transient node 102 (i.e., a respective sensor node 102-1 through 102-N that is not the source node) receives the transmitted packet 214, operations of procedure 400 continue at block 406, which are described below. Otherwise, the transient node waits to receive transmitted data and/or to sense a set of information from environment 208.

At block 406, the transient node, having received a transmitted packet 216 from a source node 102, determines whether the remaining power in the transient node is greater than equal to a predefined energy threshold (please see "Other Data" 220 of FIG. 2) amount of power. Specifically, a node will not participate in data re-transmission if its current energy is less than a predefined energy threshold ($E_{min}$). A variety of alternative definitions may be used for $E_{min}$. In one embodiment, $E_{min}$ may be the energy level necessary to perform certain predefined tasks. Such tasks may include making a certain number of outgoing transmissions, detecting sensor input for a predefined period of time, or detecting transmission input for a certain period of time. In certain alternative situations, it may be more important to keep a sensor active and sensing, instead of the node transmitting sensed data from other nodes. Furthermore, data may be lost if a sensor loses all power, so keeping power levels above a minimum level may be a necessity.

In one exemplary implementation, the energy model for ad hoc sensor node network 100 considers the amount of energy and data storage (memory) required for a node 102 to sense data 214 from environment 208 and implement CEER to send the sensed data to a base station 104. Different assumptions about radio characteristics, including energy (E) dissipation in sensor node transmit and receive modes, will change the advantages of different data communication protocols. This implementation of CEER, for example, utilizes a radio model where the radio dissipates $E_{elec}$=50 nJ/bit in the transmitter or receiver circuitry (transceiver 210). Additionally, $\epsilon_{amp}$=100 pJ/bit/m2 for the transmitter amplifier to achieve an acceptable $E_b$/number to transmit a k-bit message a distance d, the radio expends:

$$E_{Tx}(k,d)=E_{elec}*k+\epsilon_{amp}*k*D_{max}, \quad (1)$$

wherein $D_{max}$ is the maximum node transmission ($T_x$) distance. To receive ($R_x$) this message, the radio expends:

$$E_{Rx}(k)=E_{elec}*k, \quad (2).$$

If the amount of remaining power in the transient node is less than the predefined energy threshold, operations continue at block 408, where the transient node discards the received packet. However, if the amount of remaining power in the transient node is greater than or equal to the predefined energy threshold, operations continue at block 410. Since there may be a certain amount of redundancy in the system, it is not necessary to have every node participate in cooperative data transfer for every transmission. Certain nodes may rest during certain data cycles, for example, due to low power.

At block 410, the packet receiving transient node 102 determines whether the packet 216 is a new packet (i.e., the packet has not been received by this particular node before). If the packet 216 is a new packet, operations of procedure 400 continue at block 402 of FIG. 5, as illustrated by on-page reference "B." Otherwise, if the packet 216 is a duplicate packet (i.e., the transient node has received a similar packet in the past), operations of block 412 determine whether the maximum number of copies (i.e., duplicates) of the packet has been reached. The duplicate counter is utilized, for example, as a measurement device to assist in developing performance metrics of the system. In one implementation, the maximum number of copies may be set to the number of bits allocated in memory 208 for recording the occurrence of the transmission of copies. The duplication factor saves space in memory 208 by limiting long message storage, when it is likely that a received packet 216 is stored in other neighbor nodes.

If the maximum number of packet duplicates has not been reached, operations of block 414 increment the copies/duplicate counter (please see "Other Data" 220 of FIG. 2) to indicate that another duplicate packet 216 has been received. After the operations of block 414, operations of procedure 400 continue at block 404, as illustrated by on-page reference "A," where a sensor node 102 waits to receive a packet 216 generated by a source node 102. In this latter scenario, a waiting node could also become a source node, if the sensor node generates and transmits a packet 216 to other sensor nodes 102 responsive to sensing/detecting information from environment 208.

Referring to the operations of block 412, if it was determined that a maximum number of copies had been received by the transient node, operations of the procedure continue at block 416. Operations of block 416 turn off the transient node timer, reset what was started by the transient node responsive to receiving the packet 216 (please see the operations of block 504 of FIG. 5, which is described below). Operations of block 416 additionally free up the memory of a transient node by discarding the received packet (block 404) and any stored duplicate packets. The operations of block 416 may prevent a node 102 from needlessly wasting processing energy to process the received packet when the message is likely stored in neighboring node 102. Continuing from block 410, if the packet is a new packet, the operations continue at block 502 of FIG. 5, as shown by on-page reference "B."

Figure 5:
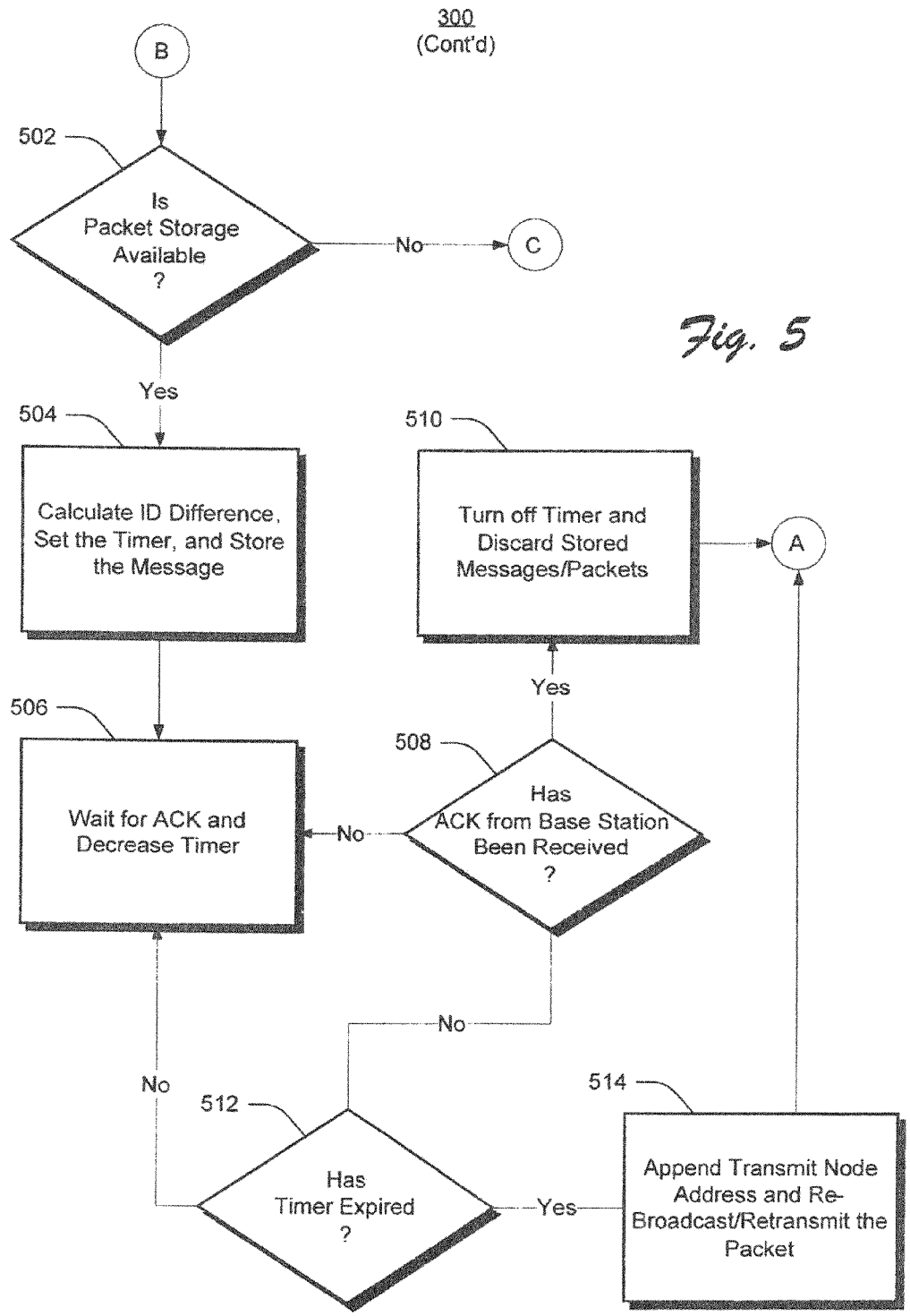
FIG. 5 shows further aspects of the exemplary procedure for cooperative packet routing for wireless sensor networks according to one embodiment.

FIG. 5 shows further exemplary operations of procedure 400 of FIG. 4 for wireless sensor node cooperative packet routing according to one implementation. For purposes of exemplary illustration and description, operations of FIG. 5 are described with respect to aspects of FIGS. 1 through 4. In the description, the left-most numeral of a component reference number indicates the particular Fig. where the component was first introduced. Referring to FIG. 5, operations of block 502 determine whether memory is available for storage (in memory 208 of FIG. 1). If memory for storage of the packet is not available, operations proceed to block 408 of FIG. 4. The operations of block 408 discard the received packet at the transient node since no memory is available to perform the data monitoring operations. The operations of the procedure then continue to monitoring for new packets.

If operations of block 502 determine that memory is available for packet 216 storage, then the procedure continues at block 504. Operations of block 504 perform operations including, for example, calculating the difference in identifiers 302 between the sending node 102 and a transient node 102 to achieve a difference value (please see "Other Data" 220), setting the timer to the difference value times a scale factor (please see "Other Data" 220), and storing the packet. The scale factor value may change the operation of the wireless sensor node cooperative packet routing procedure. The selection of scale factor is dependent on the network operation. It should be set by a network administrator to achieve the required quality of service (QoS) in the application area and the permissible amount of delay to deliver the nodes data.

Operations of block 506 include waiting for an ACK 218 from the base station 104 that the packet 216 has been received. The operation waits for one unit of time and then decreases the timer by that unit of time. In block 508, the system determines whether the ACK has been received. If the ACK has not been received, the flow continues to block 512. The operations of block 512 include determining whether time (calculated from the difference in ID times the scalar factor in block 504) has expired. If time has not expired, operations continue at block 506, and the system again waits for a unit of time to expire while monitoring for the ACK. If the timer has expired (block 512), then the operations proceed to block 514. The operations of block 514 include appending the address of the transient node and re-transmitting the packet. The occurrence of the re-transmission step suggests that the node 102 from which the transient node received the packet is not within transmission range of the base station and/or that other transient nodes 102 receiving the packet are also not within range or have not yet re-transmitted the packet if they are in range of the base station. In any case, the packet has not yet reached the base station, and the transient node in question has waited sufficiently long for the packet to reach the base station—so the packet is retransmitted.

If in block 508 an ACK 218 has been received, then the packet 216 has been delivered to the base station 104 and it is not necessary for a node 102 to retransmit the packet. The process continues at block 510. Since the packet has been received at the base station, the timer can be reset and portions of memory 108 comprising corresponding packets and data can be de-allocated. After packet re-transmission operations of block 514 or the reset timer and memory operations of block 410, the procedure continues at block 404 (FIG. 4) where the node 102 waits for a new packet 216 to be received.

Exemplary System Configuration Considerations

Various settings of the nodes of the system 100 for cooperative packet routing for wireless sensor networks may affect the performance of the system 100 in terms of message transmission time, energy consumption, and node failure time. These settings (or technical specifications) can include the above described scalar factor, $D_{max}$, buffer size (memory size), duplication factor, and the number of nodes used in the system. Furthermore, the system may be affected by environmental factors such as the mean inter-arrival time of packets resulting from the detection of a stimulus with a sensor.

assigned any specific meaning. The efficiency of the system 100 considered four different exemplary locations for base station 104—many other possible locations can be used. These locations are listed below and shown in FIG. 6:

1) Origin O, at (0,0): in this case, the base station is placed such that it is not accessible by a substantial number of the sensor nodes. Also, node density around the base station is very low. The throughput of the system will basically depend on the lifetime of the key nodes that connect the base station with the rest of network.

2) Center, C, at (25, 25): the base station is at a focal point of the deployment area. In this case, the base station is accessible by a larger number of nodes (as compared to the above-described origin location), and the number of nodes around the base station is relatively good.

3) Two random locations:
   A at (22.97, 31.79): the base station is randomly placed approximately in the middle of a deployment area. In this scenario, node density around the base station is highest.
   B at (8.92, 4.57): the base station is placed at a random deployment area. In this example scenario, the node density around the base station is low.

TABLE 1

Density Of Nodes Around Base Station

| Location | | | Number of base station's reachable nodes for a given $D_{max}$ | | | | |
| --- | --- | --- | --- | --- | --- | --- | --- |
| base station | X | Y | $D_{max}=5$ | $D_{max}=10$ | $D_{max}=15$ | $D_{max}=20$ | $D_{max}=25$ |
| O | 0 | 0 | 2 | 7 | 10 | 10 | 15 |
| C | 25 | 25 | 4 | 18 | 32 | 60 | 76 |
| A | 22.97 | 31.8 | 8 | 20 | 35 | 54 | 75 |
| B | 8.92 | 4.57 | 3 | 9 | 12 | 17 | 28 |

The effects of various settings for the nodes 102 have been tested in simulation. In the simulation, inputs were designed to be realistic and suitable for both the specification sensor nodes and network functionality. The simulation was run for inputs of 40,000 simulation messages, and initial energy per node equals 2.26 e+7 nJ/bit. The nodes were given the ability to send and receive 1000 messages. However, this initial energy was very low compared to the expected amount of energy required to transmit 40,000 messages as well as the dissipation of energy resulted by receiving these messages. For this reason, it was expected that most of the nodes would fail, if not all, during the simulation run. The throughput to energy dissipation/initial energy and nodes lifetime was compared. A reasonable buffer size per node to store 20 messages was used. The transmission distance, $D_{max}$, that does ensure network connectivity was 10 m. The inter-arrival time was environment-dependent. It indicated traffic load carried by nodes in network. A mean inter-arrival time of 0.5 s was assumed. Duplicate factor was factor- and environment-dependent. In testing, it was basically equal to 5. A variety of scalar factor values were examined. In most runs, the value was equal to 0.5.

Figure 6:
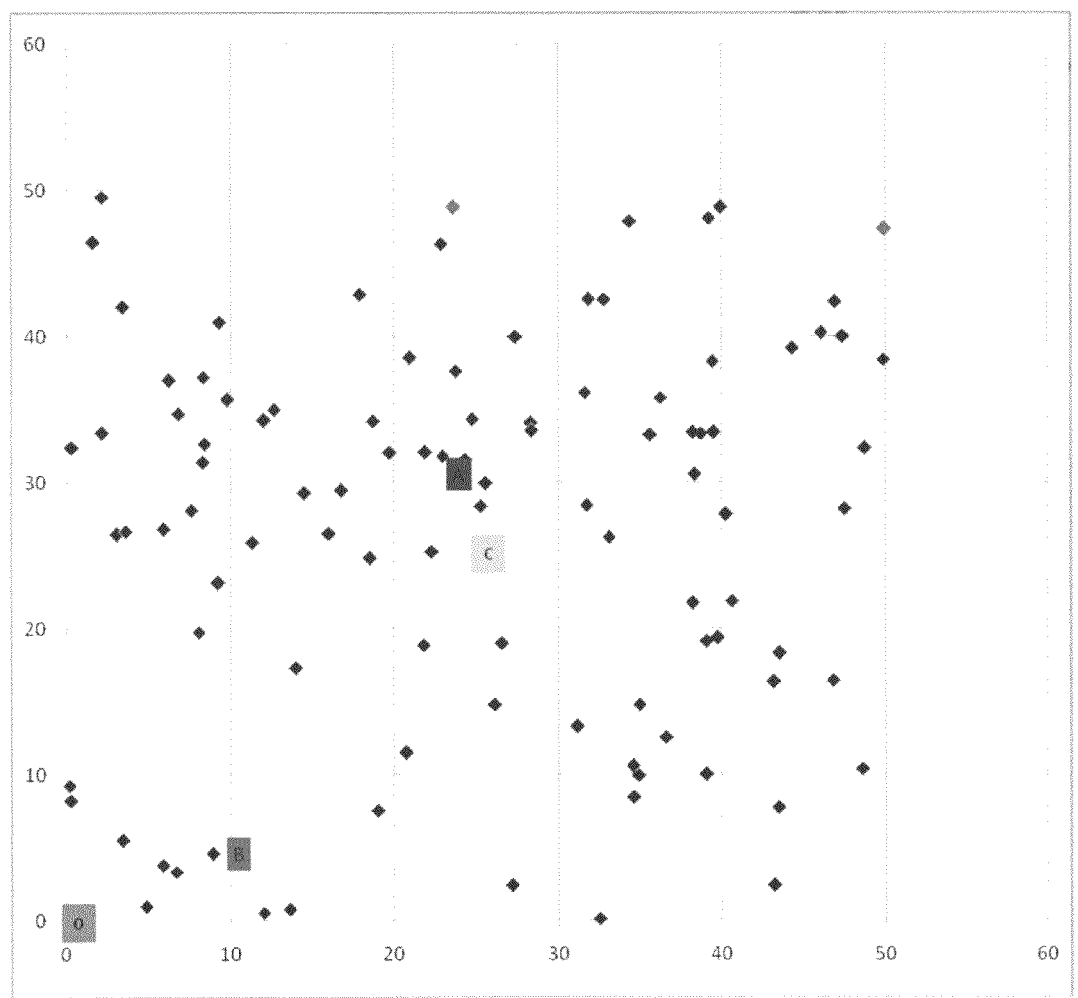
FIG. 6 shows multiple exemplary locations for base stations according to one embodiment.

FIG. 6 shows an exemplary set of wireless sensor nodes (nodes 1 through 99) and multiple exemplary locations (O—Origin, A, B, and C) for base stations according to one embodiment. This example illustrates four different locations for base station 104 (FIG. 1). In this figure, shapes are not FIG. 5 shows a graph of exemplary throughput vs. scalar factor for various locations in an exemplary sensor network according to an embodiment. The value of the scalar factor has a direct influence on end-to-end-packet communication delay since it is used in the described systems and methods to control a timer value (waiting period). The scalar factor has a positive effect on energy dissipation. It delays the transmission of the received message for a certain amount of time; within that time a message might be received and acknowledged by the base station which saves energy and minimizes the overhead caused by this re-transmission. It also saves energy that would be dissipated if the message is transmitted and received by neighbor nodes. On the other hand, it may have a limiting effect on memory occupation, as a message may be stored for a long time upon ACK receiving or if the timer is turned off.

Given the simulation's input of 40,000 simulation messages, a buffer size to accommodate 20 average estimated size packets, a mean inter-arrival time=0.5, an initial energy per node=101e+7, a duplicate factor=5, and $D_{max}=10$ m, extracted results of scalar values which were: 0, 0.1, 0.5, 1, 2, 5, and 10. Results are shown in the next four tables, FIGS. 7 to 19, and the following Table showing exemplary performance results of varying the maximum signal receiving distance between nodes ("$D_{max}$") for network C and network A according to one embodiment.

| Base station Location | | | | | | | | | |
|---|---|---|---|---|---|---|---|---|---|
| Random Location A | | | | | Centric (25, 25) | | | | |
| Dmax Value | | | | | | | | | |
| 5 | 10 | 15 | 20 | 25 | 5 | 10 | 15 | 20 | 25 |
| Throughput | | | | | | | | | |
| 5786 | 16828 | 30010 | 39693 | 35000 | 2715 | 15147 | 26806 | 40000 | 40000 |
| Delay | | | | | | | | | |
| 27.48 | 12.60 | 4.31 | 1.79 | 0.39 | 51.8135 | 14.0662 | 4.73355 | 0.986106 | 0.36365 |
| Delay Time Jitter | | | | | | | | | |
| 38.18 | 19.30 | 8.97 | 4.12 | 0.77 | 41.9125 | 19.1394 | 7.90716 | 2.08838 | 0.796836 |
| Total energy dissipated/ initial Energy | | | | | | | | | |
| 55% | 100% | 100% | 89% | 55% | 53% | 100% | 100% | 78% | 61% |
| No. of Died Nodes | | | | | | | | | |
| 47 | 99 | 99 | 63 | 6 | 50 | 99 | 99 | 27 | 5 |
| FND | 1988.61 | 2094.26 | 4014.72 | 7923.31 | 11934.50 | 2012.49 | 2094.39 | 4845.97 | 11084.6 | 14720.4 |
| BND | 2586.68 | 3565.95 | 7109.00 | 14080.60 | 0.00 | 2518.6 | 4098.71 | 8391.61 | 16375.1 | 0 |
| HND | 4794.16 | 5642.78 | 10375.70 | 17877.70 | 0.00 | 3628.22 | 5732.47 | 11328.8 | 0 | 0 |
| LND | 0 | 10722.4 | 15830.9 | 0 | 0 | 17800.7 | 10208.6 | 13872.7 | 0 | 0 |
| Congestion | 1337 | 6699 | 1970 | 110 | 0 | 1453 | 9468 | 1068 | 169 | 0 |
| Duplicated Arrival | 0 | 0 | 577 | 1580 | 1810 | 0 | 24 | 1217 | 1817 | 1860 |
| hop count/ message | 3 | 2 | 1 | 1 | 1 | 5 | 2 | 2 | 1 | 1 |
| Occupied Memory (Sum) | 51307 | 212247 | 432700 | 500191 | 335598 | 53544 | 235809 | 492488 | 461485 | 350521 |

Figure 7:
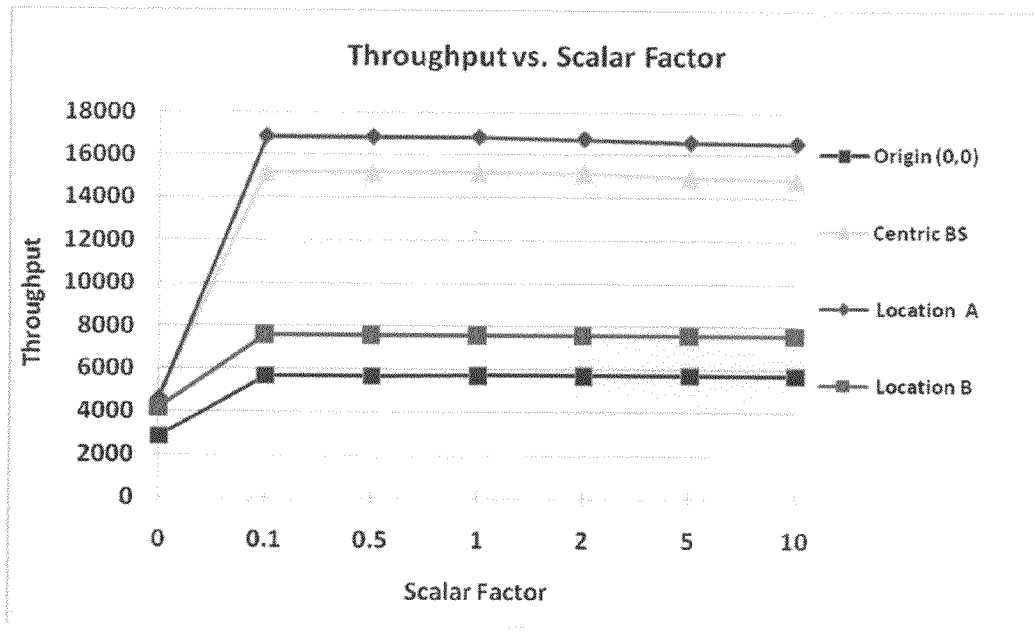
FIG. 7 shows a graph of exemplary throughput vs. scalar factor for various locations in an exemplary sensor network according to one embodiment.
Figure 8:
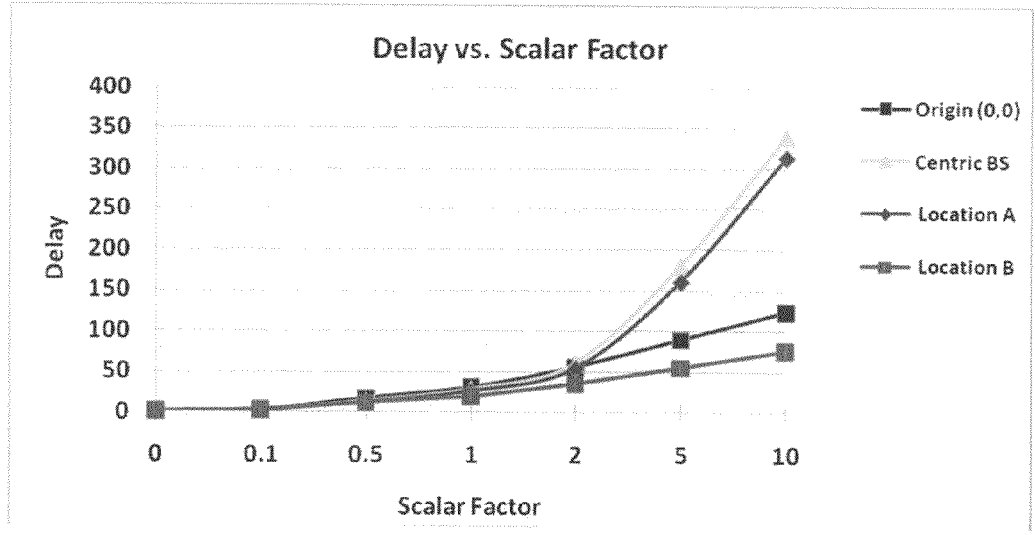
FIG. 8 shows an exemplary graph of delay vs. scalar factor for various locations in an exemplary sensor network.
Figure 9:
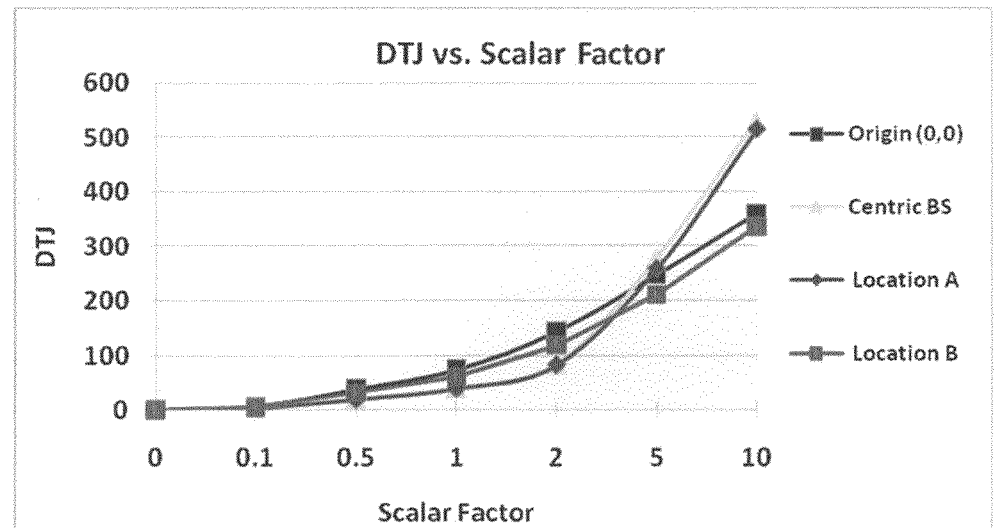
FIG. 9 shows an exemplary graph of exemplary delay time jitter (DTJ) vs. scalar factor for various locations in an exemplary sensor network according to one embodiment.

FIG. 7 shows the highest throughput for base station at (A) which has the highest nodes density around the base station. Non-zero scalars have a positive impact over throughput for all base station locations compared to zero scalar. The ongoing growth of scalar value does not deduce higher throughput. When determining scalar value, one may balance between the tendencies to save re-transmission energy, preventing overhead, required storage, and delay caused by the scalar factor. In one implementation, for example, the scalar value is between 0.1, 0.5, and 1, as it has exhibited excellent throughput, increase of storage sharing, and also generally results in less delay as compared to the use of other values for this term. Use of upper scalar values (e.g., 2, 5, and 10) reduces throughput, minimizes memory sharing, and has a very high delay. It causes large message loss due to the memory shortage as a result of the long duration of blocking but not frequency of blocking. As expected, scalar factor is directly proportional to delay and delay time jitter as shown in FIGS. 8 and 9. Values of delay and DTJ for scalar 0.1 and 0.5 is reasonable compared to the improvement in network throughput.

Figure 10:
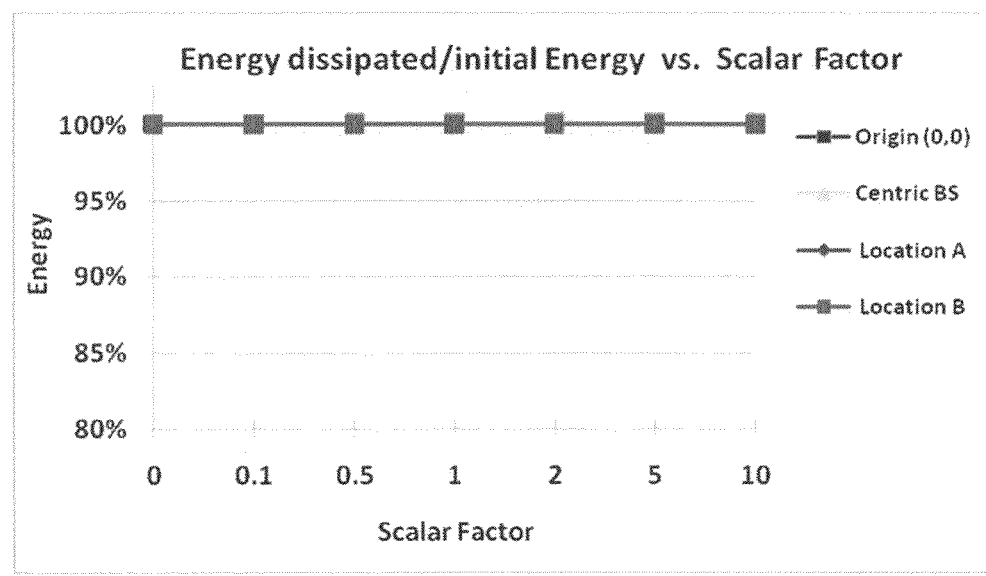
FIG. 10 shows an exemplary graph of exemplary energy dissipated and initial energy vs. scalar factor for various locations in an exemplary sensor network according to one embodiment.
Figure 11:
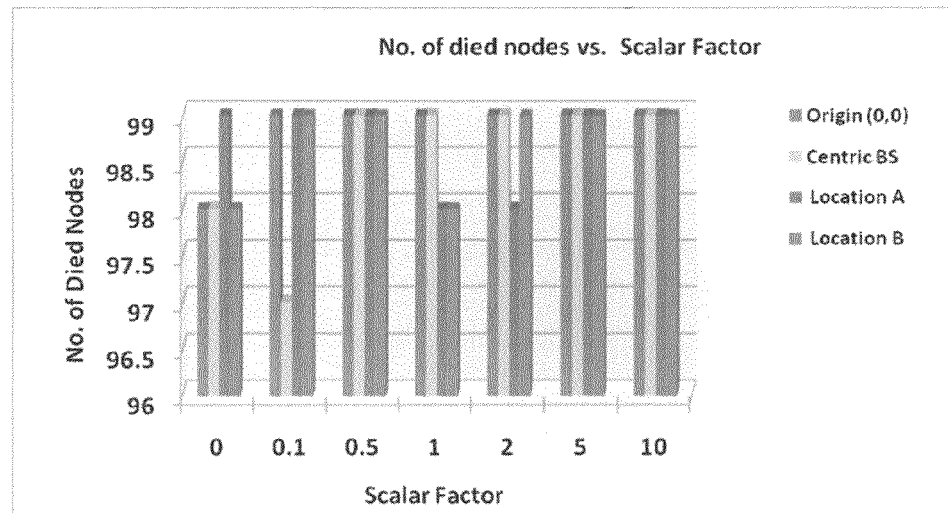
FIG. 11 shows an exemplary graph of number of failed nodes vs. scalar factor for various locations in an exemplary sensor network according to one embodiment.
Figure 12:
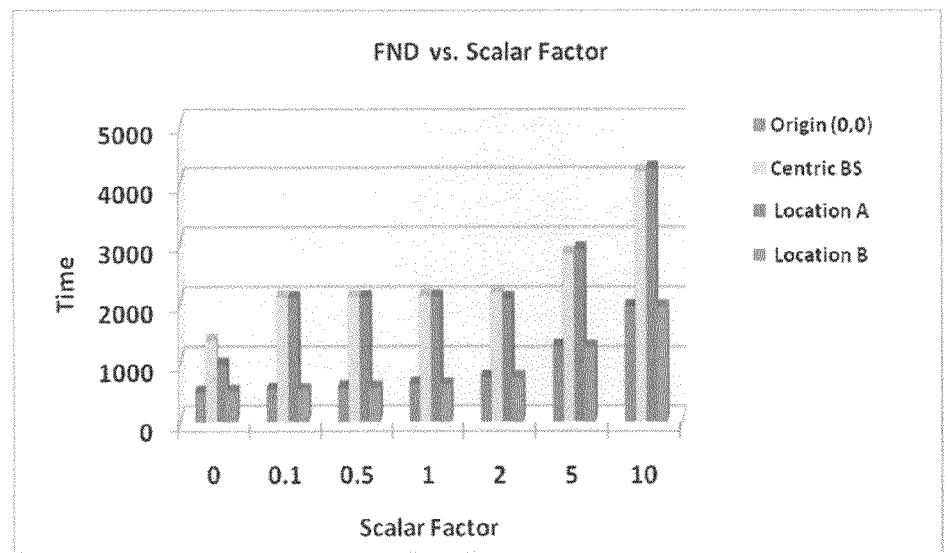
FIG. 12 shows an exemplary graph of first node to die lifetime (FND) vs. scalar factor for various locations in an exemplary sensor network according to one embodiment.
Figure 13:
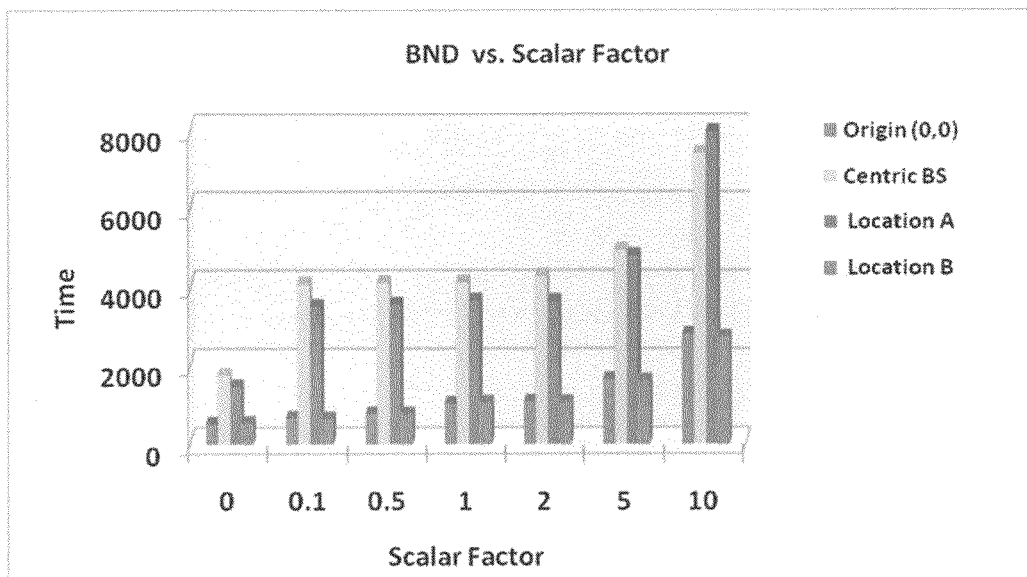
FIG. 13 shows an exemplary graph of Beta of the nodes to die lifetime (BND) (e.g., Beta=20%) vs. scalar factor for various locations in an exemplary sensor network according to one embodiment. Beta is a selected percentage of the total network node population.
Figure 14:
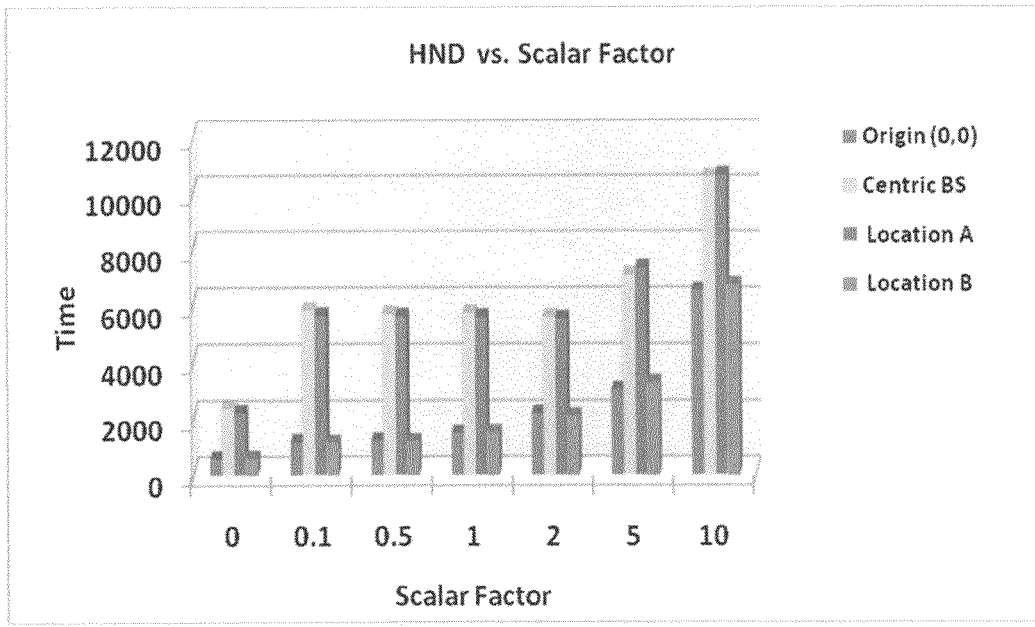
FIG. 14 shows an exemplary graph of half of the nodes alive lifetime (UNA) vs. scalar factor for various locations in an exemplary sensor network according to one embodiment.
Figure 15:
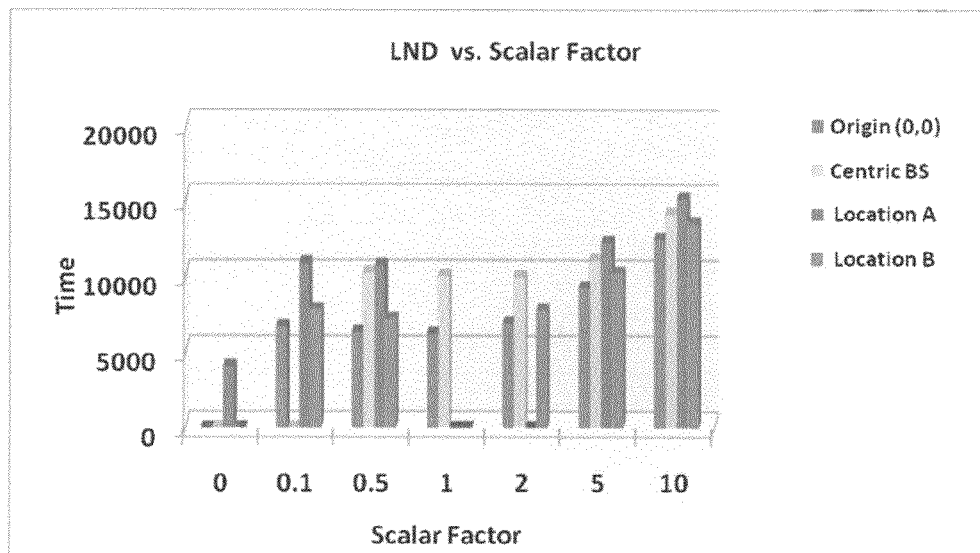
FIG. 15 shows an exemplary graph of last node to die lifetime (LND) vs. scalar factor for various locations in an exemplary sensor network according to one embodiment.

It is expected that most nodes dissipate all of their respective energy and fail. Focus was given to: 1) time nodes fail, and 2) the amount of message successfully routed by the mean of this energy. FIG. 10 shows that around 100% of energy is dissipated in all four networks. The longer the amount of time that it takes nodes to fail reflects better energy efficiency and higher network functionality. A value of zero for FND, BND, HND, and LND indicates that this condition was never satisfied; i.e., if LND=0 indicates that there is at least one node that remains alive until the end of simulation.

Figure 16:
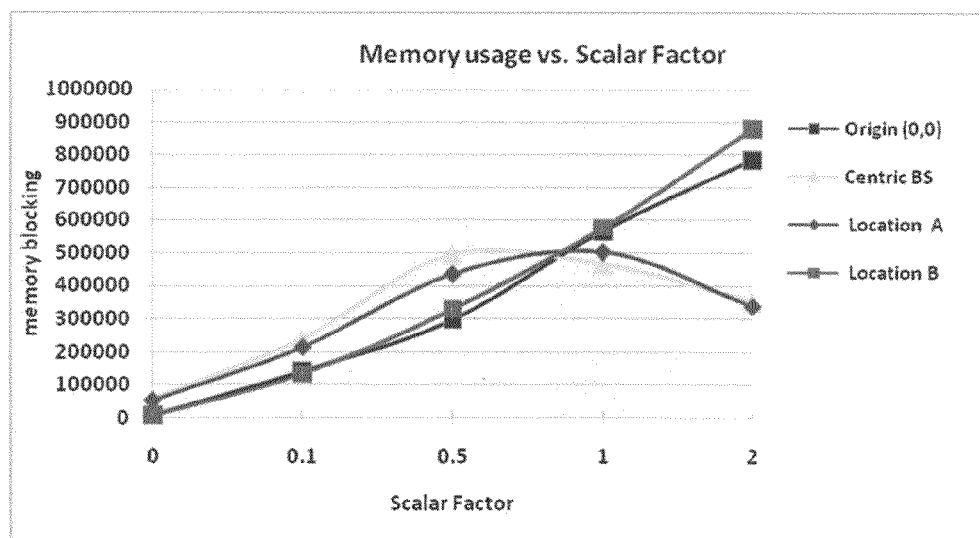
FIG. 16 shows an exemplary graph of exemplary memory usage vs. scalar factor for various locations in an exemplary sensor network according to one embodiment.
Figure 17:
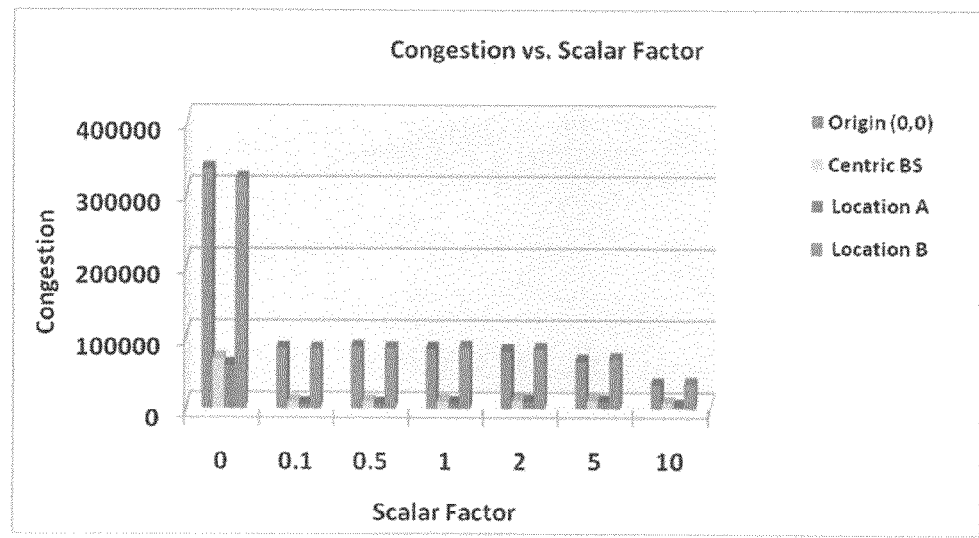
FIG. 17 shows an exemplary graph of congestion vs. exemplary scalar factor for various locations in an exemplary sensor network according to one embodiment.
Figure 18:
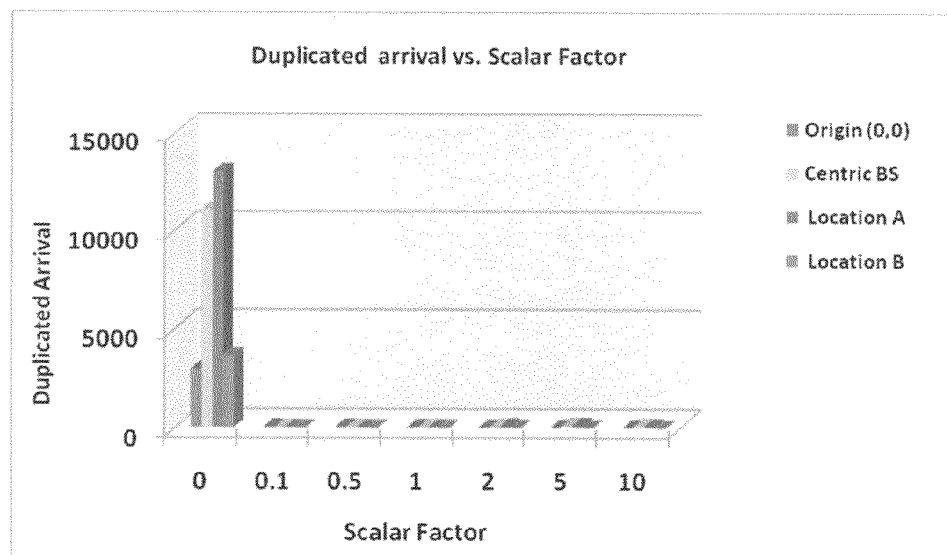
FIG. 18 shows an exemplary graph of duplicated arrival vs. scalar factor for various locations in an exemplary sensor network according to one embodiment.

FIGS. 11, 12, 13, 14, and 15 show a direct relationship between network live time and scalar values. It also shows that network "C" and "A" have higher measures than other networks in all FND, BND, HND, and LND. Network "C" shows better energy utilization than "A" fail time in FIGS. 13 and 15 for some scalar values due to changes in node density around the base station at each case. However, this difference is still small and ranges from zero to a few seconds. FIGS. 16, 17, and 18 show poor values in congestion, duplicated arrival, and memory occupation for zero scalar value. Escalating scalar value improves all of these measures. FIG. 18 shows how scalar prevents duplicated message arrival to the base station. There is a similarity in the performance between networks "A" and "C" and between networks "O" and "B", since they have similar conditions.

Figure 19:
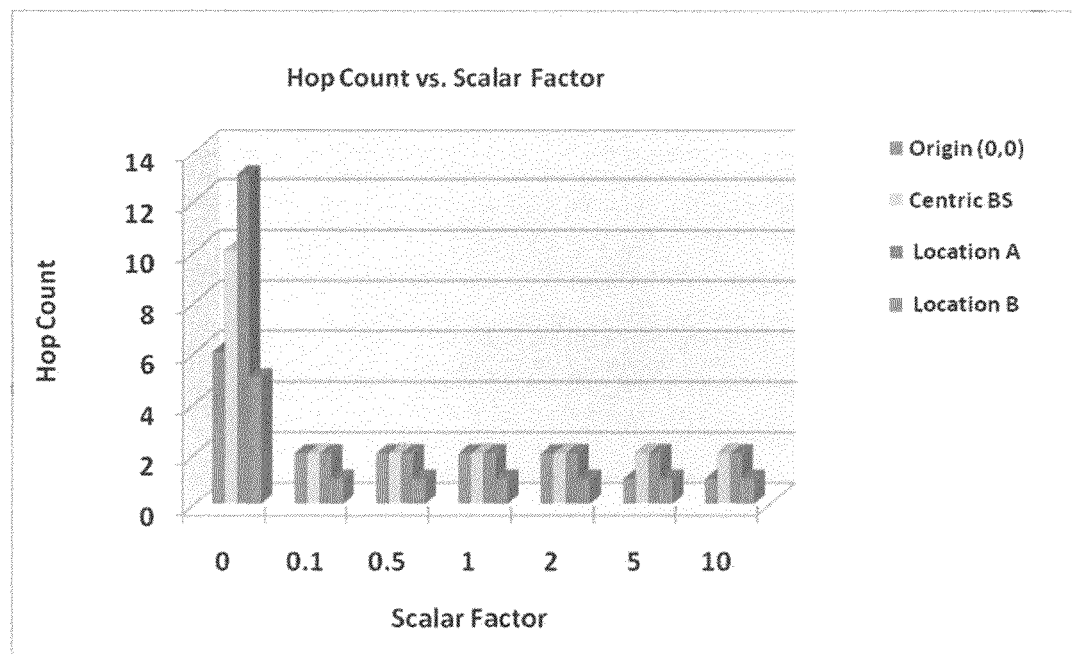
FIG. 19 shows an exemplary graph of hop count vs. scalar factor for various locations in an exemplary sensor network according to one embodiment.
Figure 20:
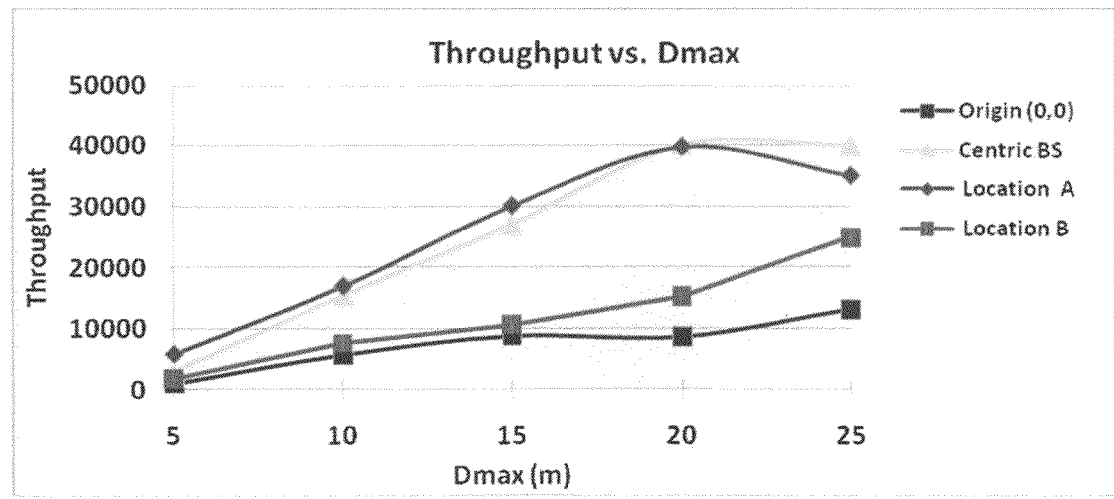
FIG. 20 shows an exemplary graph of throughput vs. $D_{max}$ according to one embodiment.

FIG. 19 shows that hop count is optimized with a non-zero scalar value. The reason for this is that the amount of energy dissipated by direct re-transmission affects most of the nodes that connect network segments early. As a result, later messages will typically follow a long path to reach the base station. This shows how scalar factor affects the different performance measures. However, this effect is not linearly related in all cases. There is an optimal value for scalar factor that preserves energy and memory with minimum delay. Scalar should be within that threshold, and threshold value depends on the state of the network. To obtain this, the following proportions between scalar factor and other measures were utilized:

Scalar Factor (SF) and Throughput (Thro.)

$$SF \propto \text{Throughput} \ldots \text{ for } SF > 0 \text{ and } SF < SF_{Threshold}$$

$$SF \propto \frac{1}{\text{Throughput}} \ldots \text{ for } SF > SF_{Threshold} \text{ and } SF < \infty$$

Scalar Factor (SF), Delay (D) and DTJ

SF∝D ... for SF>0 and SF<∞
SF∝DTJ ... or SF>0 and SF<∞

Scalar Factor (SF) and Node Life Time (L.)

SF∝L ... for SF>0 and SF<$SF_{Threshold}$

Scalar Factor (SF) and Storage Occupation (SO)

SF∝SS ... for SF>0 and SF<$SF_{Threshold}$

Scalar Factor (SF) and Congestion (Con)

$$SF \propto \frac{1}{Con} \ldots \text{ for } SF > 0 \text{ and } SF < \infty$$

Scalar Factor (SF) and Duplicated Arrival (Dup)

$$SF \propto \frac{1}{Dup} \ldots \text{ for } SF > 0 \text{ and } SF < \infty$$

TABLE 2

Performance Results Of Varying SF For Network C

| | Base station Location Center Scalar Factor Value | | | | | | |
|---|---|---|---|---|---|---|---|
| | 0 | 0.1 | 0.5 | 1 | 2 | 5 | 10 |
| Throughput | 4703 | 15151 | 15147 | 15149 | 15115 | 14911 | 14795 |
| Delay | 0.00023 | 2.81936 | 14.0662 | 28.2405 | 60.2757 | 179.097 | 338.65 |
| Delay Time Jitter | 0.000117 | 3.82722 | 19.1394 | 38.3072 | 82.3954 | 275.467 | 529.082 |
| Total energy dissipated/initial Energy | 100% | 100% | 100% | 100% | 100% | 100% | 100% |
| number of Died Nodes | 98 | 97 | 99 | 99 | 99 | 99 | 99 |
| FND | 1359.84 | 2086.26 | 2094.39 | 2109.57 | 2168.79 | 2824.1 | 4198.88 |
| BND | 1739.01 | 4066.32 | 4098.71 | 4208.72 | 4284.27 | 4938.21 | 7410.86 |
| HND | 2373.44 | 5837.21 | 5708.44 | 5743.14 | 5601.44 | 7090.23 | 10597.2 |
| LND | 0 | 0 | 10208.6 | 9992.52 | 9893.33 | 21002.3 | 14042.4 |
| Congestion | 68179 | 9448 | 9468 | 9771 | 21003 | 10768 | 7295 |
| Duplicated Arrival | 21007 | 21 | 24 | 22 | 34 | 88 | 80 |
| Hop count/message | 10 | 2 | 2 | 2 | 2 | 2 | 2 |
| Frequency Memory Occupation | 100907 | 235434 | 235809 | 236096 | 224432 | 164275 | 120261 |

TABLE 3

Performance Results Of Varying SF For Network O

| | Base station Location Origin Scalar Factor Value | | | | | | |
|---|---|---|---|---|---|---|---|
| | 0 | 0.1 | 0.5 | 1 | 2 | 5 | 10 |
| Throughput | 2849 | 5677 | 5677 | 5691 | 5700 | 5709 | 5709 |
| Delay | 0.000271 | 2.86646 | 16.8269 | 30.4126 | 55.9837 | 89.3468 | 123.502 |
| Delay Time Jitter | 0.000263 | 6.10709 | 37.7896 | 73.5379 | 142.987 | 247.34 | 360.592 |
| Total energy dissipated/initial Energy | 100% | 100% | 100% | 100% | 100% | 100% | 100% |
| number of Died Nodes | 98 | 99 | 99 | 99 | 99 | 99 | 99 |
| FND | 500.902 | 539.444 | 580.26 | 641.373 | 753.441 | 1279.06 | 1939.52 |
| BND | 527.825 | 673.546 | 779.148 | 1039.54 | 1096.15 | 1657.5 | 2814.23 |
| HND | 572.273 | 1196.28 | 1234.54 | 1495.2 | 2212.02 | 3044.87 | 6546.16 |
| LND | 0 | 6680.52 | 6300.32 | 6187.31 | 6885.03 | 9217.4 | 12440.3 |
| Congestion | 333092 | 82959 | 84943 | 82712 | 79559 | 65579 | 33306 |
| Duplicated Arrival | 2958 | 29 | 28 | 17 | 8 | 4 | 2 |
| Hop count/message | 6 | 2 | 2 | 2 | 2 | 1 | 1 |
| Occupied Memory | 105137 | 152899 | 140212 | 135639 | 128915 | 115978 | 102606 |

TABLE 4

Performance Results Of Varying SF For Network A

Base station Location
Random location A
Scalar Factor Value

| | 0 | 0.1 | 0.5 | 1 | 2 | 5 | 10 |
|---|---|---|---|---|---|---|---|
| Throughput | 4608 | 16829 | 16828 | 16824 | 16740 | 16600 | 16551 |
| Delay | 0.00 | 2.53 | 12.60 | 25.34 | 53.87 | 160.13 | 313.35 |
| Delay Time Jitter | 0.00 | 3.87 | 19.30 | 39.07 | 82.48 | 257.99 | 514.29 |
| Total energy dissipated/initial Energy | 100% | 100% | 100% | 100% | 100% | 100% | 100% |
| number of Died Nodes | 99 | 99 | 99 | 98 | 98 | 99 | 99 |
| FND | 968.92 | 2078.20 | 2094.26 | 2103.93 | 2070.06 | 2900.06 | 4264.82 |
| BND | 1468.19 | 3514.53 | 3565.95 | 3669.73 | 3654.33 | 4813.07 | 7980.79 |
| HND | 2231.52 | 5670.22 | 5642.78 | 5618.57 | 5568.54 | 7353.25 | 20471.40 |
| LND | 4045.43 | 21285.6 | 10722.4 | 0 | 0 | 12196 | 15107.7 |
| Congestion | 59851 | 6719 | 6699 | 7206 | 10333 | 9345 | 3974 |
| Duplicated Arrival | 12939 | 0 | 0 | 2 | 63 | 89 | 45 |
| Hop count/message | 13 | 2 | 2 | 2 | 2 | 2 | 2 |
| Occupied Memory | 102097 | 211501 | 212247 | 212165 | 195828 | 141750 | 107578 |

TABLE 5

Performance Results Of Varying SF For Network B

Base station Location
Random location B
Scalar Factor Value

| | 0 | 0.1 | 0.5 | 1 | 2 | 5 | 10 |
|---|---|---|---|---|---|---|---|
| Throughput | 4144 | 7567 | 7567 | 7568 | 7569 | 7564 | 7560 |
| Delay | 0.000192 | 1.84439 | 11.3982 | 19.1009 | 35.2904 | 54.8282 | 75.9604 |
| Delay Time Jitter | 0.000203 | 5.17728 | 32.673 | 61.2812 | 214.92 | 211.417 | 337.255 |
| Total energy dissipated/initial Energy | 100% | 100% | 100% | 100% | 100% | 100% | 100% |
| number of Died Nodes | 98 | 99 | 99 | 98 | 99 | 99 | 99 |
| FND | 510.505 | 531.274 | 575.872 | 630.981 | 749.733 | 1264 | 1938.52 |
| BND | 547.271 | 659.971 | 769.494 | 2048.08 | 1077.59 | 1621.04 | 2748.27 |
| HND | 595.085 | 1155.77 | 1213.54 | 1520.13 | 2208.63 | 3292.39 | 6758.26 |
| LND | 0 | 7768.55 | 7161.32 | 0 | 7750.04 | 10205 | 13478.8 |
| Congestion | 319063 | 82011 | 83002 | 84188 | 82214 | 67754 | 34298 |
| Duplicated Arrival | 3633 | 0 | 0 | 0 | 0 | 0 | 0 |
| Hop count/message | 5 | 1 | 1 | 1 | 1 | 1 | 1 |
| Occupied Memory | 101991 | 144951 | 131473 | 128186 | 120855 | 109025 | 97208 |

Varying $D_{max}$

Given simulation input of 40,000 simulation messages, 20 buffer size, mean inter-arrival time=0.5, initial energy per node=101e+7, duplicate factor=5, and scalar factor=0.5, results were achieved for $D_{max}$: 5, 10, 15, 20, and 25. Exemplary results are shown in FIGS. 20-32 and the following Table showing performance results of varying $D_{max}$ for network O and network B according to one embodiment.

Base station Location
Origin (0, 0)
Dmax Value

| | 5 | 10 | 15 | 20 | 25 |
|---|---|---|---|---|---|
| Throughput | 979 | 5677 | 8723 | 8579 | 13045 |
| Delay | 16.9859 | 16.8269 | 8.13427 | 7.07226 | 4.75431 |
| Delay Time Jitter | 11.6656 | 37.7896 | 14.007 | 8.99029 | 5.79872 |
| Total energy dissipated/initial Energy | 9% | 100% | 100% | 100% | 100% |
| No. of Died Nodes | 6 | 99 | 98 | 99 | 99 |
| FND | 7060.05 | 580.26 | 981.803 | 2019.74 | 1923.56 |
| BND | 7060.05 | 779.148 | 1378.63 | 2970.12 | 4173.6 |
| HND | 12185.7 | 1254.4 | 1882.66 | 3516.76 | 5107.06 |
| LND | 0 | 6300.32 | 0 | 4921.76 | 6795.97 |
| Congestion | 0 | 84943 | 250387 | 268554 | 274631 |
| Duplicated Arrival | 0 | 28 | 17 | 230 | 568 |
| hop count/message | 2 | 2 | 2 | 3 | 2 |
| Occupied Memory (Sum) | 6823 | 140212 | 296463 | 565839 | 784630 |

-continued

| | Base station Location Random location B Dmax Value | | | | |
|---|---|---|---|---|---|
| | 5 | 10 | 15 | 20 | 25 |
| Throughput | 1743 | 7567 | 10625 | 15253 | 25016 |
| Delay | 17.5681 | 11.3982 | 6.13383 | 4.25857 | 2.56386 |
| Delay Time Jitter | 15.7286 | 32.673 | 12.2799 | 7.12527 | 5.69703 |
| Total energy dissipated/initial Energy | 9% | 100% | 100% | 100% | 100% |
| No. of Died Nodes | 5 | 99 | 99 | 99 | 99 |
| FND | 9661.72 | 575.872 | 1199.78 | 2028.52 | 2873.03 |
| BND | 9661.72 | 769.494 | 1805.57 | 3627.81 | 6069.6 |
| HND | 15260.4 | 1233.72 | 2293.89 | 4464.72 | 7748.41 |
| LND | 0 | 7161.32 | 6074.36 | 7874.53 | 12532 |
| Congestion | 0 | 83002 | 210080 | 187736 | 103172 |
| Duplicated Arrival | 0 | 0 | 28 | 182 | 884 |
| hop count/message | 2 | 1 | 2 | 2 | 1 |
| Occupied Memory (Sum) | 5431 | 131473 | 327554 | 575144 | 878827 |

Figure 21:
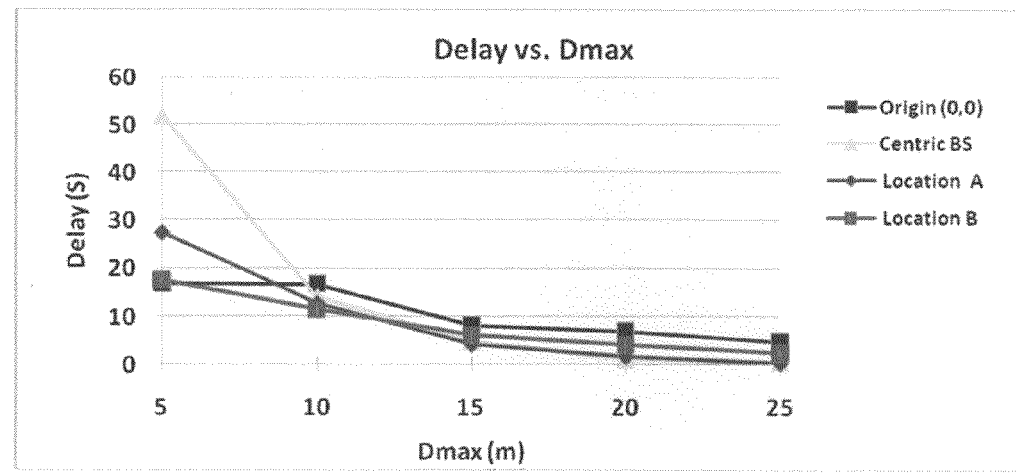
FIG. 21 shows an exemplary graph of delay vs. $D_{max}$ according to one embodiment.
Figure 22:
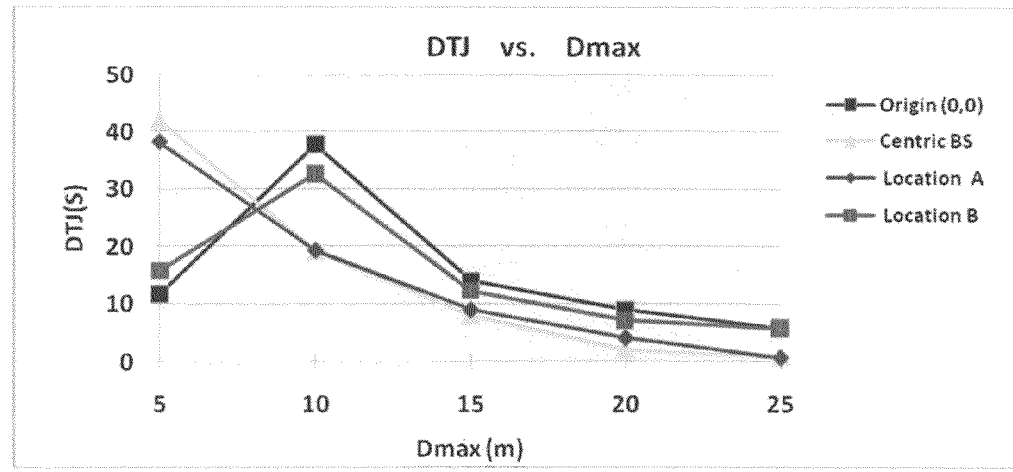
FIG. 22 shows an exemplary graph of DTJ vs. $D_{max}$ according to one embodiment.
Figure 23:
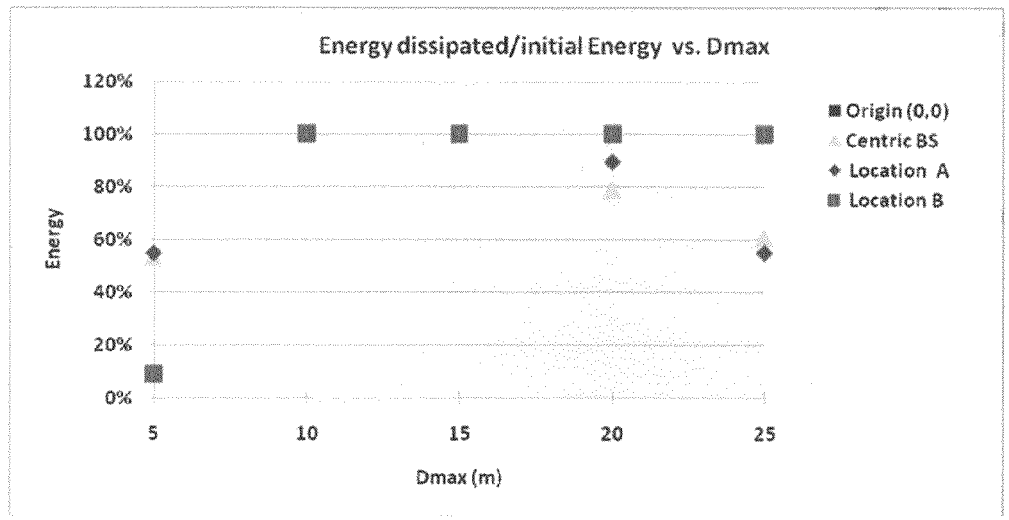
FIG. 23 shows an exemplary graph of energy dissipated/initial energy vs. $D_{max}$ according to one embodiment.
Figure 24:
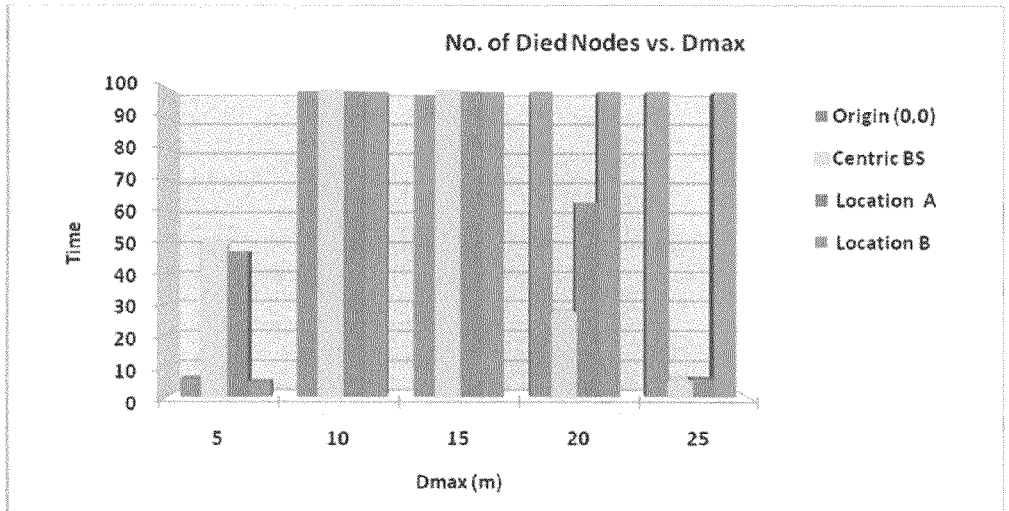
FIG. 24 shows an exemplary graph of the number of failed nodes vs. $D_{max}$ according to one embodiment.
Figure 25:
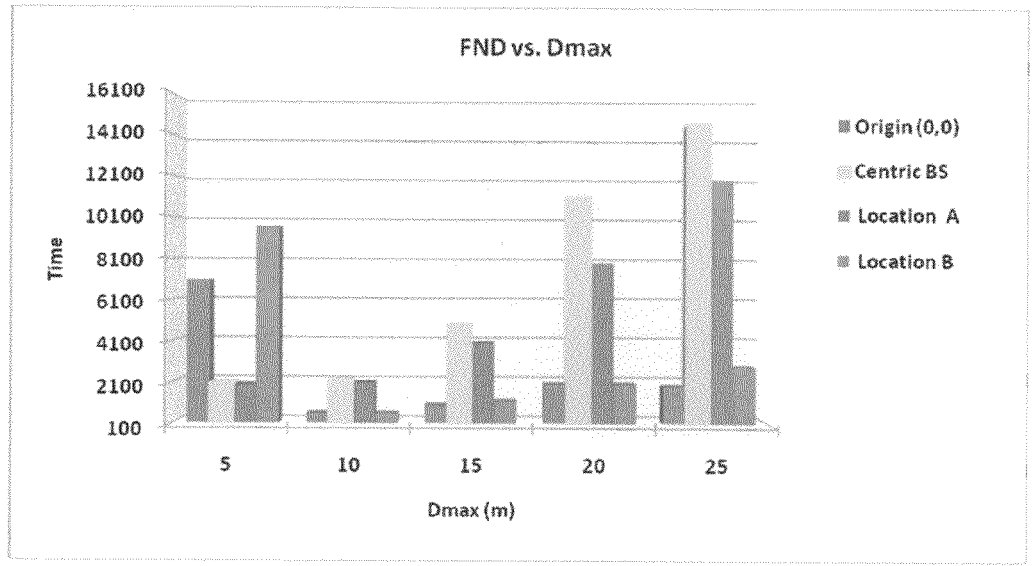
FIG. 25 shows an exemplary graph of FND vs. $D_{max}$ according to one embodiment.

$D_{max}$ vs. Throughput Delay and DTJ $D_{max}$ is inversely proportional to delay and DTJ as shown in FIGS. 21 and 22. However, it is not always proportional to throughput; when a message spans the network, it generally causes a substantial amount of energy dissipation to receive the message by a large number of nodes. The immediately preceding table shows that exemplary throughput is reduced for $D_{max}=25$ in networks "A" and "C." It also shows a continuing increase in networks "O" and "B", since a distant base station became accessible for other parts of the network. Similarly, FIG. 22 shows an exemplary high DTJ value for $D_{max}=10$ compared to $D_{max}=5$. In this implementation, the selection of $D_{max}$ is predetermined to network deployment, and it is restricted to the limitation of node resources and bandwidth.

Figure 26:
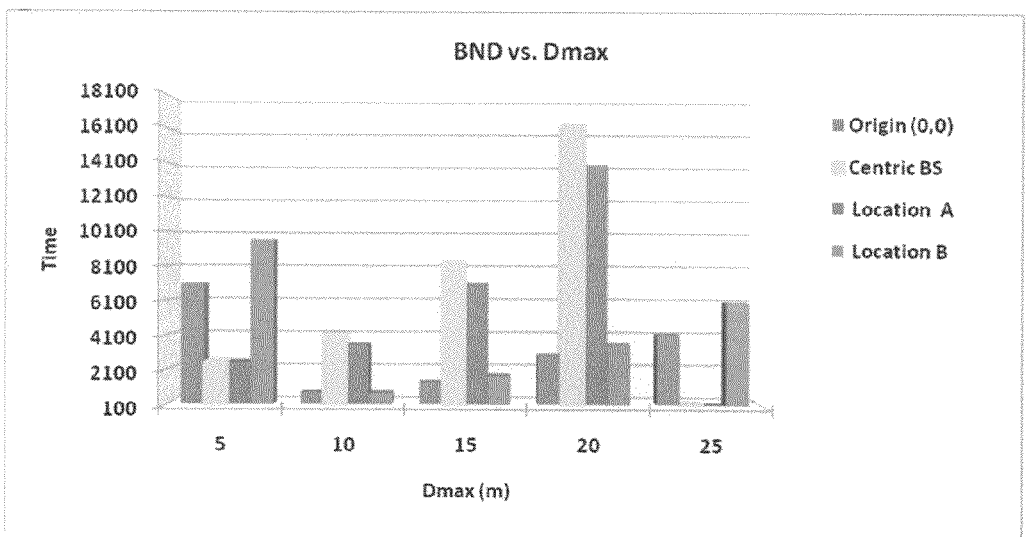
FIG. 26 shows an exemplary graph of BND vs. $D_{max}$ according to one embodiment.
Figure 27:
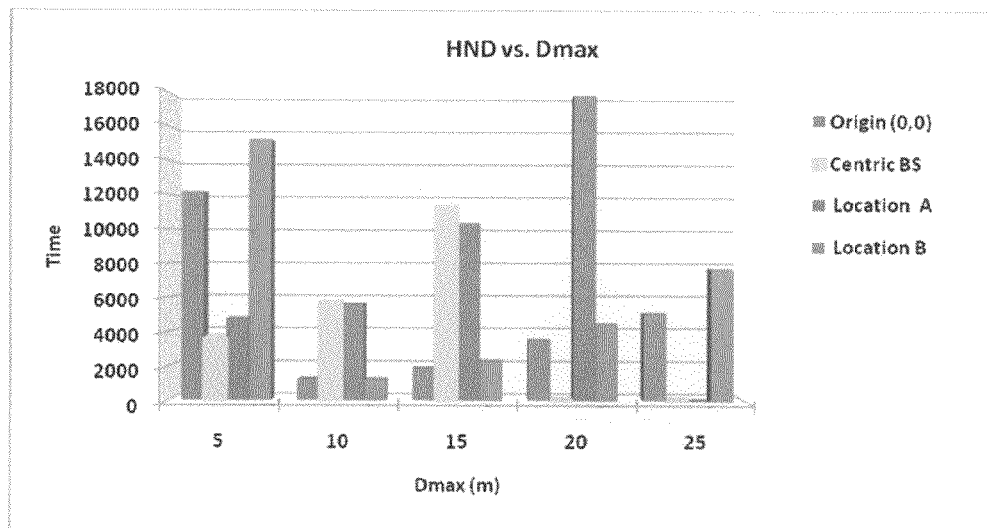
FIG. 27 shows an exemplary graph of HND vs. $D_{max}$ according to one embodiment.
Figure 28:
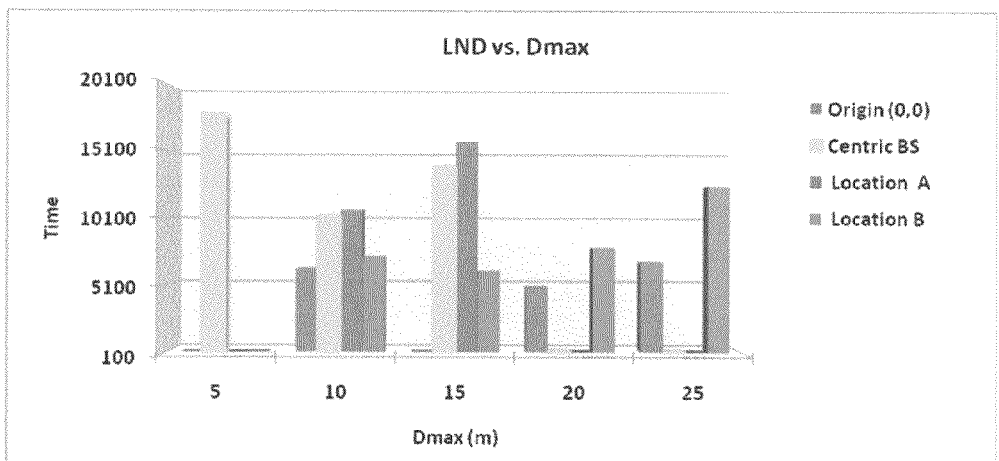
FIG. 28 shows an exemplary graph of LND vs. $D_{max}$ according to one embodiment.

$D_{max}$ vs. Energy Dissipation, Number of Failed Nodes, FND, BND, HND, and LND FIG. 22 shows that initial energy is consumed for different $D_{max}$ values. In this exemplary implementation, the lowest dissipation is indicated for $D_{max}=5$, since approximately 49% of the nodes are inaccessible and isolated from other nodes and the base station. The relationship between $D_{max}$, FND, BND, HND, and LND depends on the layout of the network. FIGS. 26 and 27 respectively illustrate that approximately 20% and 50% of the nodes of networks "A" and "C" remain alive for $D_{max}=10$.

$D_{max}$ vs. Storage Occupation, Duplicated Arrival, and Congestion

Figure 29:
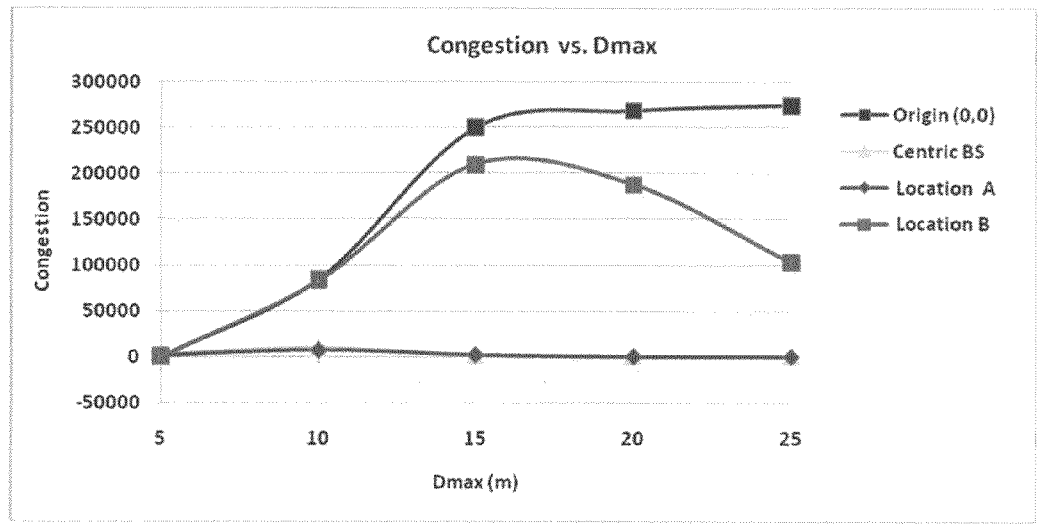
FIG. 29 shows an exemplary graph of congestion vs. $D_{max}$ according to one embodiment.
Figure 30:
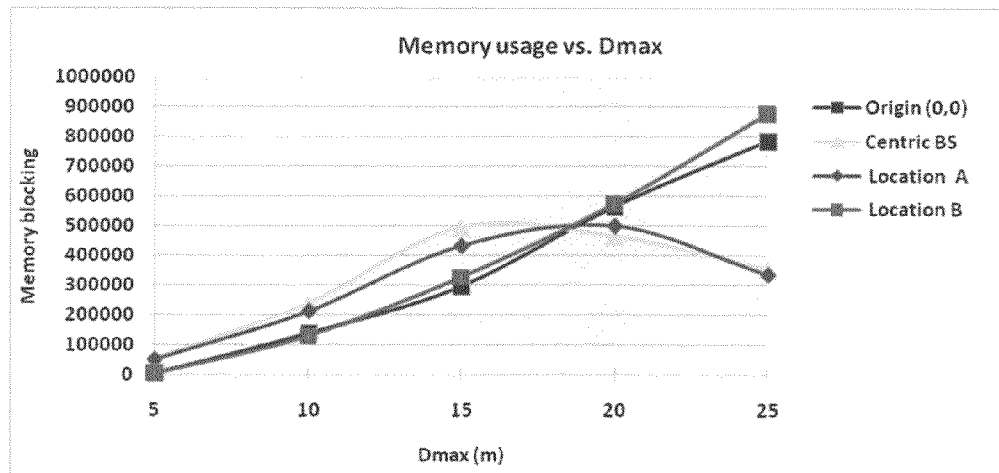
FIG. 30 shows an exemplary graph of memory usage vs. $D_{max}$ according to one embodiment.
Figure 31:
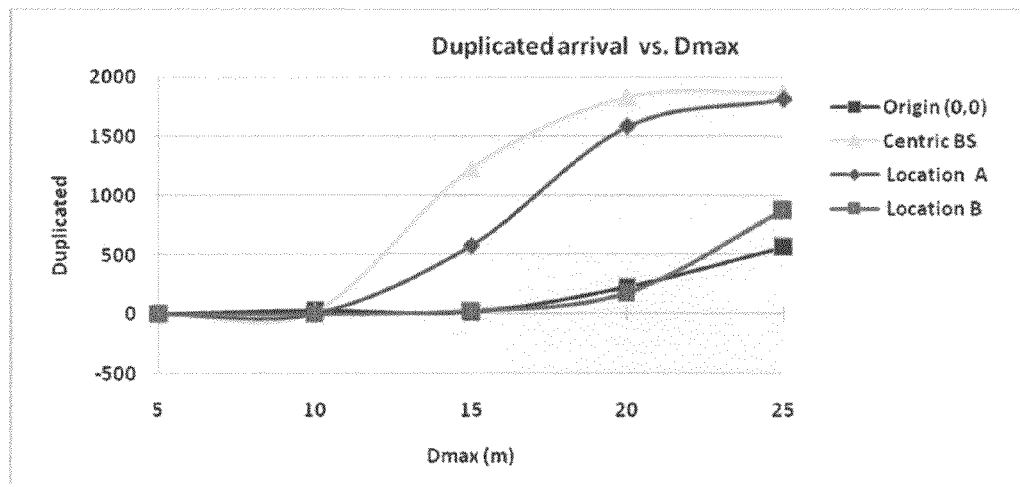
FIG. 31 shows an exemplary graph of duplicated arrival vs. $D_{max}$ according to one embodiment.

FIGS. 29, 30, and 31 show an exemplary increase in duplicated messages and associated high memory occupation compared to the average number of hops to reach the base station. Duplication occurs since more than one node will have similar timer value and will dissipate the message in the same time and before receiving base station ACK.

$D_{max}$ vs. Hop Count

Figure 32:
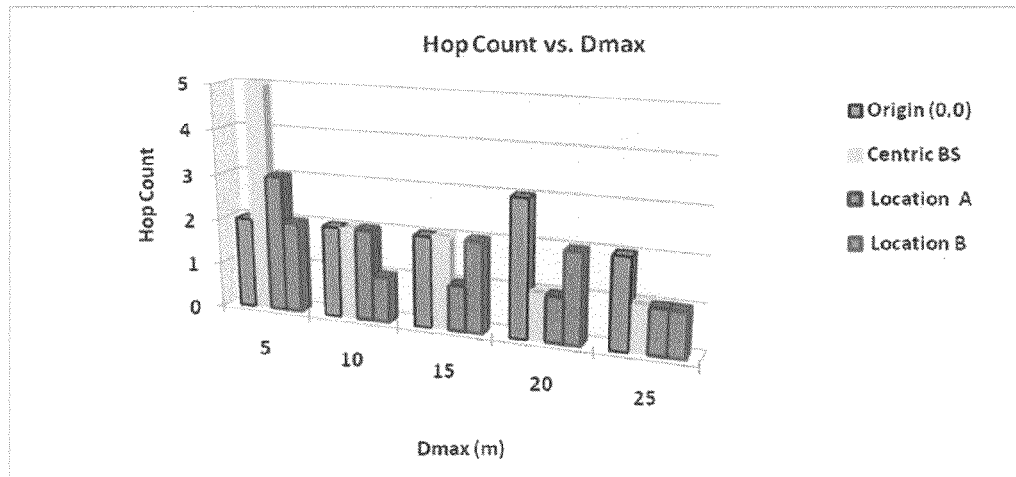
FIG. 32 shows an exemplary graph of hop count vs. $D_{max}$ according to one embodiment.

FIG. 32 shows escalating $D_{max}$ minimizes hop count in networks "C" and "A". In networks "O" and "B", it increased since the base station can receive messages from the distant message in network through in multi-hop fashion.

Discussion on $D_{max}$

The previous section shows that the effect of $D_{max}$ is different from one network to another. Essentially, $D_{max}$ value is hardware dependent. Large $D_{max}$ dissipates large energy for receiving. In most cases, a very large $D_{max}$ is not supported and routing is multi-hop. For this, its value should be determined according to the location of the base station, deployment area, and deployment schema. The following proportions between $D_{max}$ and other measures were used:

$D_{max}$ and Throughput (Thro.):

$Dmax \propto Throughput$ ... for $D_{max} > 0$ and $SF < D_{maxThreshold}$ $$Dmax \propto \frac{1}{Throughput} \ldots \text{ for } D_{maxThreshold} > 0 \text{ and } D_{max} < \infty$$

$D_{max}$ and Delay:

$$Dmax \propto \frac{1}{D} \ldots \text{ for } D_{max} > 0 \text{ and } D_{max} < \infty$$

$D_{max}$ and Congestion (Con):

$Dmax \propto Con$ ... for $D_{max} > 0$ and $D_{max} < \infty$ $D_{max}$ and Duplicated arrival (Dup):

$Dmax \propto Dup$ ... for $D_{max} > 0$ and $D_{max} < \infty$

Varying Buffer Size

Buffer size is proportional to throughput and inversely proportional to delay, conjunction, and duplicated arrival. Maximizing buffer size allows more messages to be stored and routed later. Given simulation input of 40,000 simulation messages, $D_{max}=10$, mean inter-arrival time=0.5, initial energy per node=101e+7, duplicate factor=5, and $D_{max}=10$ m, extracted results for buffer size values: 5, 10, 15, and 20. Exemplary results are shown in FIGS. 33-43 and the following two tables. The following two tables respectively show performance results of varying the buffer size for networks A and C, and performance results of varying the buffer size for networks B and O according to one embodiment.

| | Base station Location | | | | | | | |
|---|---|---|---|---|---|---|---|---|
| | Location A | | | | Centric | | | |
| | Buffer Size Value | | | | | | | |
| | 5 | 10 | 15 | 20 | 5 | 10 | 15 | 20 |
| Throughput | 16693 | 16819 | 16829 | 16828 | 15041 | 15142 | 15147 | 15147 |
| Delay | 13.27 | 12.81 | 12.63 | 12.60 | 15.8171 | 14.4234 | 14.0763 | 14.0662 |
| Delay Time Jitter | 20.45 | 19.63 | 19.35 | 19.30 | 21.5974 | 19.5582 | 19.1264 | 19.1394 |
| Total energy dissipated/initial Energy | 100% | 100% | 100% | 100% | 100% | 100% | 100% | 100% |
| No. of Died Nodes | 99 | 98 | 99 | 99 | 99 | 98 | 99 | 99 |
| FND | 1728.57 | 2092.36 | 2094.26 | 2094.26 | 2057.12 | 2094.26 | 2094.39 | 2094.39 |
| BND | 3753.46 | 3774.94 | 3565.95 | 3565.95 | 3974.86 | 4068.84 | 4098.71 | 4098.71 |
| HND | 5595.06 | 5665.93 | 5682.95 | 5642.78 | 5450 | 5735.04 | 5708.29 | 5708.44 |
| LND | 11233.1 | 0 | 10816.3 | 10722.4 | 10281.9 | 0 | 10240.3 | 10208.6 |
| Congestion | 11763 | 7397 | 6772 | 6699 | 13791 | 9848 | 9493 | 9468 |
| Duplicated Arrival | 66 | 3 | 0 | 0 | 70 | 30 | 24 | 24 |
| hop count/message | 2 | 2 | 2 | 2 | 2 | 2 | 2 | 2 |
| Occupied Memory (Sum) | 185062 | 210859 | 211829 | 212247 | 210067 | 234281 | 235529 | 235809 |

| | Base station Location | | | | | | | |
|---|---|---|---|---|---|---|---|---|
| | Origin (0, 0) | | | | Location B | | | |
| | Buffer Size Value | | | | | | | |
| | 5 | 10 | 15 | 20 | 5 | 10 | 15 | 20 |
| Throughput | 5697 | 5686 | 5680 | 5677 | 7565 | 7567 | 7567 | 7567 |
| Delay | 12.3398 | 14.0311 | 15.1507 | 16.8269 | 7.73483 | 8.92752 | 10.6559 | 11.3982 |
| Delay Time Jitter | 31.2802 | 33.261 | 35.8335 | 37.7896 | 26.0107 | 28.5202 | 32.649 | 32.673 |
| Total energy dissipated/initial Energy | 100% | 100% | 100% | 100% | 100% | 100% | 100% | 100% |
| No. of Died Nodes | 99 | 98 | 99 | 99 | 99 | 99 | 99 | 99 |
| FND | 630.084 | 594.85 | 592.087 | 580.26 | 613.779 | 592.772 | 584.542 | 575.872 |
| BND | 1050.47 | 1035.36 | 859.158 | 779.148 | 1017.39 | 981.397 | 918.847 | 769.494 |
| HND | 2842.43 | 1699.67 | 1351.9 | 1234.54 | 3170.77 | 1577.83 | 1317.38 | 1213.54 |
| LND | 8895.99 | 0 | 7510.84 | 6300.32 | 10476.3 | 9460.8 | 8010.39 | 7161.32 |
| Congestion | 63422 | 62985 | 78731 | 84943 | 60590 | 69276 | 78755 | 83002 |
| Duplicated Arrival | 11 | 21 | 25 | 28 | 0 | 0 | 0 | 0 |
| hop count/message | 2 | 2 | 2 | 2 | 1 | 1 | 1 | 1 |
| Occupied Memory (Sum) | 123306 | 126690 | 136371 | 140212 | 113019 | 121933 | 127128 | 131473 |

Buffer Size vs. Throughput Delay, DTJ

Figure 33:
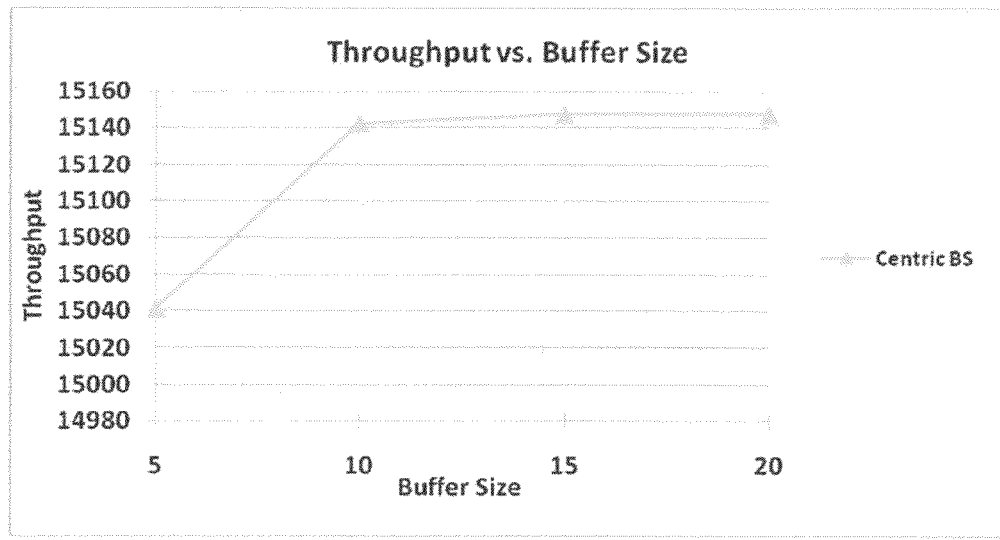
FIGS. 33-35 show recitative graphs of throughput vs. buffer size at a centric base station, at location A, and at location B, respectively, according to one embodiment.
Figure 34:
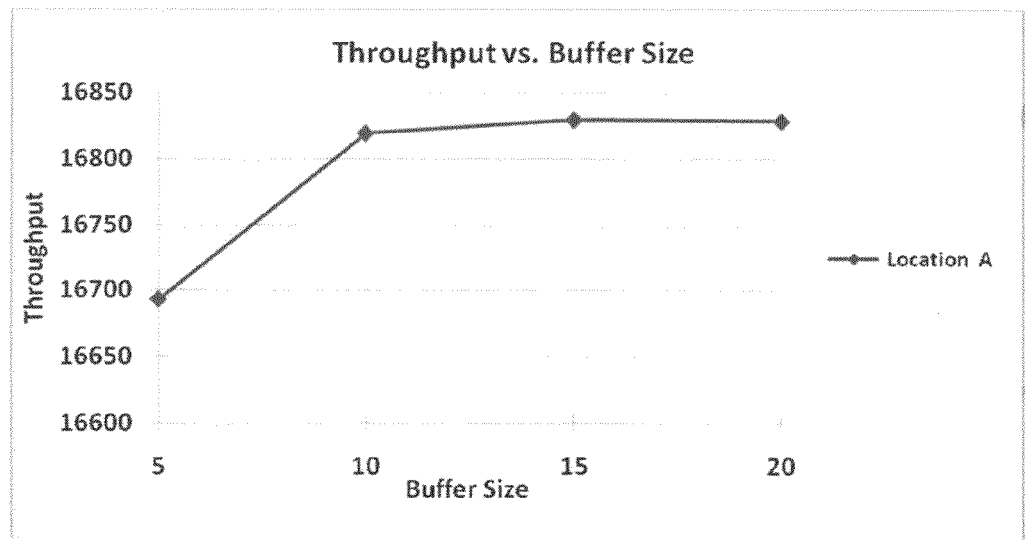
Figure 35:
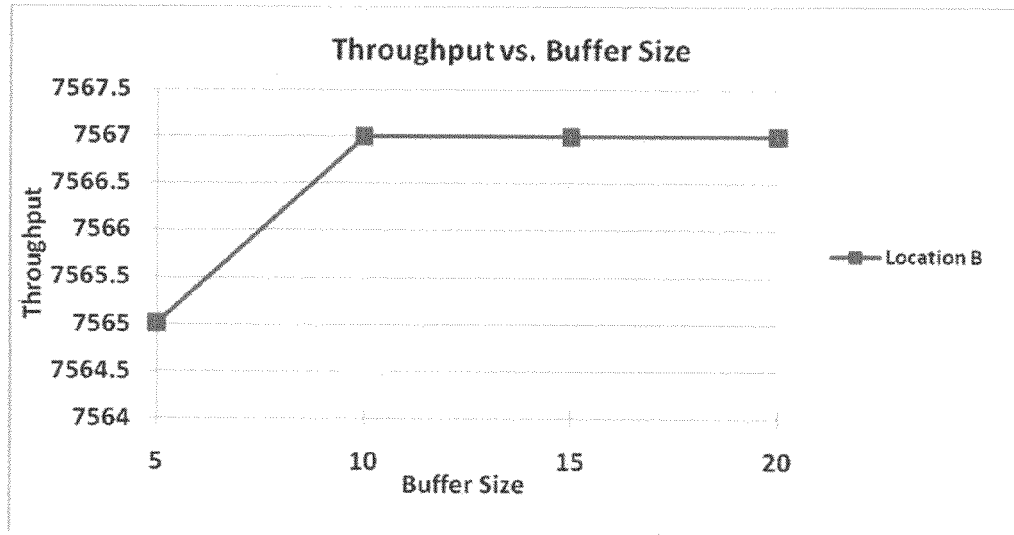
Figure 36:
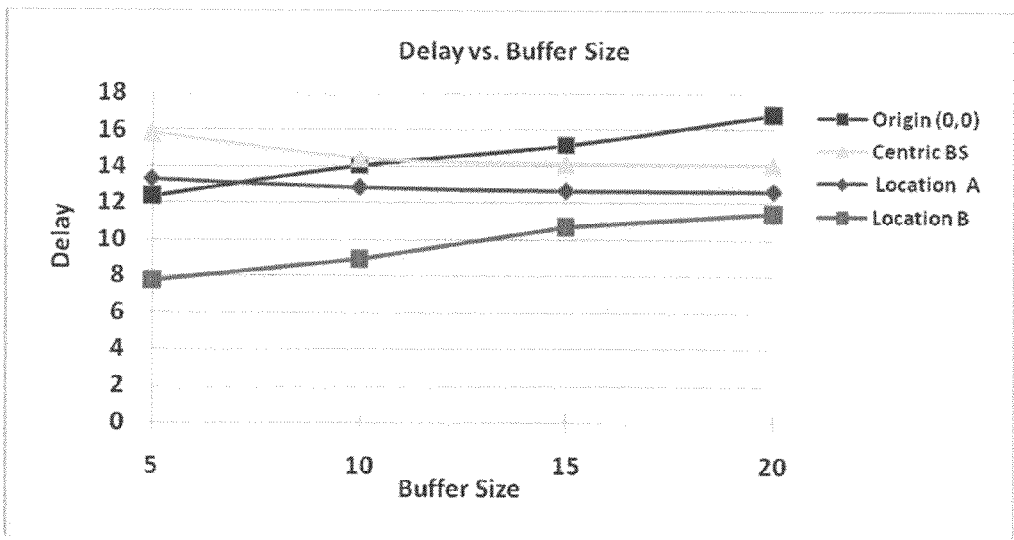
FIG. 36 shows an exemplary graph of delay vs. buffer size according to one embodiment.
Figure 37:
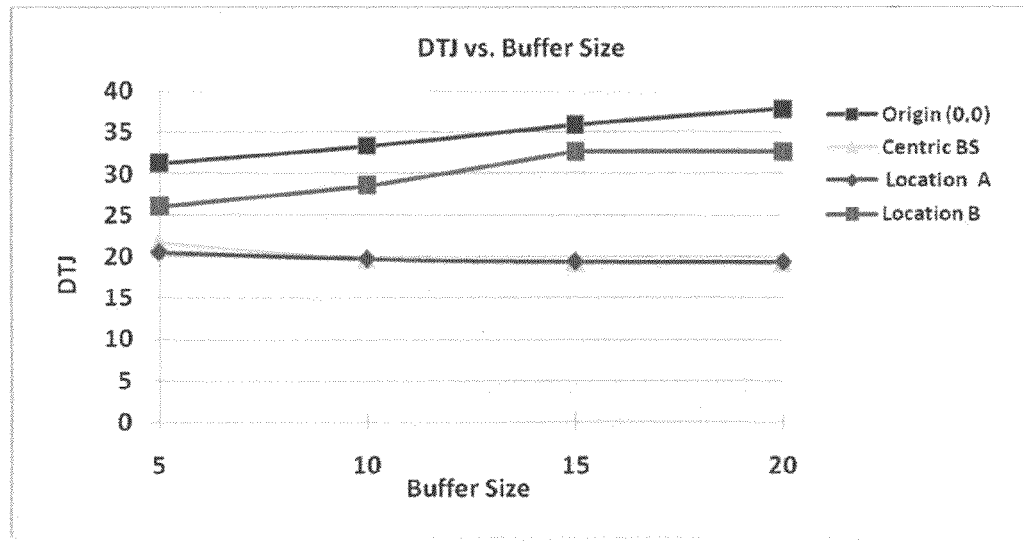
FIG. 37 shows an exemplary graph of DTJ vs. buffer size according to one embodiment.
Figure 38:
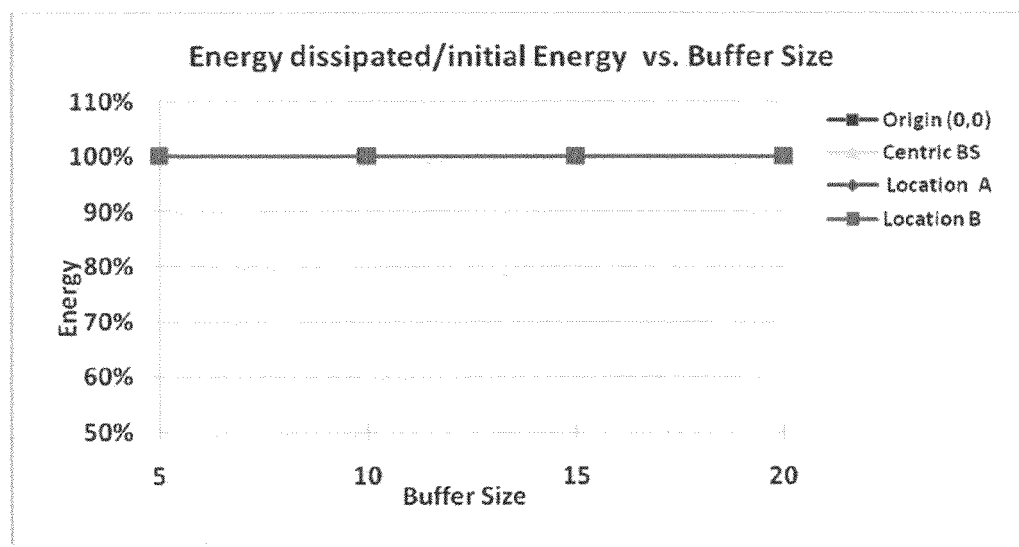
FIG. 38 shows an exemplary graph of energy dissipated/initial energy vs. buffer size according to one embodiment.
Figure 39:
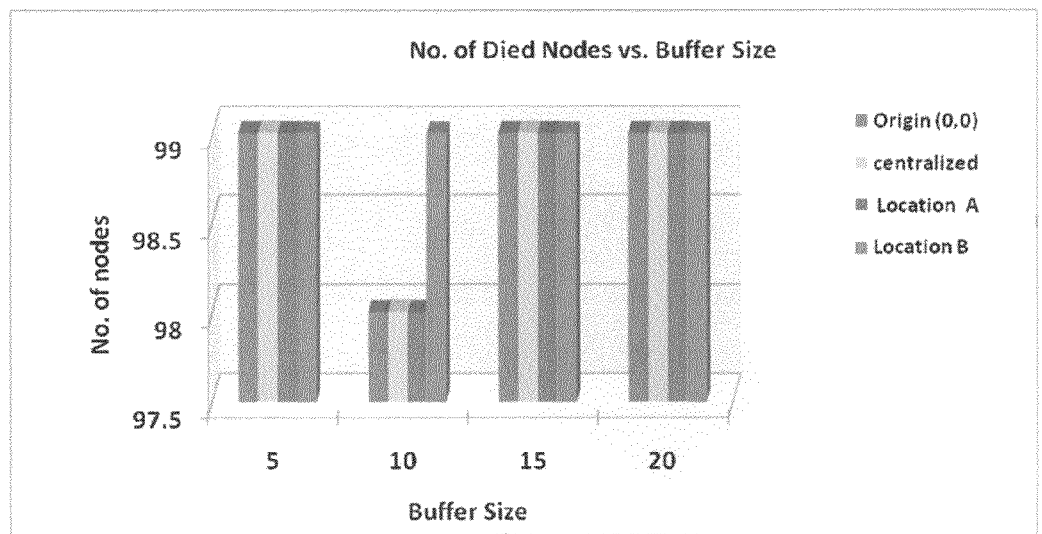
FIG. 39 shows an exemplary graph of number of failed nodes vs. buffer size according to one embodiment.
Figure 40:
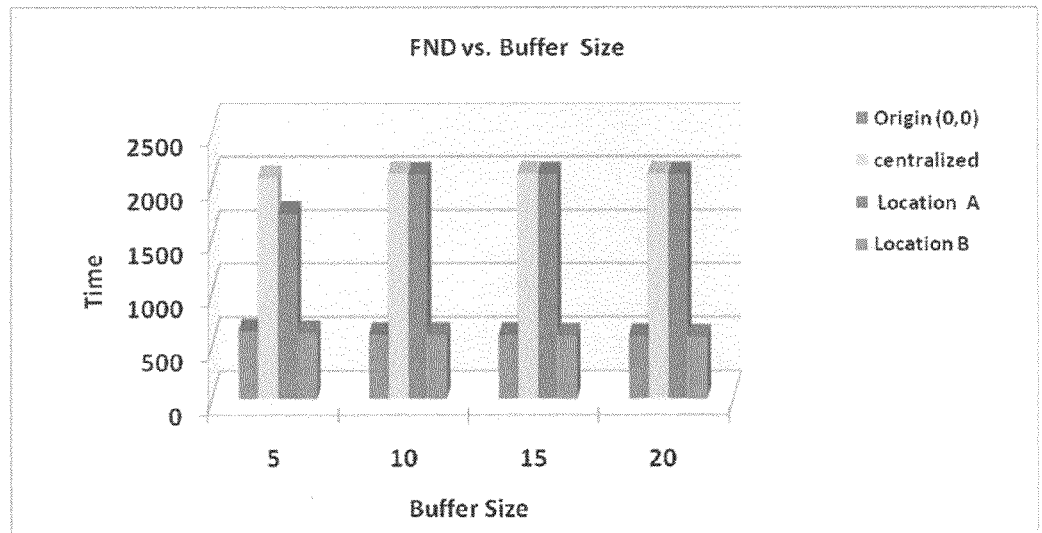
FIG. 40 shows an exemplary graph of FND vs. buffer size according to one embodiment.
Figure 41:
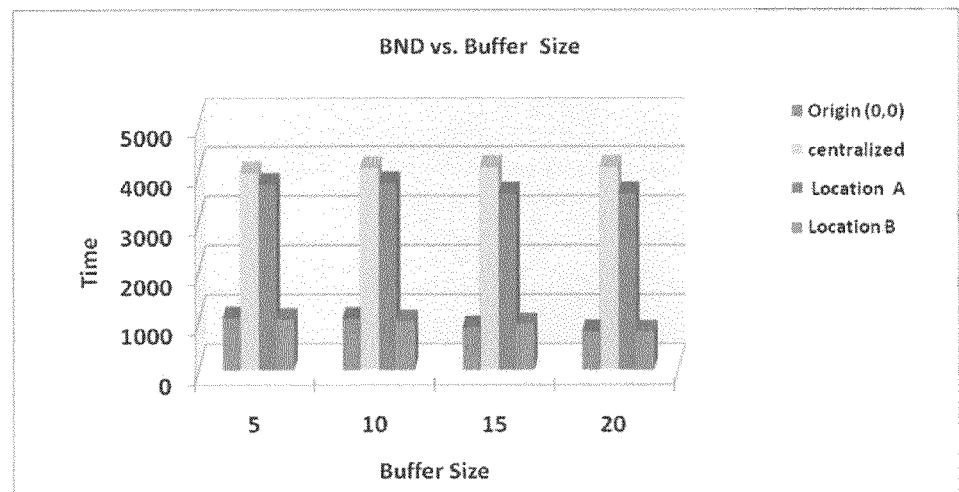
FIG. 41 shows an exemplary graph of BND vs. buffer size according to one embodiment.
Figure 42:
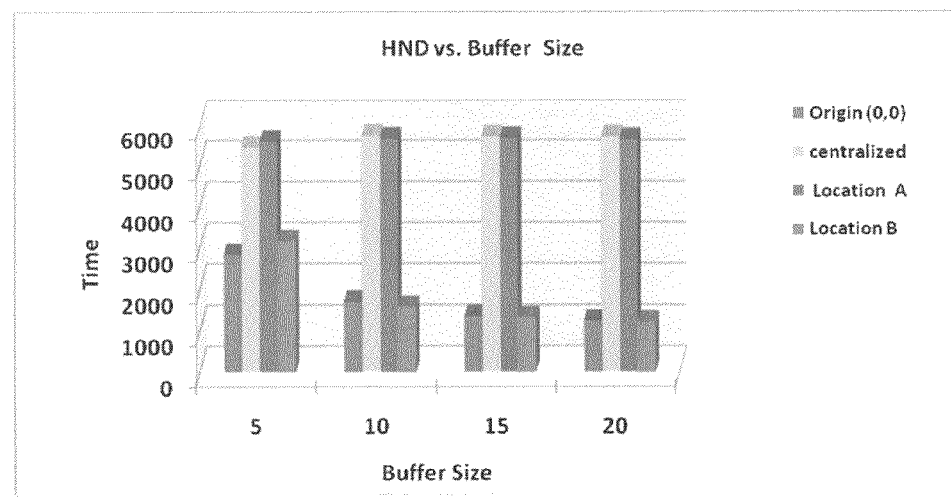
FIG. 42 shows an exemplary graph of HND vs. buffer size according to one embodiment.
Figure 43:
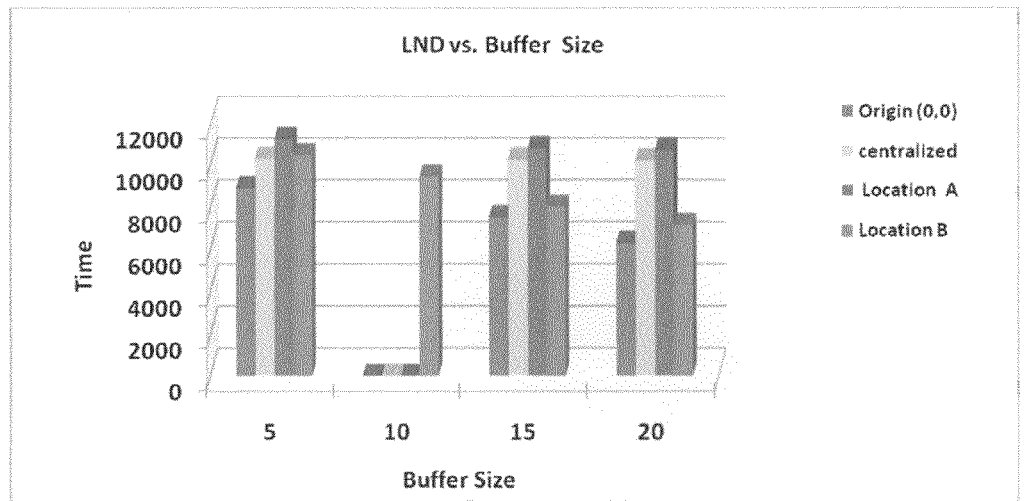
FIG. 43 shows an exemplary graph of LND vs. buffer size according to one embodiment.

FIGS. 33, 34, and 35, respectively, show how increasing buffer size typically improves throughput for all networks. FIGS. 33 and 34 show how delay and DTJ increased in networks "B" and "O", because more messages were able to reach the base station responsive to an increase in the amount of message storage capacity of intermediate/transient nodes. The same figures show a very small change in throughput for increasing buffer size from 10 to 20, which implies the CEER's efficiency is not restricted to particular amounts of data storage allocations. For all monitored networks, it is sufficient to include a realistic storage area without extra storage.

Buffer Size vs. Energy Dissipation Number of Failed Nodes, FND, BND, HND, and LND The effect of buffer size over various measures is shown in FIGS. 35 to 43. These Figs. show, for example, that there is a minimal relationship between buffer size and energy dissipation. The number of blocked messages for memory shortage arises and re-transmission operations are minimized; for this reason; its effect over energy dissipation is unpredictable.

Buffer Size vs. Storage Sharing, Duplicated Arrival, Hop Counts, and Congestion

Figure 44:
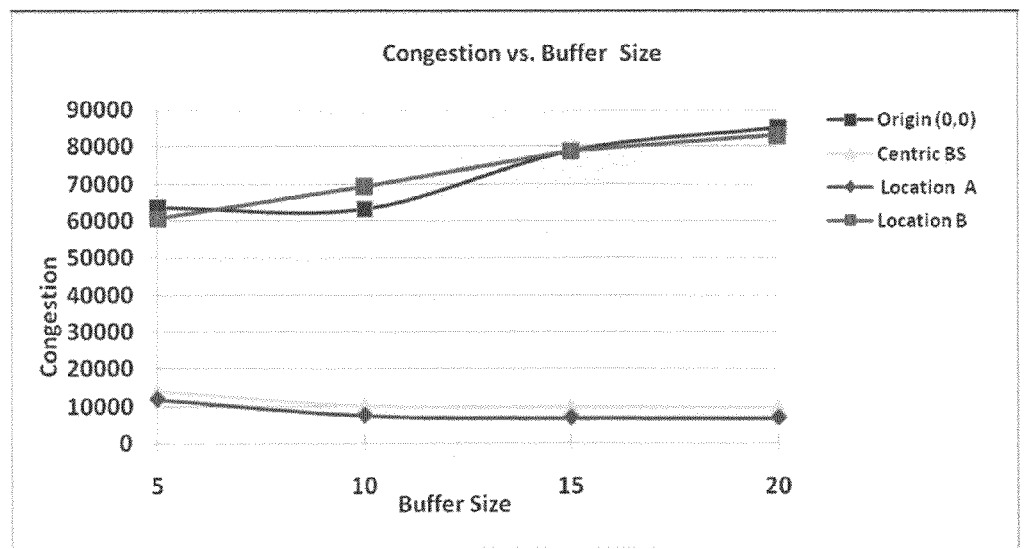
FIG. 44 shows an exemplary graph of congestion vs. buffer size according to one embodiment.
Figure 45:
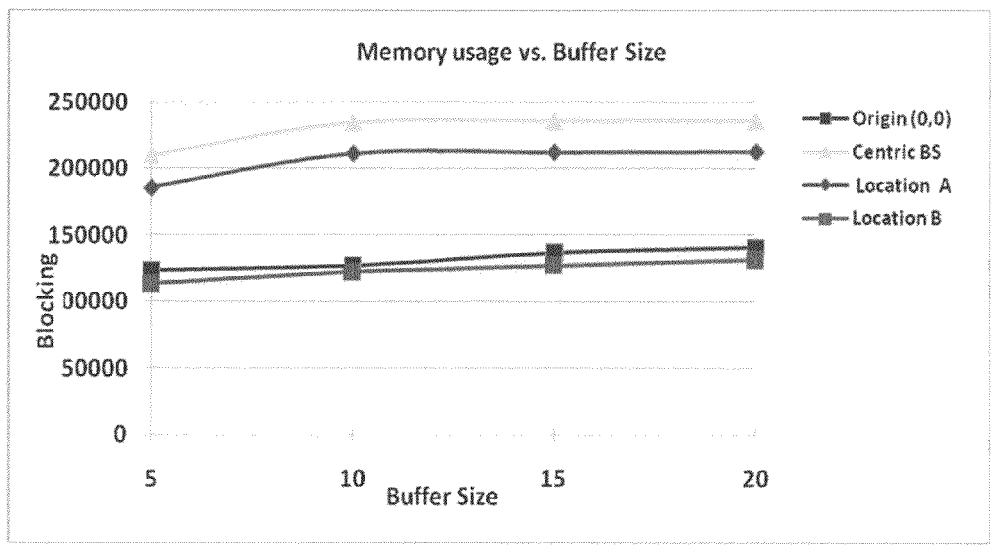
FIG. 45 shows an exemplary graph of memory usage vs. buffer size according to one embodiment.
Figure 46:
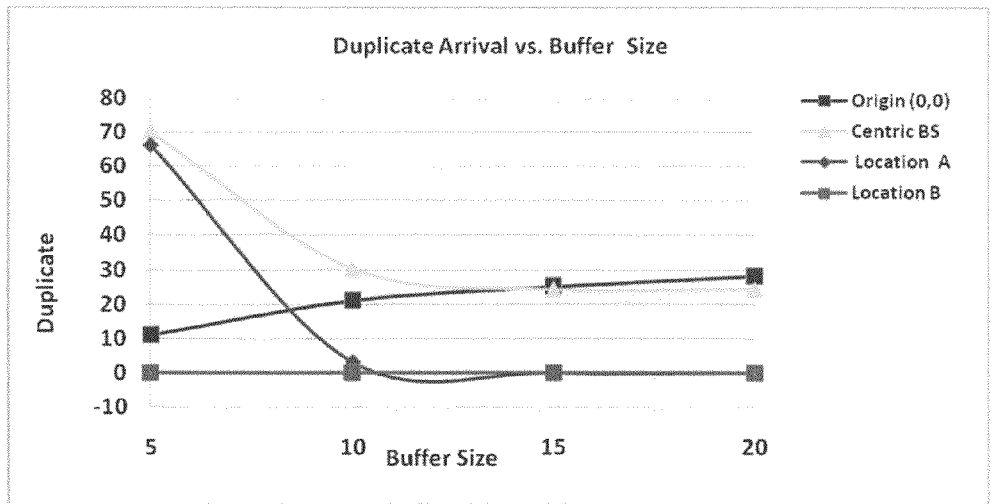
FIG. 46 shows an exemplary graph of duplicated arrival vs. buffer size according to one embodiment.

FIGS. 44, 45, and 46 show that congestion, duplicated arrival, and memory sharing is optimized with increasing buffer size.

Discussion on Buffer Size Variation

Previous sections show the improvement in performance measures while buffer size increases. However, this improvement is not proportional to buffer size. It is sufficient to include a realistic storage size and also to take the advantage of duplication factor to manage the available storage.

Buffer Size (But) and Throughput (Thro.):
Buf ∝ Throughput . . . for Buf>0 and Buf<$Buf_{Threshold}$ Buffer Size (But) and Congestion (Con):

$$Buf \propto \frac{1}{Con} \ldots \text{ for Buf} > 0 \text{ and Buf} < Buf_{Threshold}$$

Buffer Size (But) and Duplicated arrival (Dup):

$$SF \propto \frac{1}{Buf} \ldots \text{ for Buf} > 0 \text{ and Buf} < Buf_{Threshold}$$

Buffer Size (But) and Storage occupation (SS)
SF ∝ SS . . . for Buf>0 and Buf<$Buf_{Threshold}$ Varying Duplication Factor Proper utilization of the duplication factor saves memory by limiting long message storage under the premise that such messages are stored by neighboring nodes. The particular value given to the duplication factor is arbitrary, but in any event, it is carefully considered to avoid message loss and to provide appropriate memory management. Given exemplary simulation input of 40,000 simulation messages, buffer size=20, mean inter-arrival time=0.5, initial energy per node=101e+7, and $D_{max}$=10 m, exemplary results utilizing duplication factor values: 1, 2, 4, and 8, are shown in FIGS. 47-59 and the following two tables. The following two tables respectively show performance results of varying the duplication factor for networks A and C, and (the second table) performance results of varying the duplication factor for networks B and O according to one embodiment.

Duplication Factor vs. Storage Occupation, Duplicated Arrival, Hop Counts, and Congestion FIGS. 56, 57, 58, and 59 show that congestion, duplicated arrival, and memory sharing is affected by increasing duplication factor. A higher value for this factor generally increases duplicated arrival and congestion. On the other hand, such duplication factor value typically increases memory sharing.

Discussion on the Mean Inter-Arrival (MIT)

MIT has a relatively minor role related to the duplication factor in saving both memory and energy. The optimal value for duplication depends on available storage, number of nodes, and deployment. For example:

| | Base station Location | | | | | | | |
|---|---|---|---|---|---|---|---|---|
| | Random A | | | | Centric | | | |
| | Duplication Factor Value | | | | | | | |
| | 1 | 2 | 4 | 8 | 1 | 2 | 4 | 8 |
| Throughput | 7679 | 15474 | 16823 | 16825 | 6829 | 14853 | 15166 | 15157 |
| Delay | 0.00 | 14.89 | 12.99 | 11.67 | 8.63684E−05 | 15.7574 | 14.7055 | 13.1348 |
| Delay Time Jitter | 0.00 | 22.03 | 19.45 | 18.09 | 0.000010457 | 22.3649 | 19.4083 | 17.9672 |
| Total energy dissipated/initial Energy | 46% | 90% | 100% | 100% | 46% | 92% | 100% | 100% |
| No. of Died Nodes | 0 | 51 | 99 | 99 | 0 | 56 | 98 | 99 |
| FND | 0.00 | 3403.07 | 2143.93 | 2086.60 | 0 | 4053.48 | 2603.33 | 2094.26 |
| BND | 0.00 | 8071.60 | 3900.62 | 3489.31 | 0 | 7626.29 | 4486.14 | 3842.34 |
| HND | 0.00 | 19128.90 | 6027.44 | 5230.37 | 0 | 15683.6 | 6168.45 | 5170.93 |
| LND | 0 | 0 | 11584.8 | 10219.4 | 0 | 0 | 0 | 9445.87 |
| Congestion | 0 | 7686 | 11849 | 1236 | 0 | 7569 | 13714 | 1679 |
| Duplicated Arrival | 0 | 0 | 4 | 5 | 0 | 0 | 22 | 17 |
| hop count/message | 1 | 2 | 2 | 2 | 1 | 2 | 2 | 2 |
| Occupied Memory (Sum) | 4524 | 131865 | 216977 | 205257 | 2174 | 159085 | 243450 | 223808 |

| | Base station Location | | | | | | | |
|---|---|---|---|---|---|---|---|---|
| | Origin | | | | Random B | | | |
| | Duplication Factor Value | | | | | | | |
| | 1 | 2 | 4 | 8 | 1 | 2 | 4 | 8 |
| Throughput | 2379 | 4614 | 5676 | 5683 | 3198 | 4244 | 7568 | 7567 |
| Delay | 0.00009 | 9.9849 | 15.8658 | 16.1377 | 8.25E−05 | 7.68793 | 9.8359 | 10.6018 |
| Delay Time Jitter | 1.31798E−11 | 20.3929 | 36.9605 | 37.6834 | 1.39E−05 | 19.1283 | 29.9006 | 32.3445 |
| Total energy dissipated/initial Energy | 44% | 67% | 100% | 100% | 44% | 62% | 100% | 100% |
| No. of Died Nodes | 0 | 16 | 99 | 99 | 0 | 14 | 99 | 99 |
| FND | 0 | 1778.42 | 593.887 | 579.042 | 0 | 1900.16 | 584.282 | 568.292 |
| BND | 0 | 0 | 916.599 | 690.98 | 0 | 0 | 907.325 | 695.672 |
| HND | 0 | 0 | 1954.72 | 907.112 | 0 | 0 | 1907.44 | 860.213 |
| LND | 0 | 0 | 10052.3 | 4433.22 | 0 | 0 | 11343.3 | 5541.42 |
| Congestion | 0 | 8813 | 74922 | 66544 | 0 | 6728 | 74186 | 66574 |
| Duplicated Arrival | 0 | 0 | 31 | 23 | 0 | 0 | 0 | 0 |
| hop count/message | 1 | 2 | 2 | 2 | 1 | 1 | 1 | 1 |
| Occupied Memory (Sum) | 2047 | 49562 | 139594 | 121189 | 5453 | 32022 | 129203 | 112627 |

Duplication Factor Vs. Throughput Delay, and DTJ

Figure 47:
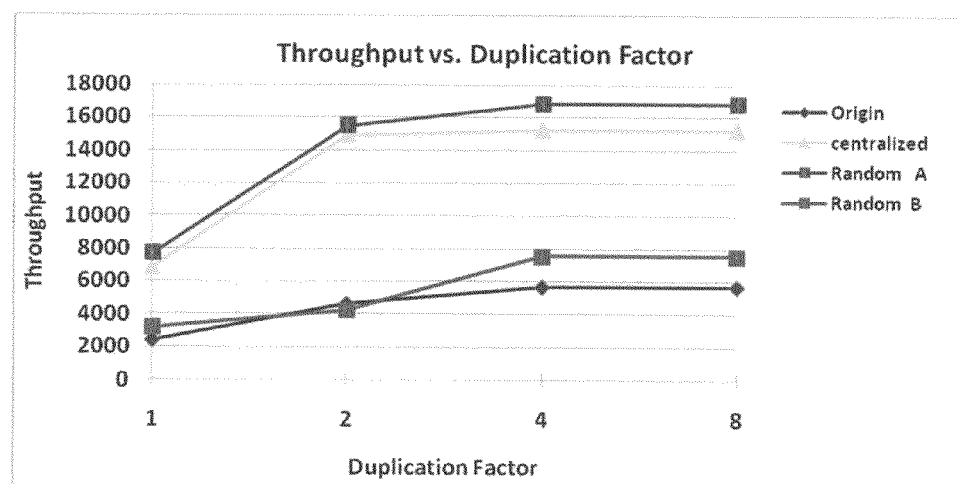
FIG. 47 shows an exemplary graph of throughput vs. duplication factor according to one embodiment.
Figure 48:
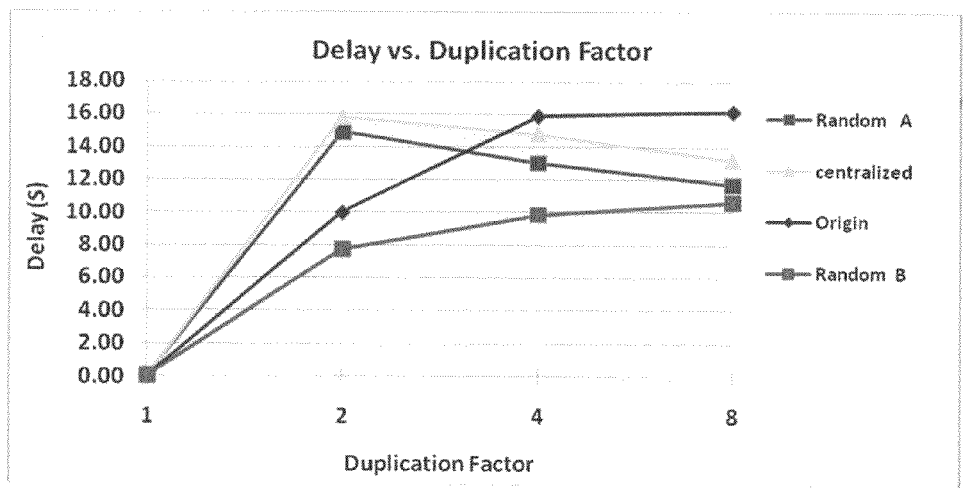
FIG. 48 shows an exemplary graph of delay vs. duplication factor according to one embodiment.
Figure 49:
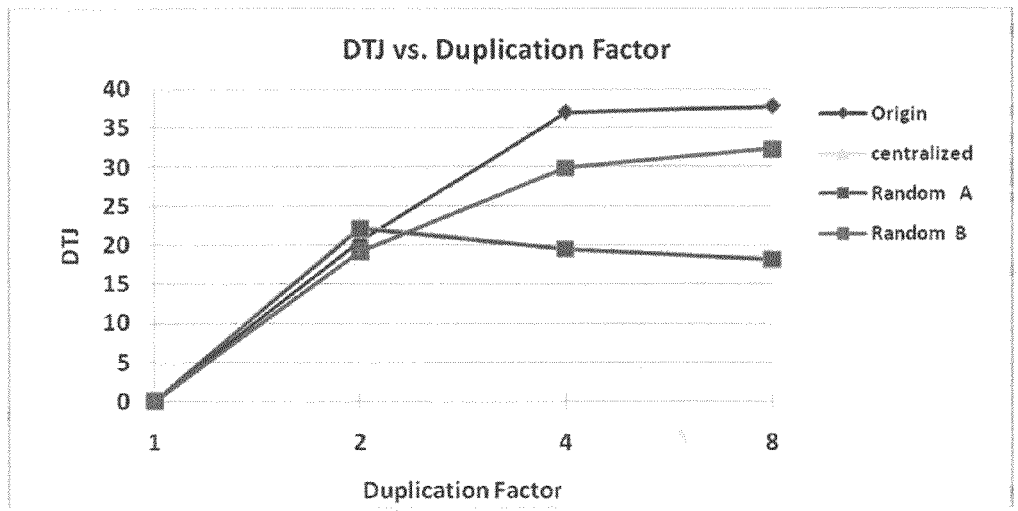
FIG. 49 shows an exemplary graph of DTJ vs. duplication factor according to one embodiment.
Figure 50:
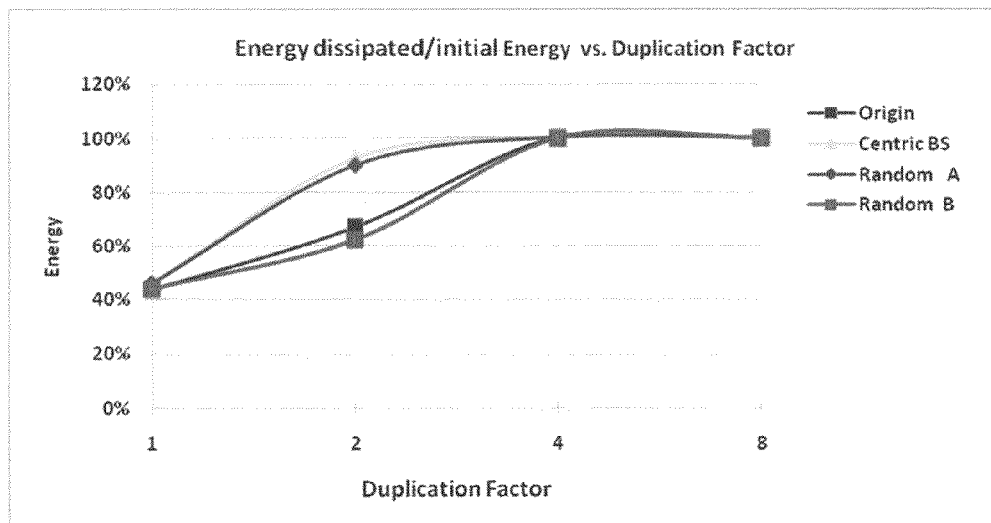
FIG. 50 shows an exemplary graph of energy dissipated/initial energy vs. duplication factor according to one embodiment.
Figure 51:
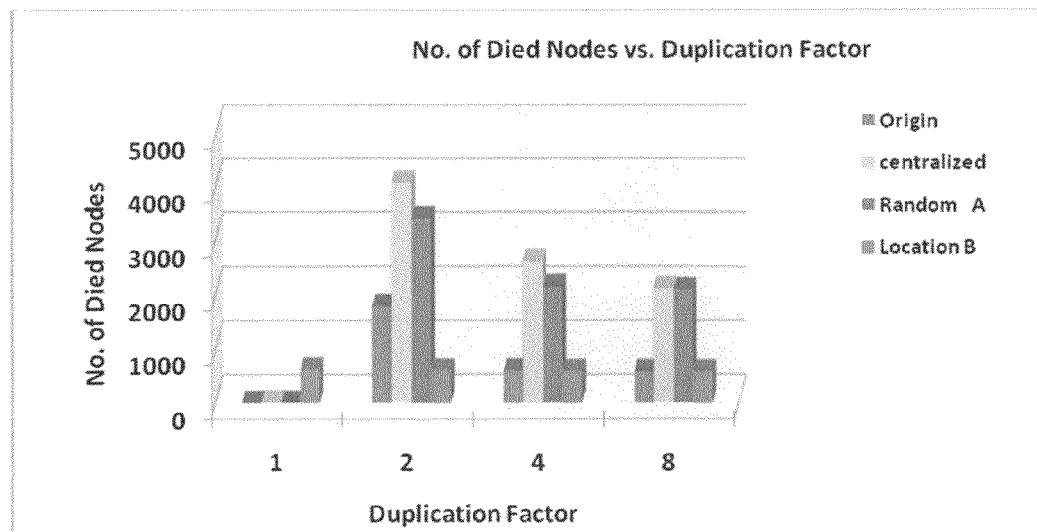
FIG. 51 shows an exemplary graph of number of failed nodes vs. duplication factor according to one embodiment.
Figure 52:
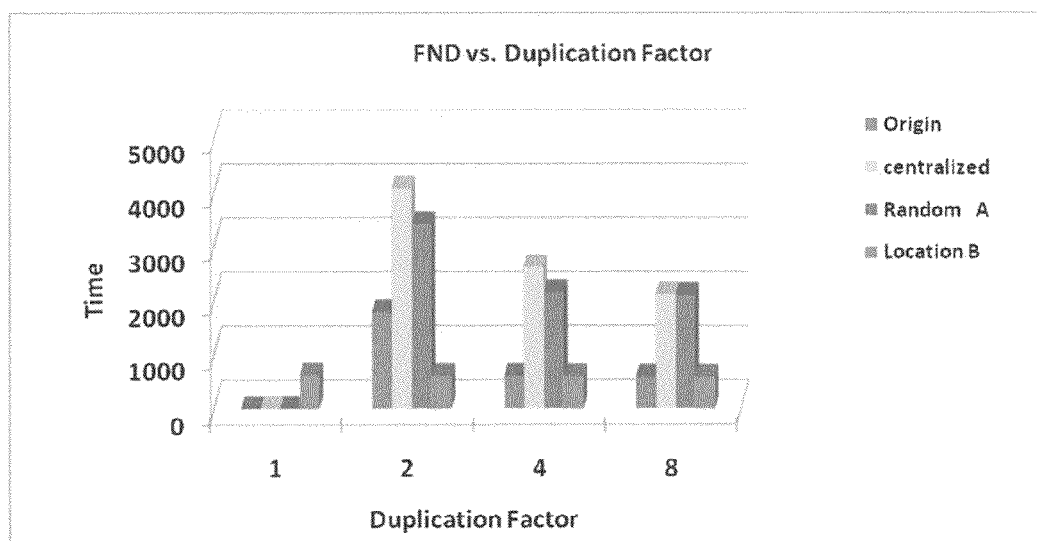
FIG. 52 shows an exemplary graph of FND vs. duplication factor according to one embodiment.
Figure 53:
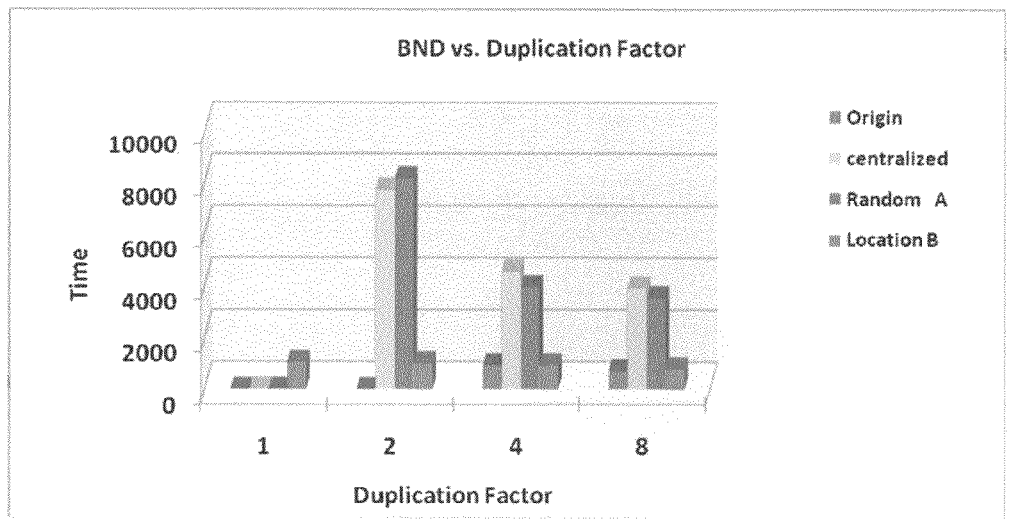
FIG. 53 shows an exemplary graph of BND vs. duplication factor according to one embodiment.
Figure 54:
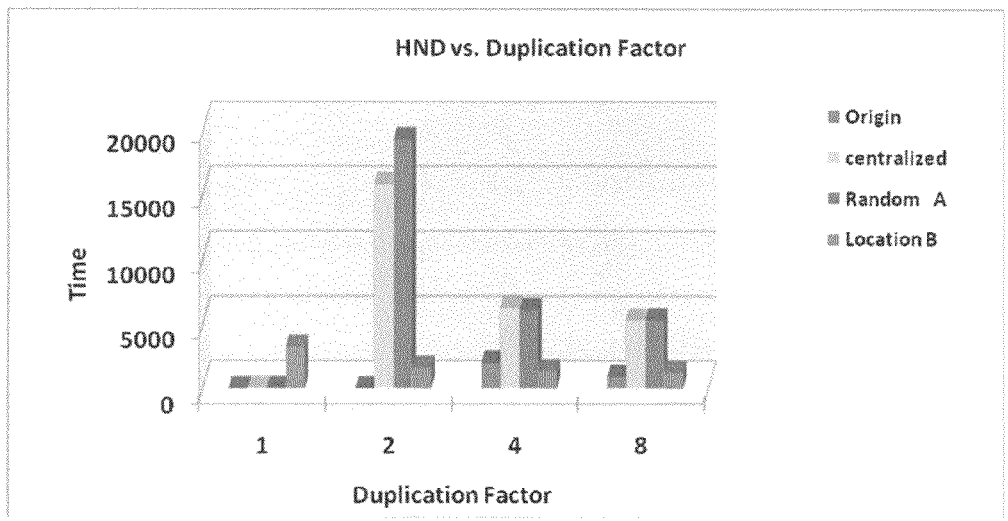
FIG. 54 shows an exemplary graph of HND vs. duplication factor according to one embodiment.
Figure 55:
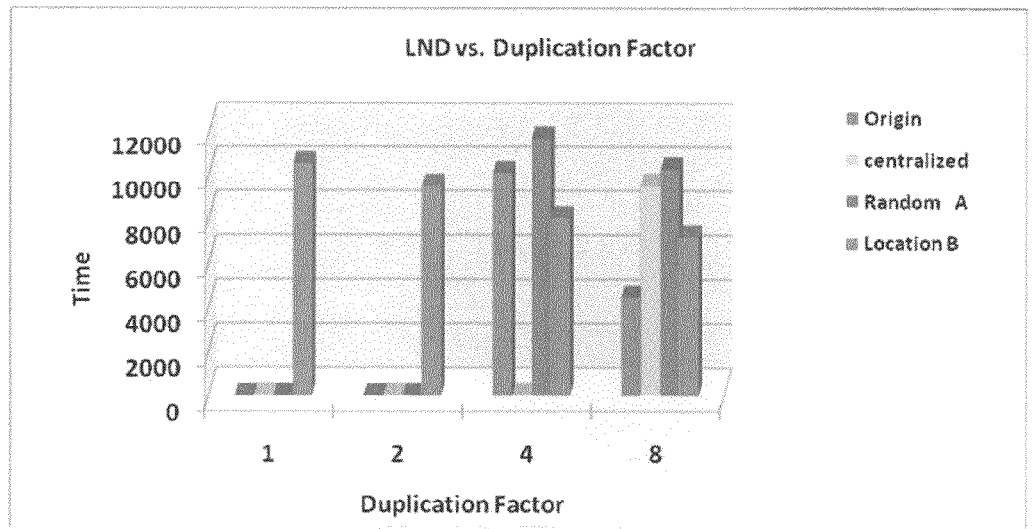
FIG. 55 shows an exemplary graph of LND vs. duplication factor according to one embodiment.
Figure 56:
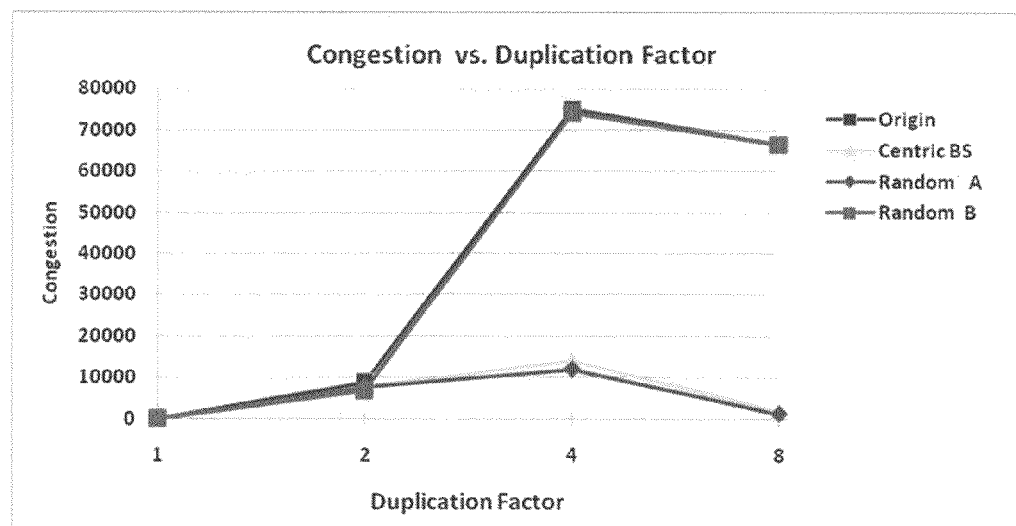
FIG. 56 shows an exemplary graph of congestion vs. duplication factor according to one embodiment.
Figure 57:
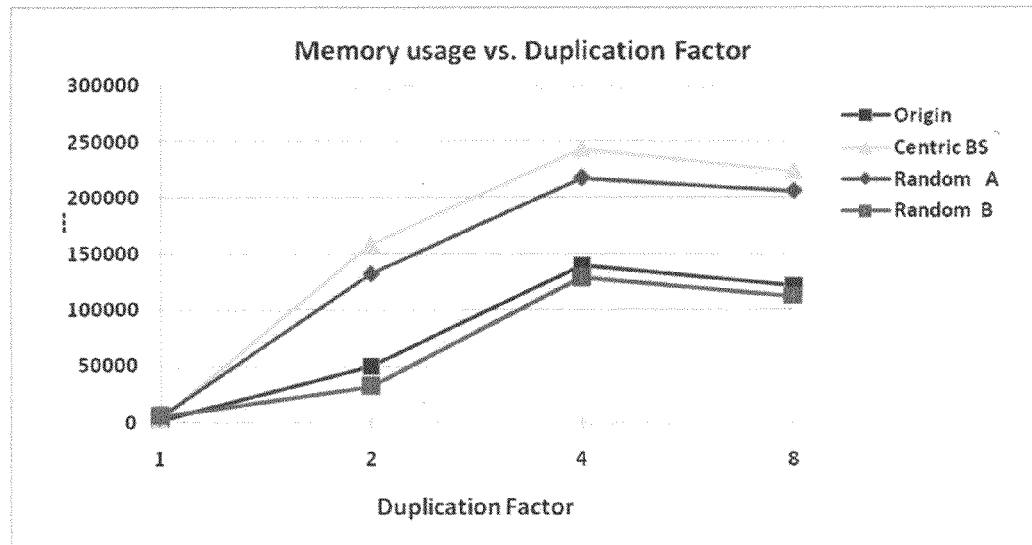
FIG. 57 shows an exemplary graph of memory usage vs. duplication factor according to one embodiment.
Figure 58:
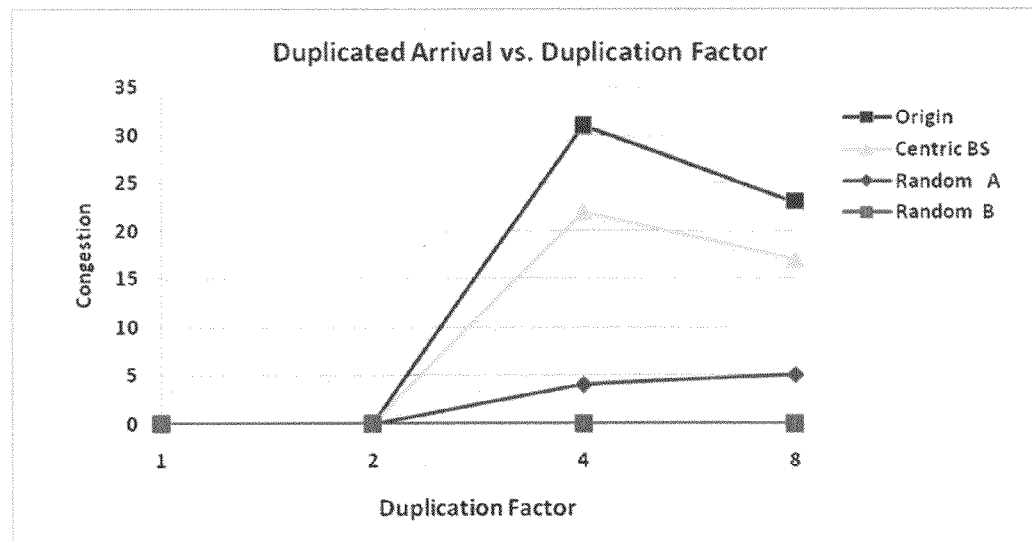
FIG. 58 shows an exemplary graph of duplicated arrival vs. duplication factor according to one embodiment.
Figure 59:
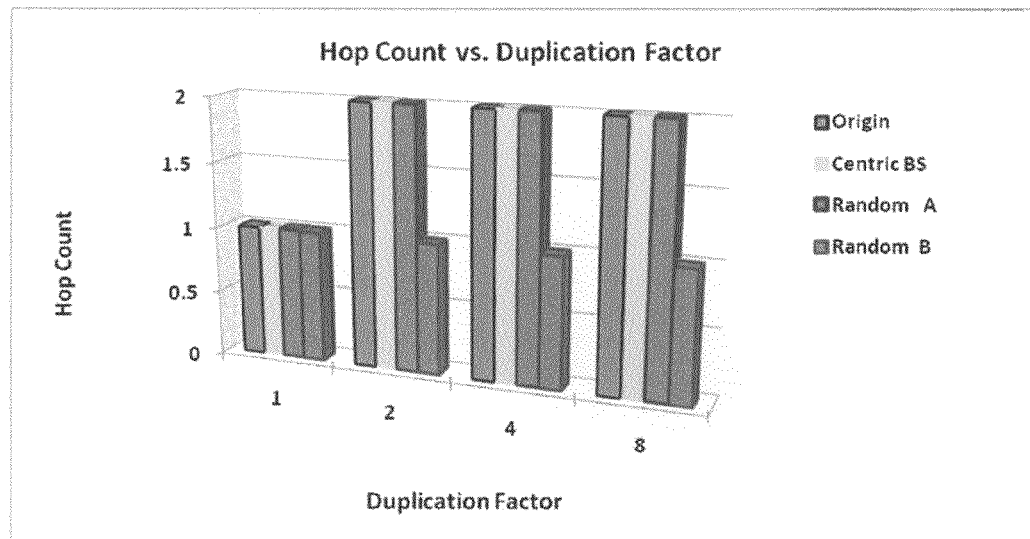
FIG. 59 shows an exemplary graph of hop count vs. duplication factor according to one embodiment.

FIGS. 47, 48, and 49 show that, in certain exemplary circumstances, increasing the duplication factor value from 1 to 4 improves throughput for substantially all networks. A small value for duplication factor typically results in message loss. Duplication Factor vs. Energy Dissipation Number of Failed Nodes, FND, BND, HND and LND The effect of duplication factor over these measures is shown in FIGS. 50 to 55. The impact of duplication factor over these measures is similar to the buffer size.

Duplication factor (DF) and Throughput (Thro.):

$DF \propto Throughout \ldots$ for $DF>0$ and $DF<DF_{Threshold}$

Duplication factor (DF) and Storage occupation (SO):

$DF \propto SS \ldots$ for $DF>0$ and $DF<DF_{Threshold}$

Varying Mean Inter-Arrival Time

Figure 60:
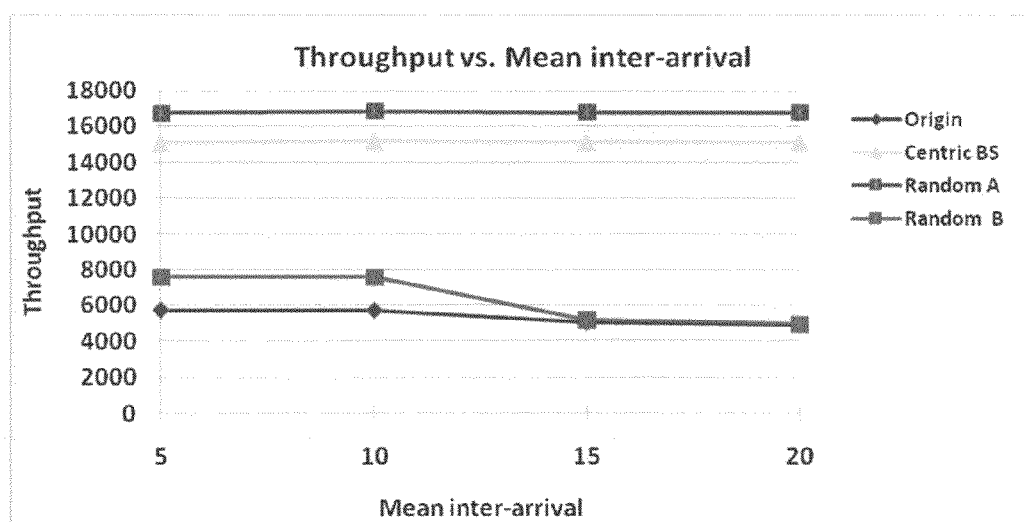
FIG. 60 shows an exemplary graph of throughput vs. mean inter-arrival time according to one embodiment.
Figure 61:
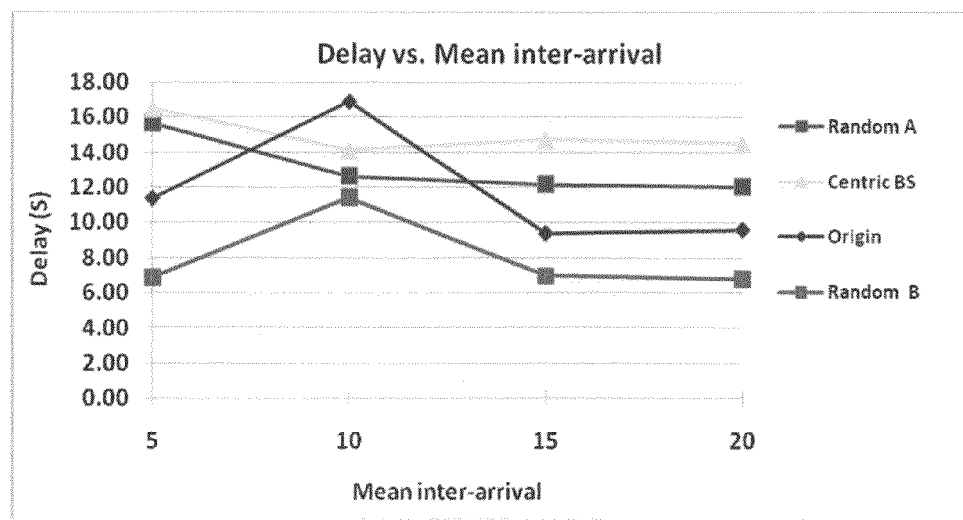
FIG. 61 shows an exemplary graph of delay vs. mean inter-arrival time according to one embodiment.
Figure 62:
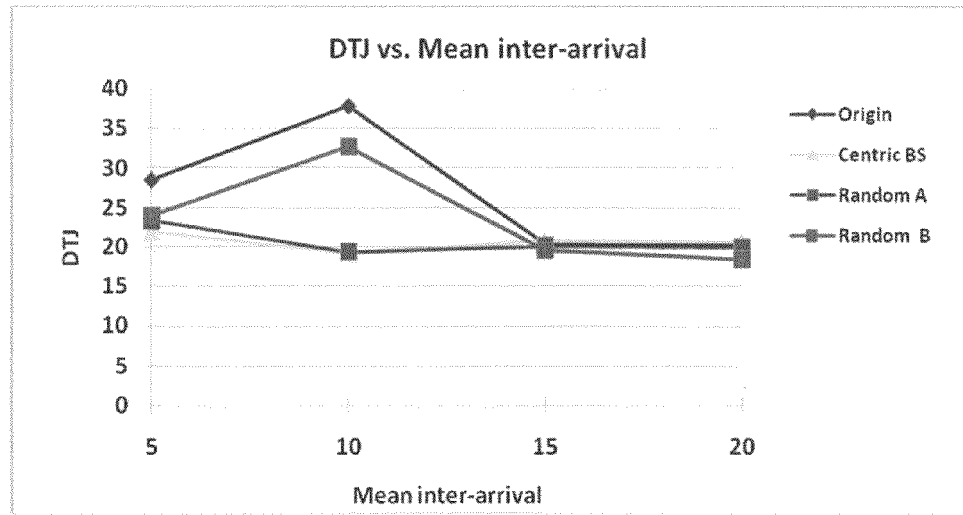
FIG. 62 shows an exemplary graph of DTJ vs. mean inter-arrival time according to one embodiment.
Figure 63:
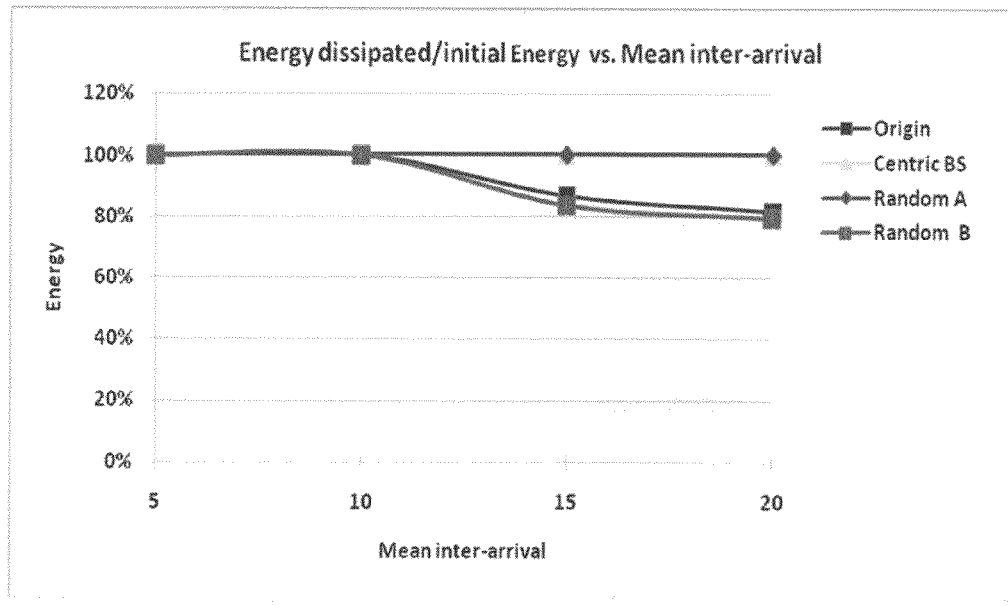
FIG. 63 shows an exemplary graph of energy dissipated/initial energy vs. mean inter-arrival time according to one embodiment.
Figure 64:
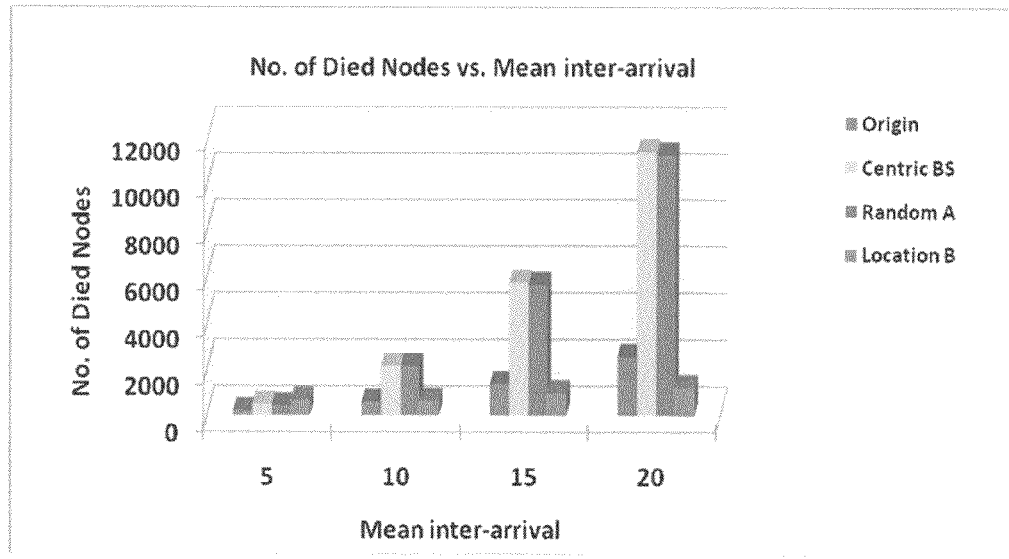
FIG. 64 shows an exemplary graph of number of failed nodes vs. mean inter-arrival time according to one embodiment.
Figure 65:
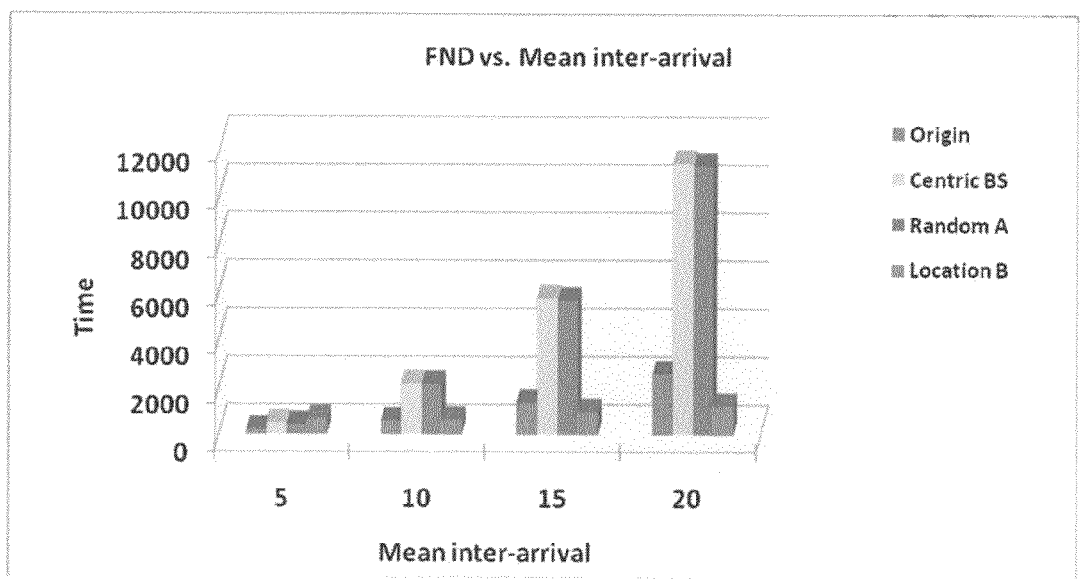
FIG. 65 shows an exemplary graph of FND vs. mean inter-arrival time according to one embodiment.
Figure 66:
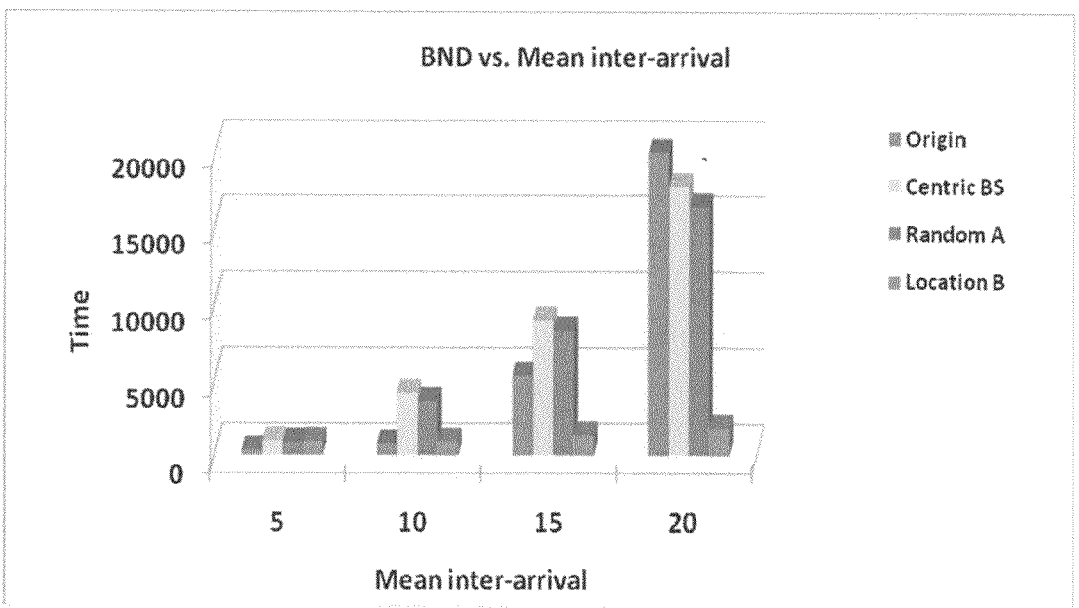
FIG. 66 shows an exemplary graph of BND vs. mean inter-arrival time according to one embodiment.
Figure 67:
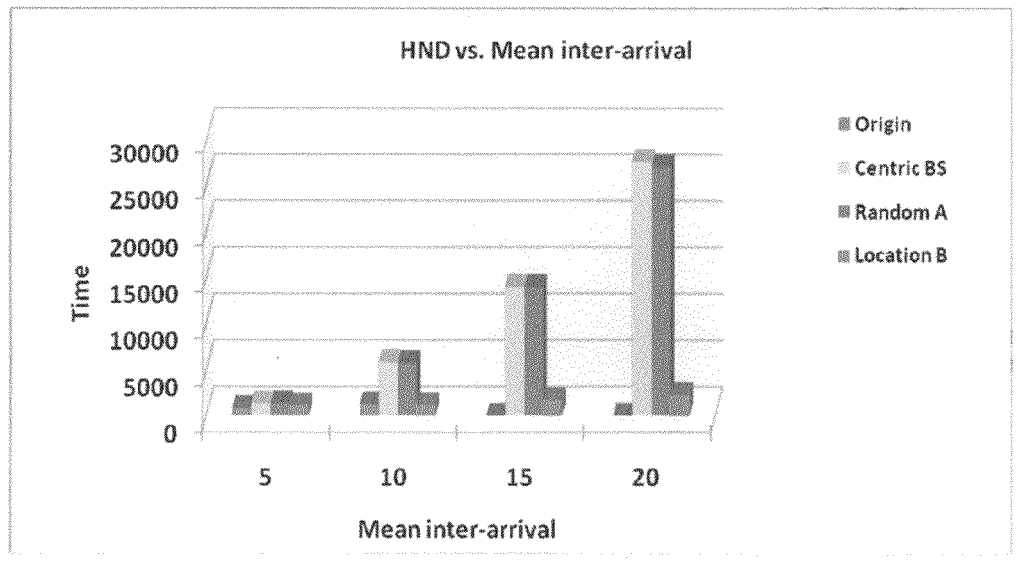
FIG. 67 shows an exemplary graph of HND vs. mean inter-arrival time according to one embodiment.
Figure 68:
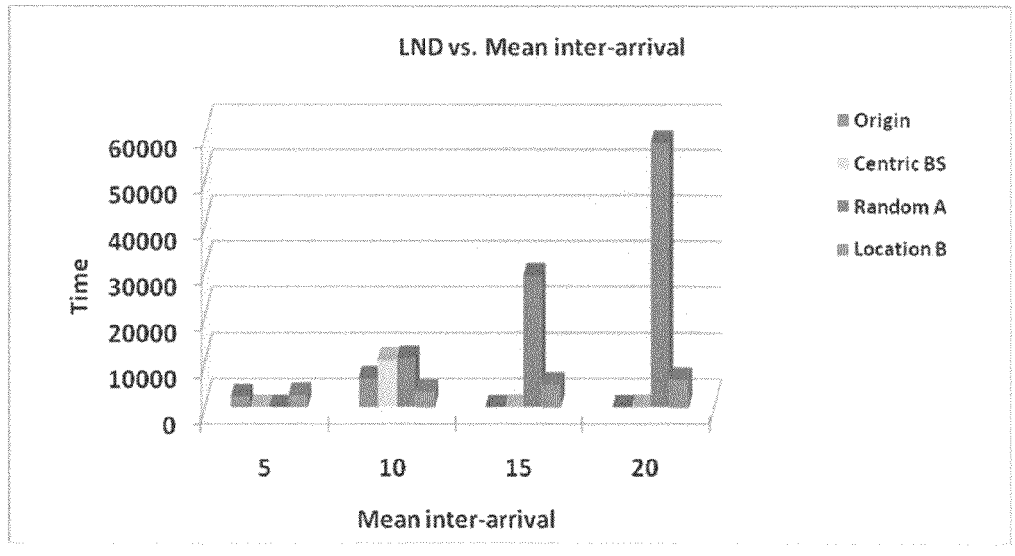
FIG. 68 shows an exemplary graph of LND vs. mean inter-arrival time according to one embodiment.
Figure 69:
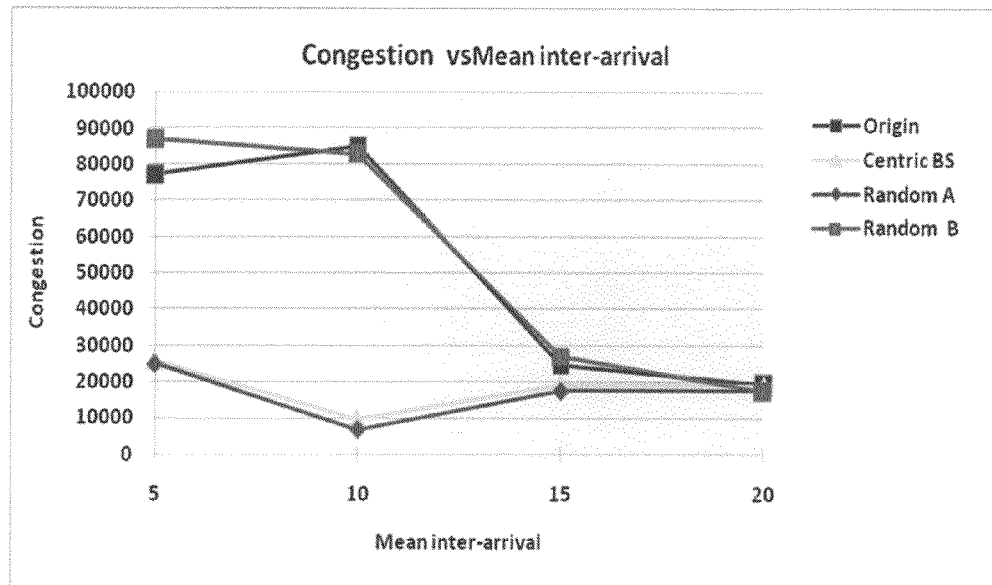
FIG. 69 shows an exemplary graph of congestion vs. mean inter-arrival time according to one embodiment.
Figure 70:
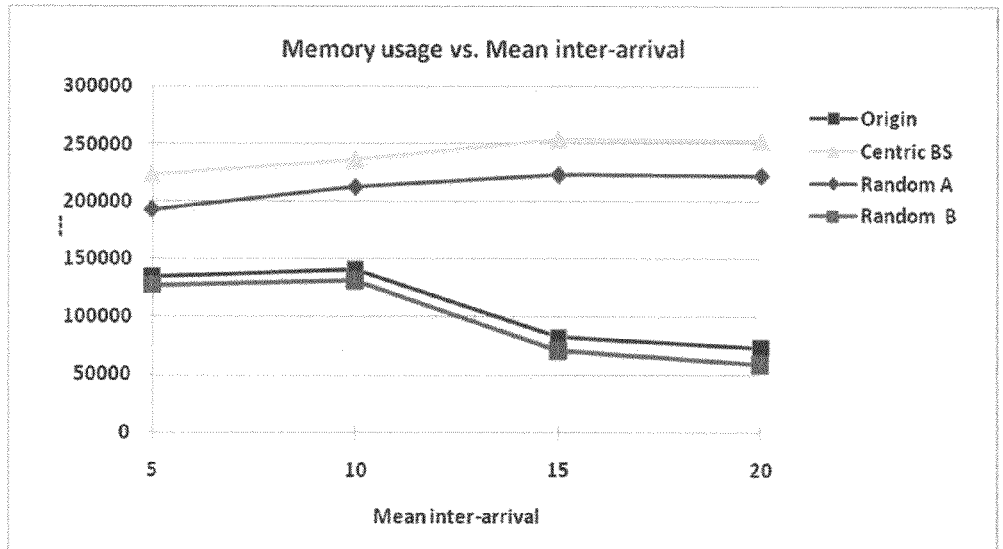
FIG. 70 shows an exemplary graph of memory usage vs. mean inter-arrival time according to one embodiment.
Figure 71:
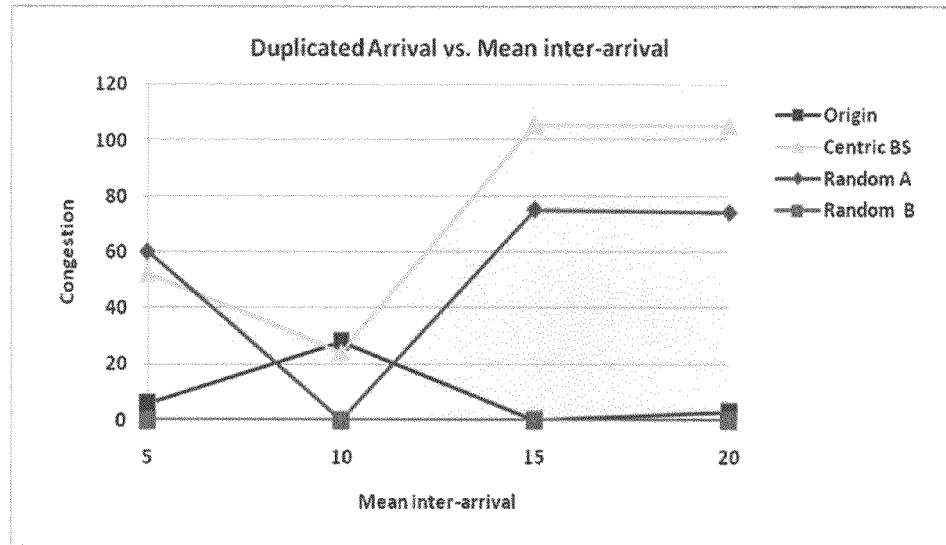
FIG. 71 shows an exemplary graph of duplicated arrival vs. mean inter-arrival time according to one embodiment.
Figure 72:
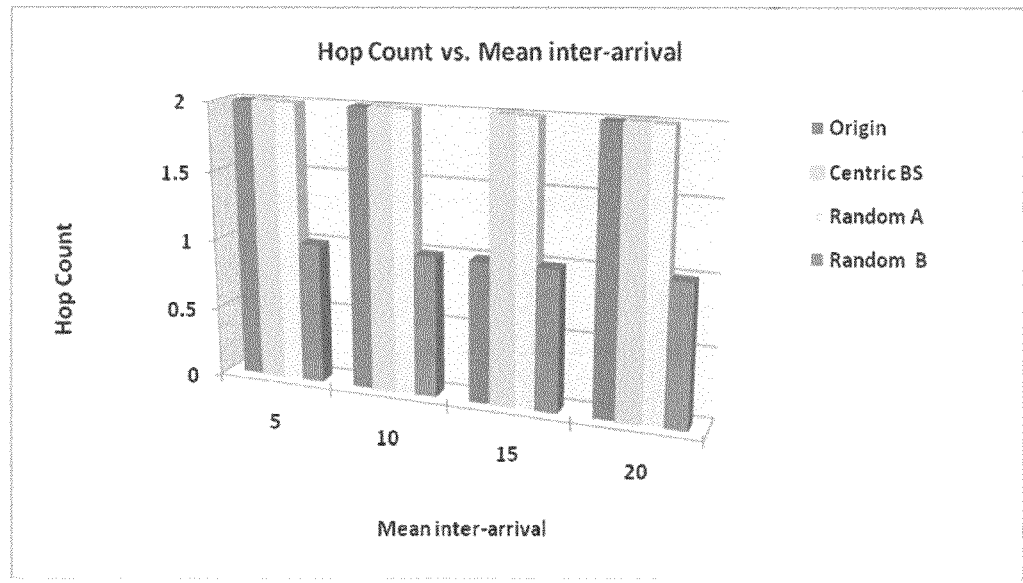
FIG. 72 shows an exemplary graph of hop count vs. mean inter-arrival time according to one embodiment.
Figure 73:
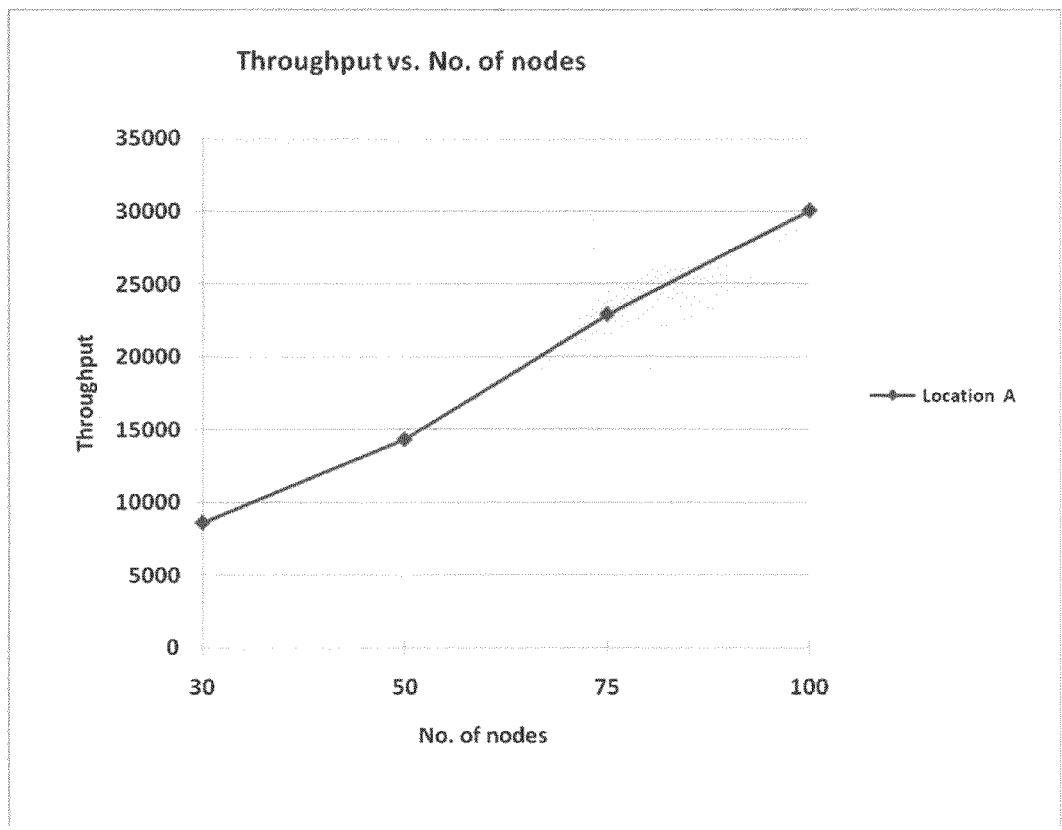
FIG. 73a-d shows an exemplary graph of throughput vs. number of nodes according to one embodiment.
Figure 73:
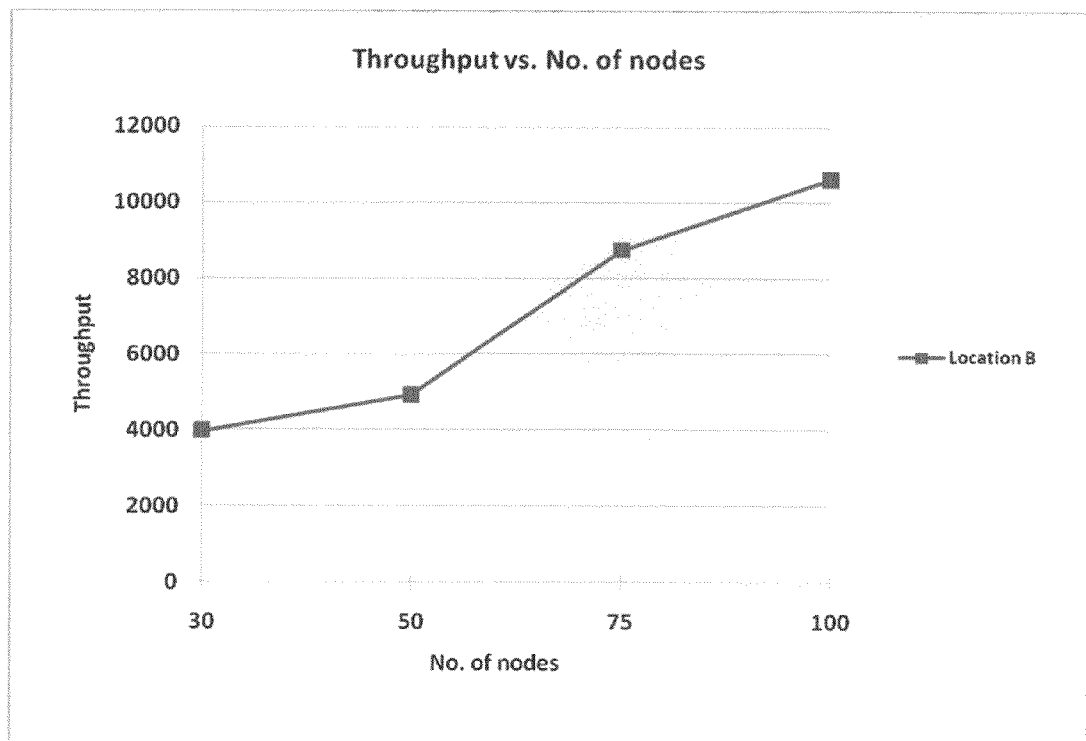
Figure 73:
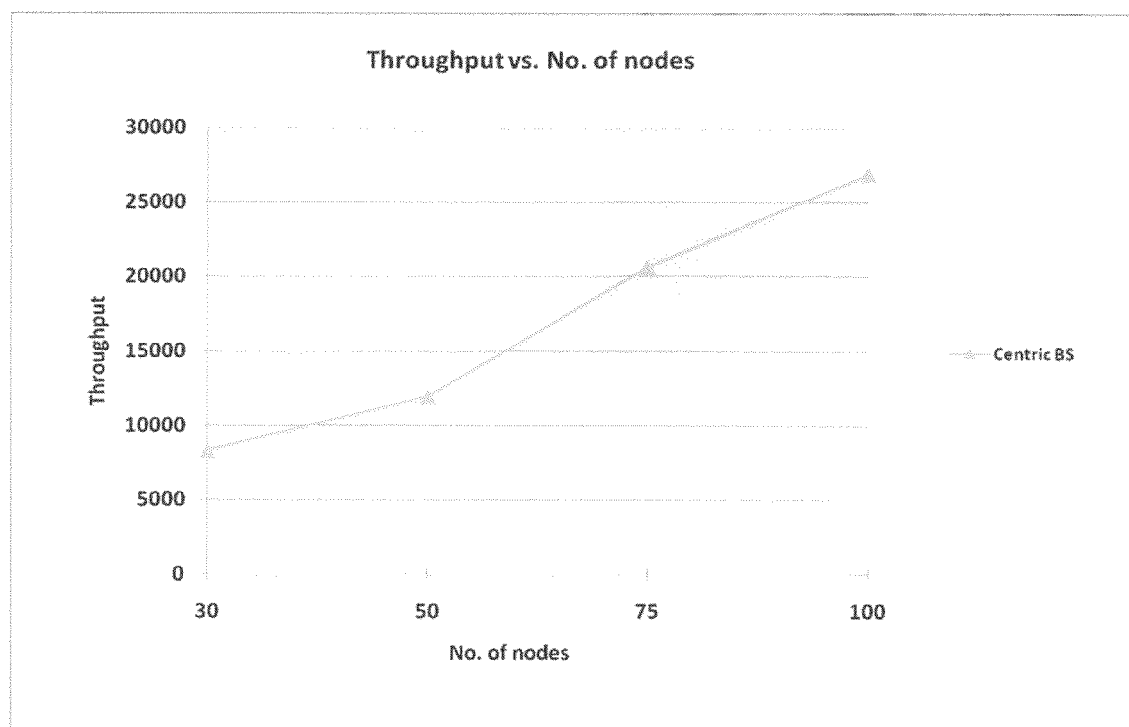
Figure 74:
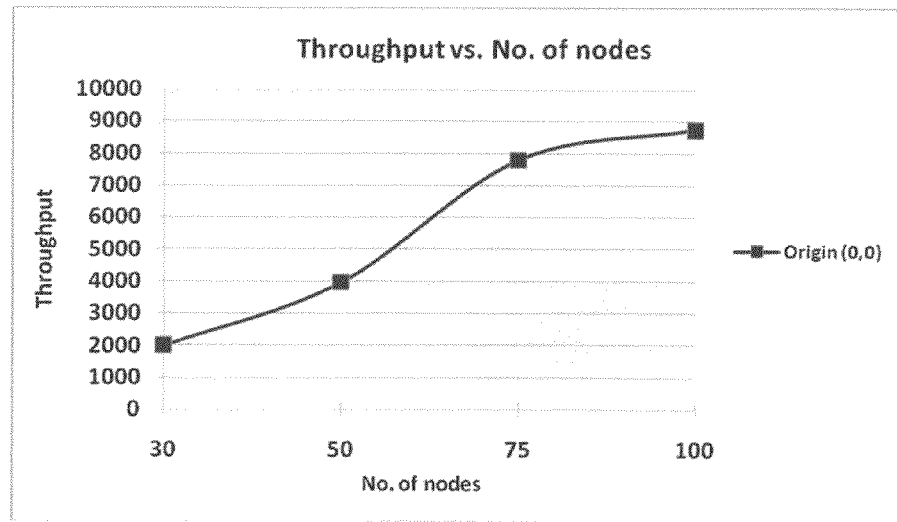
FIG. 74 shows an exemplary graph of delay vs. number of nodes according to one embodiment.
Figure 74:
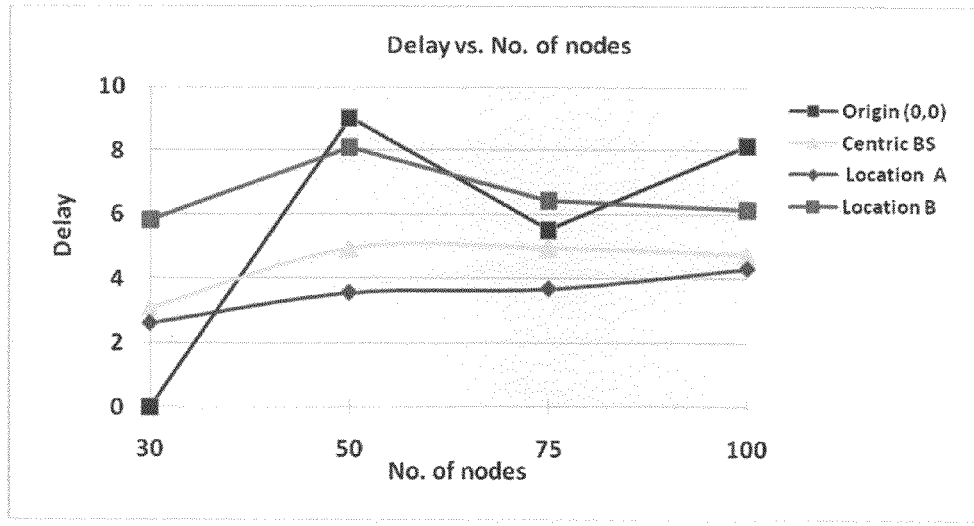
Figure 75:
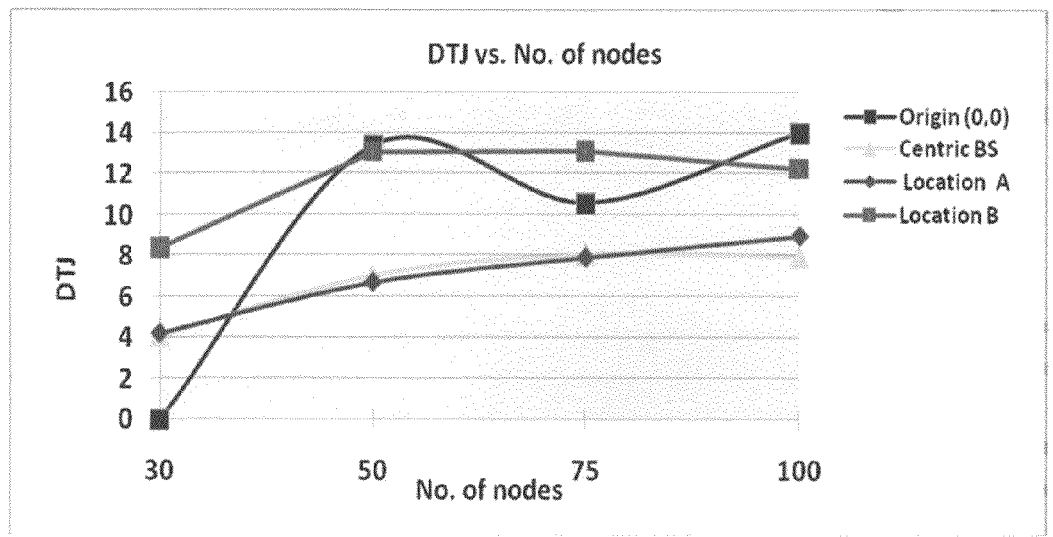
FIG. 75 shows an exemplary graph of DTJ vs. number of nodes according to one embodiment.
Figure 76:
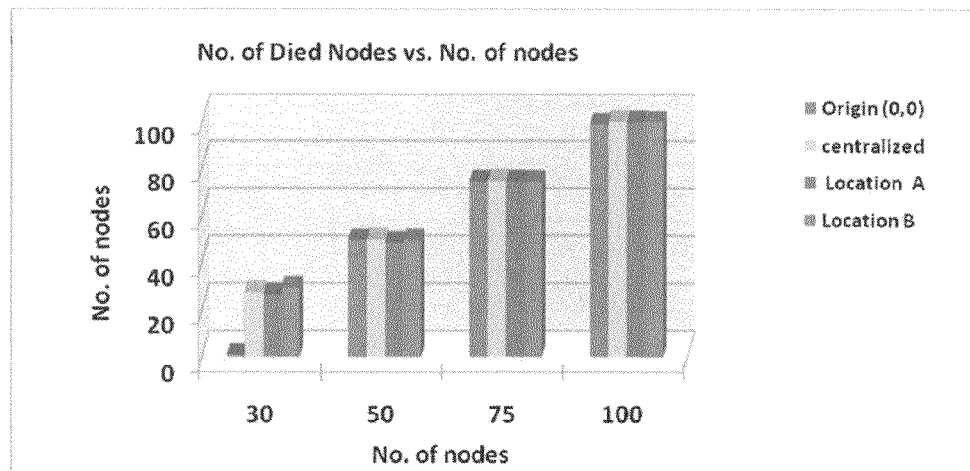
FIG. 76 shows an exemplary graph of number of failed nodes vs. number of nodes according to one embodiment.
Figure 77:
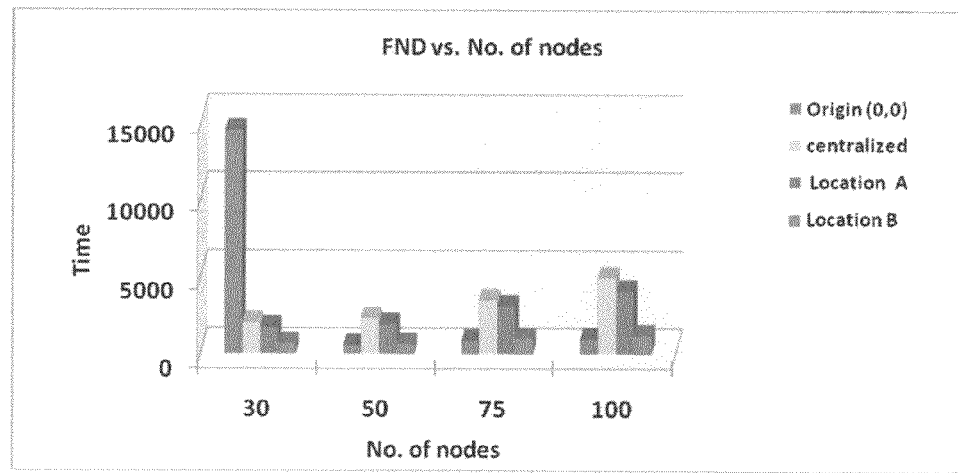
FIG. 77 shows an exemplary graph of FND vs. number of nodes according to one embodiment.
Figure 78:
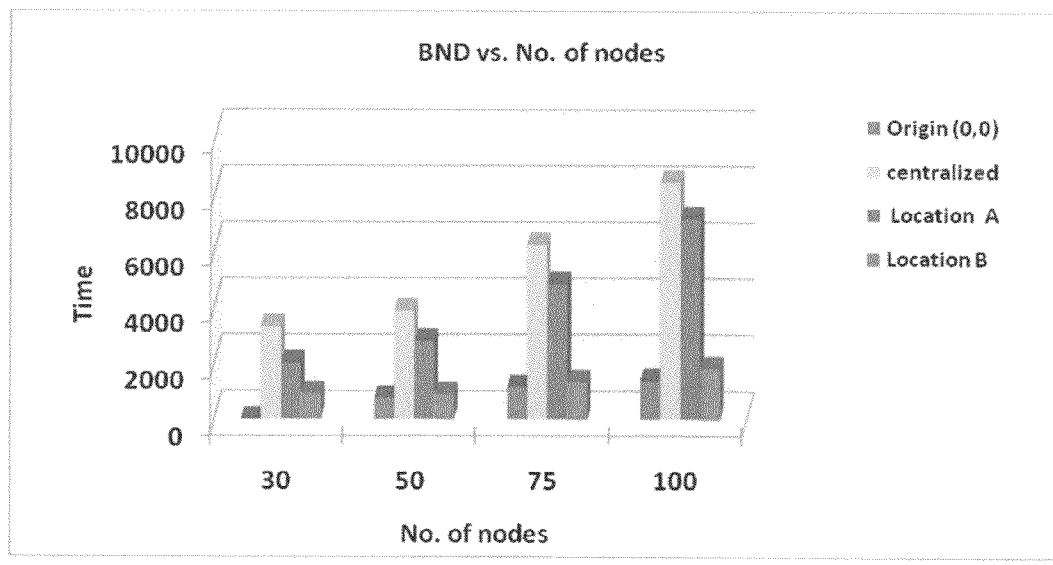
FIG. 78 shows an exemplary graph of BND vs. number of nodes according to one embodiment.
Figure 79:
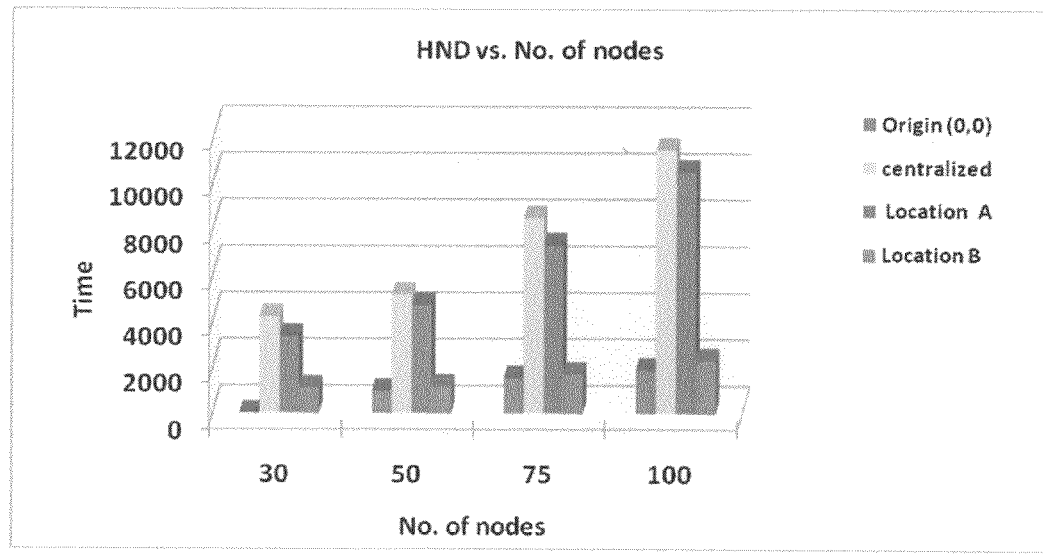
FIG. 79 shows an exemplary graph of HND vs. number of nodes according to one embodiment.
Figure 80:
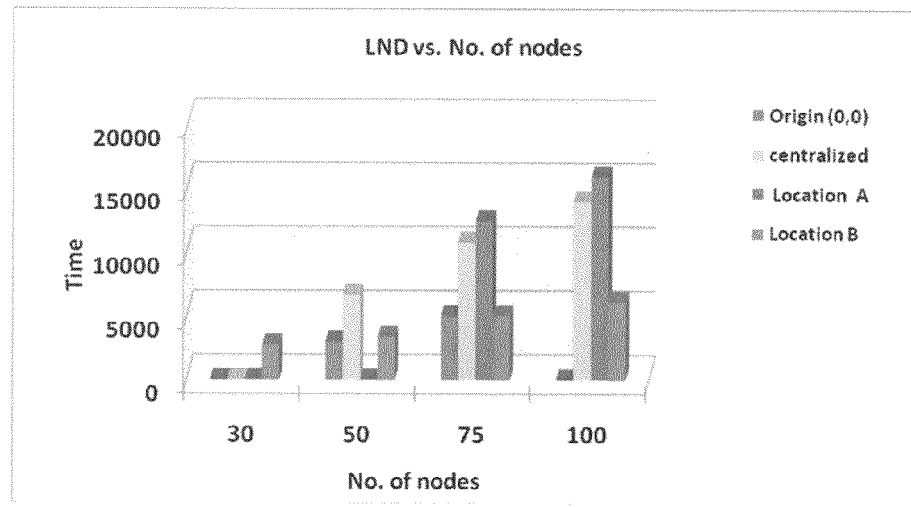
FIG. 80 shows an exemplary graph of LND vs. number of nodes according to one embodiment.
Figure 81:
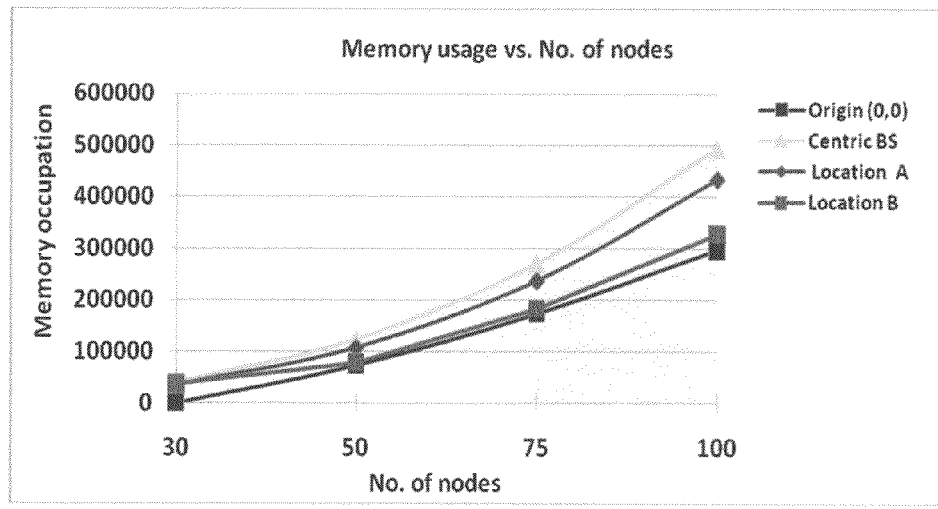
FIG. 81 shows an exemplary graph of memory usage vs. number of nodes according to one embodiment.
Figure 82:
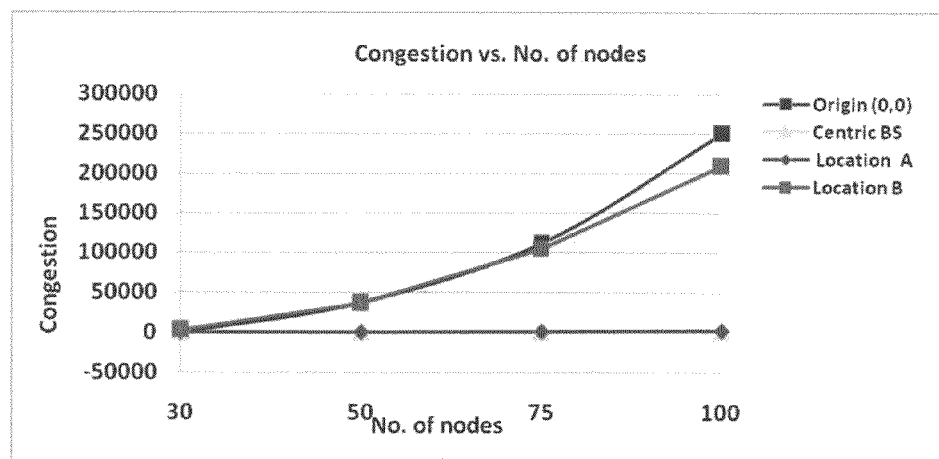
FIG. 82 shows an exemplary graph of congestion vs. number of nodes according to one embodiment.
Figure 83:
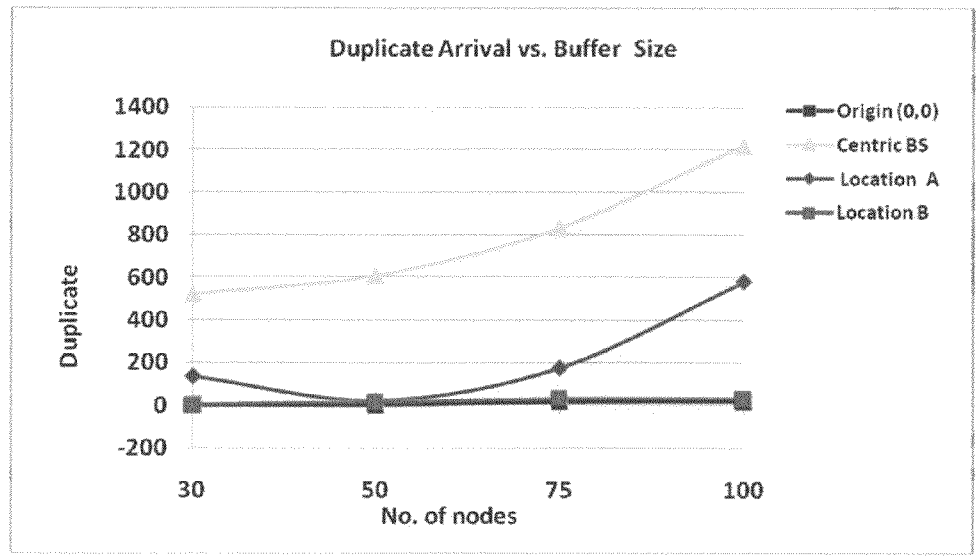
FIG. 83 shows an exemplary graph of duplicated arrival vs. number of nodes according to one embodiment.

The inter-arrival time is an environment-dependent variable. In an exemplary simulation input of 40,000 simulation messages, buffer size=20, initial energy per node=101e+7, duplicate factor=5, and $D_{max}$=10 m, exemplary results for mean inter-arrival values include: 0.1, 0.5, 1, and 2, as illustrated in FIGS. 60-62 and the following two tables. The following two tables respectively show (first table) performance results of varying mean inter-arrival time for networks A and C, and (second table) performance results of varying mean inter-arrival time for networks B and O according to one embodiment.

Mean Inter-Arrival Time vs. Storage Occupation, Duplicated Arrival, Hop Counts, And Congestion FIGS. 69, 70, 71, and 72 show that congestion, duplicated arrival, and memory sharing is affected by increasing mean inter-arrival time. A higher value for MIT allows more messages to be stored in key nodes (within base station distance) and for this utilizing memory is decreased, where duplicated arrival and congestion increase.

|  | Base station Location | | | | | | | |
|---|---|---|---|---|---|---|---|---|
|  | Random A | | | | Centric | | | |
|  | Mean inter-arrival time | | | | | | | |
|  | 0.1 | 0.5 | 1 | 2 | 0.1 | 0.5 | 1 | 2 |
| Throughput | 16699 | 16828 | 16749 | 16749 | 15059 | 15147 | 15100 | 15096 |
| Delay | 15.62 | 12.60 | 12.17 | 12.01 | 16.4276 | 14.0662 | 14.6814 | 14.4741 |
| Delay Time Jitter | 23.33 | 19.30 | 20.09 | 19.90 | 21.8489 | 19.1394 | 20.6659 | 20.6058 |
| Total energy dissipated/initial Energy | 100% | 100% | 100% | 100% | 100% | 100% | 100% | 100% |
| No. of Died Nodes | 98 | 99 | 99 | 99 | 98 | 99 | 98 | 98 |
| FND | 421.45 | 2094.26 | 5590.70 | 11172.50 | 476.586 | 2094.39 | 5660.58 | 11293.9 |
| BND | 861.32 | 3565.95 | 8190.21 | 16331.50 | 939.155 | 4098.71 | 8826.3 | 17627.7 |
| HND | 1328.05 | 5642.78 | 13818.20 | 26749.30 | 1310.64 | 5708.44 | 13801.7 | 27261.4 |
| LND | 0 | 10722.4 | 28595.9 | 57699.6 | 0 | 10208.6 | 0 | 0 |
| Congestion | 24910 | 6699 | 17418 | 17428 | 25738 | 9468 | 19162 | 18972 |
| Duplicated Arrival | 60 | 0 | 75 | 74 | 52 | 24 | 105 | 105 |
| hop count/message | 2 | 2 | 2 | 2 | 2 | 2 | 2 | 2 |
| Occupied Memory (Sum) | 192689 | 212247 | 222853 | 222208 | 223155 | 235809 | 253356 | 252455 |

|  | Base station Location | | | | | | | |
|---|---|---|---|---|---|---|---|---|
|  | Origin | | | | Random B | | | |
|  | Mean inter-arrival time | | | | | | | |
|  | 0.1 | 0.5 | 1 | 2 | 0.1 | 0.5 | 1 | 2 |
| Throughput | 5704 | 5677 | 5020 | 4894 | 7568 | 7567 | 5157 | 4937 |
| Delay | 11.3586 | 16.8269 | 9.38026 | 9.58845 | 6.823 | 11.3982 | 6.94545 | 6.75798 |
| Delay Time Jitter | 28.4089 | 37.7896 | 20.2107 | 20.1062 | 23.9872 | 32.673 | 19.524 | 18.3907 |
| Total energy dissipated/initial Energy | 100% | 100% | 87% | 81% | 100% | 100% | 84% | 80% |
| No. of Died Nodes | 99 | 99 | 41 | 35 | 99 | 99 | 37 | 31 |
| FND | 215.049 | 580.26 | 1342.24 | 2522.64 | 213.898 | 575.872 | 1321.78 | 2592.99 |
| BND | 341.67 | 779.148 | 5259.94 | 19926 | 345.367 | 769.494 | 4205.4 | 22036.4 |
| HND | 853.407 | 1234.54 | 0 | 0 | 826.817 | 1213.54 | 0 | 0 |
| LND | 2406.44 | 6300.32 | 0 | 0 | 2529.46 | 7161.32 | 0 | 0 |
| Congestion | 77036 | 84943 | 24640 | 19272 | 87178 | 83002 | 26844 | 17419 |
| Duplicated Arrival | 6 | 28 | 0 | 3 | 0 | 0 | 0 | 0 |
| hop count/message | 2 | 2 | 1 | 2 | 1 | 1 | 1 | 1 |
| Occupied Memory (Sum) | 134246 | 140212 | 81581 | 72215 | 127462 | 131473 | 70678 | 59077 |

Mean Inter-Arrival Time Vs. Throughput Delay, and DTJ

FIGS. 60, 61, and 62 show that increasing mean inter-arrival time (MIT) value from 0.1 to 2 typically improves throughput for all networks, especially for networks "B" and "O." However, this effect is relatively small, as compared to exemplary impact on data throughput as a result of utilizing other factors.

Mean Inter-Arrival Time vs. Energy Dissipation, Number Of Failed Nodes, FND, BND, HND, And LND The effect of these measures is shown in FIGS. 63 to 68. Increasing MIT increases the values of these measures.

Discussion on the Variation of Mean Inter-Arrival

Previous sections show that MIT has a small role on performance measures compared to other factors. Its value is not to be manipulated as it is controlled by the sensed environment. A proportional relationship with MIT was determined.

Mean inter-arrival time (MIT) and network lifetime (LT.):
MIT∝LT . . . for MIT>0 and MIT<∞

Varying Number of Nodes

Network size is determined by number of nodes deployment area. CEER was examined with different number of nodes within network. Results were extracted for a network size of 30, 50, 75 and 100 nodes. Results are shown in FIGS. 73*a-d* and 74, and the following two tables. The following two tables respectively show (first table) performance results of varying number of nodes for network A and C, and (table 2) performance results of varying number of nodes for network B and O, according to one embodiment.

size (scalability) and traffic load. This last section shows that CEER is not affected negatively to the variation in network size. The following proportional with number of nodes in network was obtained:

| | Base station Location | | | | | | | |
|---|---|---|---|---|---|---|---|---|
| | Random A | | | | Centric | | | |
| | No. of nodes | | | | | | | |
| | 30 | 50 | 75 | 100 | 30 | 50 | 75 | 100 |
| Throughput | 8603 | 14278 | 22901 | 30010 | 8240 | 11864 | 20549 | 26806 |
| Delay | 2.62 | 3.55 | 3.68 | 4.31 | 3.07972 | 4.92181 | 4.92967 | 4.73355 |
| Delay Time Jitter | 4.23 | 6.70 | 7.92 | 8.97 | 4.05343 | 6.96269 | 8.01306 | 7.90716 |
| Total energy dissipated/initial Energy | 93% | 100% | 100% | 100% | 93% | 100% | 100% | 100% |
| No. of Died Nodes | 26 | 48 | 74 | 99 | 27 | 49 | 74 | 99 |
| FND | 1693.53 | 1911.10 | 3044.03 | 4014.72 | 1990.23 | 2245.77 | 3399.11 | 4845.97 |
| BND | 1996.52 | 2762.72 | 4794.98 | 7109.00 | 3269.51 | 3824.13 | 6174.44 | 8391.61 |
| HND | 3293.81 | 4654.72 | 7237.51 | 10375.70 | 4123.97 | 5077.81 | 8379.96 | 11328.8 |
| LND | 0 | 0 | 12369.2 | 15830.9 | 0 | 6574.04 | 10640.8 | 13872.7 |
| Congestion | 0 | 83 | 756 | 1970 | 0 | 159 | 664 | 1068 |
| Duplicated Arrival | 135 | 19 | 174 | 577 | 518 | 605 | 829 | 1217 |
| hop count/message | 1 | 1 | 1 | 1 | 2 | 2 | 2 | 2 |
| Occupied Memory (Sum) | 33708 | 105934 | 236620 | 432700 | 38807 | 121814 | 269696 | 492488 |

| | Base station Location | | | | | | | |
|---|---|---|---|---|---|---|---|---|
| | Origin | | | | Random B | | | |
| | No. of nodes | | | | | | | |
| | 30 | 50 | 75 | 100 | 30 | 50 | 75 | 100 |
| Throughput | 1988 | 3956 | 7778 | 8723 | 3970 | 4928 | 8740 | 10625 |
| Delay | 0.00009 | 9.01362 | 5.50506 | 8.13427 | 5.81345 | 8.09174 | 6.42461 | 6.13383 |
| Delay Time Jitter | 1.58E-11 | 13.3798 | 10.5681 | 14.007 | 8.37078 | 13.0956 | 13.1421 | 12.2799 |
| Total energy dissipated/initial Energy | 7% | 100% | 100% | 100% | 100% | 100% | 100% | 100% |
| No. of Died Nodes | 1 | 49 | 74 | 98 | 29 | 49 | 74 | 99 |
| FND | 14297.9 | 562.133 | 851.269 | 981.803 | 659.018 | 620.91 | 972.499 | 1199.78 |
| BND | 0 | 762.143 | 1143.97 | 1378.63 | 902.334 | 896.211 | 1325.52 | 1805.57 |
| HND | 0 | 970.418 | 1534.4 | 1882.66 | 1100.28 | 1170.37 | 1705.16 | 2293.89 |
| LND | 0 | 2945 | 4969.98 | 0 | 2708.32 | 3345.89 | 4969.21 | 6074.36 |
| Congestion | 0 | 37280 | 111420 | 250387 | 3037 | 36446 | 104448 | 210080 |
| Duplicated Arrival | 0 | 0 | 14 | 17 | 0 | 13 | 30 | 28 |
| hop count/message | 1 | 2 | 1 | 2 | 2 | 2 | 2 | 2 |
| Occupied Memory (Sum) | 0 | 73155 | 172880 | 296463 | 36503 | 77528 | 181838 | 327554 |

Number of Nodes vs. Throughput Delay, and DTJ

FIGS. 73a-d, 74, and 75, show that increasing the number of nodes in a network improves throughput for all networks as expected. However, it doesn't have significant affect on delay and DTJ.

Number of Nodes vs. Energy Dissipation, Number of Failed Nodes, FND, BND, HND, and LND The effect over these measures is shown in FIGS. 76 to 80. Increasing the number of nodes in a network maximizes network lifetime and also increases the values of all these measures.

Number of Nodes vs. Storage Occupation Duplicated Arrival Hop Count, and Congestion FIGS. 81, 82, 83, and 84 show that congestion, duplicated arrival, and memory sharing is affected by increasing the number of nodes in a network. Introducing more number of nodes allows more messages to be stored and, thus, more memory occupation. Also, the probability of conjunction and duplicated arrival are also increased.

Discussion on the Variation of Number of Nodes

One of the most important features required in any routing protocol is flexibility to accommodate changes in network number of nodes (NN) and Throughput (Thr.):
$NN \propto Thr$ ... for $NN>0$ and $NN<\infty$
number of nodes (NN) and network lifetime (LT.):
$NN \propto LT$ ... for $NN>0$ and $NN<\infty$
number of nodes (NN) and storage occupation (SO):
$NN \propto SO$ ... for $NN>0$ and $NN<\infty$

CONCLUSION

Although the above sections describe cooperative packet routing for wireless sensor networks in language specific to structural features and/or methodological operations or actions, the implementations defined in the appended claims are not necessarily limited to the specific features or actions described. Rather, the specific features and operations for cooperative packet routing for wireless sensor networks are disclosed as exemplary forms of implementing the claimed subject matter.

The invention claimed is:

1. In a wireless sensor network comprising multiple sensor nodes and a base station, a method implemented by a sensor node of the sensor nodes for cooperative packet routing, the method comprising:

receiving a packet transmitted by a source node of the sensor nodes, the packet being targeted for receipt by the base station;

responsive to receiving the packet, determining an amount of energy remaining in the sensor node; and if the amount of energy meets a configurable energy threshold designed to increase lifetime of the sensor node, implementing cooperative packet routing operations for conditional re-transmission of the packet to the base station, the conditional re-transmission being based on the sensor node delaying packet re-transmission by a variable address-based timer;

the conditional re-transmission being based on delaying packet re-transmission by a variable address-based timer;

wherein the variable address-based timer is determined based on a node address difference between the address of the node that generates the packet and the address of the sensor node that receives the packet and a scaling factor.

2. The method of claim 1, wherein the configurable energy threshold is based on estimated respective amounts of energy used by the sensor node to sense data, perform computations, and engage in wireless communications.

3. The method of claim 1, wherein the packet re-transmission criteria is based on one or more of the base station location, packet origin, and packet arrival time.

4. The method of claim 1, wherein determining the amount of energy remaining in the sensor node comprises:

calculating an amount of energy dissipated responsive to receiving the packet from the source node; and responsive to the calculating, updating a persisted energy value for the sensor node to account for the amount of energy dissipated responsive to receiving the packet.

5. The method of claim 1, wherein the cooperative packet routing operations comprise:

decrementing a timer value of the variable address-based timer at periodic intervals; and if an acknowledgement that the base station has received the packet has not been received before expiration of the timer value:

inserting an address assigned to the sensor node to the packet, the address for use by one or more other sensor nodes of the sensor nodes responsive to receipt of the packet to calculate respective timer values controlling respective re-transmission of the packet by the one or more other sensor nodes; and transmitting the packet for receipt by the base station.

6. The method of claim 1, wherein the cooperative packet routing operations further comprise:

if the packet has already been received a duplicate factor number of times, reducing a number of sensor nodes in the wireless sensor network participating in cooperative data transfer of the packet to the base station, the reducing comprising:

not re-transmitting the packet;

canceling any prior scheduled re-transmission event associated with a duplicate of the packet received earlier by the sensor node; and freeing any memory resources associated with the packet and any duplicates of the packet; and wherein the reducing is based on a sensor node operational redundancy in the wireless sensor network to conserve sensor node operational life and transmit the packet to the base station, the sensor node operational redundancy being a likelihood that a different node of the sensor nodes will transmit the packet to the base station.

7. The method of claim 6, wherein the cooperative packet routing operations further comprise:

estimating an amount of energy dissipated by the sensor node responsive to performing operations; and updating a persisted energy value for the sensor node to account for the amount of energy.

8. The method of claim 1, further comprising if the amount of energy does not meet the configurable energy threshold:

discarding the packet;

freeing any memory resources associated with maintaining the packet;

maintaining operational capabilities for the sensor node to sense and transmit data to the base station; and wherein the packet is not re-transmitted by the sensor node.

9. A sensor node for use in a wireless sensor network, the wireless sensor network including multiple sensor nodes and a base station, the sensor node comprising:

a processor; and a memory coupled to the processor, the memory comprising computer program instructions executable by the processor, the computer program instructions when executed by the processor for performing operations comprising:

receiving a packet transmitted by a source node of the sensor nodes the packet being targeted for receipt by the base station;

responsive to receiving the packet, determining an amount of energy remaining in the sensor node; and if the amount of energy meets a configurable energy threshold designed to increase lifetime of the sensor node, implementing, by the sensor node, cooperative packet routing operations for conditional re-transmission of the packet to the base station, the conditional re-transmission being based on delaying packet re-transmission by a variable address-based timer;

wherein the variable address-based timer is determined based on a node address difference between the address of the node that generates the packet and the address of the sensor node that receives the packet and a scaling factor.

10. The sensor node of claim 9, wherein the configurable energy threshold is based on estimated respective amounts of energy used by the sensor node to sense data, perform computations, and engage in wireless communications.

11. The sensor node of claim 9, wherein the packet re-transmission criteria is based on one or more of the base station location, packet origin, and packet arrival time.

12. The sensor node of claim 9, wherein the computer program instructions for determining the amount of energy remaining in the sensor node further comprise instructions for:

calculating an amount of energy dissipated responsive to receiving the packet from the source node; and responsive to the calculating, updating a persisted energy value for the sensor node to account for the amount of energy dissipated responsive to receiving the packet.

13. The sensor node of claim 9, wherein the computer program instructions for the cooperative packet routing operations further comprise instructions for:

decrementing a timer value of the variable address-based timer at periodic intervals; and if an acknowledgement that the base station has received the packet has not been received before expiration of the timer value:

inserting an address assigned to the sensor node to the packet, the address for use by one or more other sensor nodes of the sensor nodes responsive to receipt of the packet to calculate respective timer values controlling respective re-transmission of the packet by the one or more other sensor nodes; and transmitting the packet for receipt by the base station.

14. The sensor node of claim 9, wherein the computer program instructions for the cooperative packet routing operations further comprise instructions for:

if the packet has already been received a duplicate factor number of times:

not re-transmitting the packet;

canceling any prior scheduled re-transmission event associated with a duplicate of the packet received earlier by the sensor node; and freeing any memory resources associated with the packet and any duplicates of the packet.

15. The sensor node of claim 14, wherein the computer program instructions for the cooperative packet routing operations further comprise instructions for:

estimating an amount of energy dissipated by the sensor node responsive to performing operations of claim; and updating a persisted energy value for the sensor node to account for the amount of energy.

16. The sensor node of claim 9, wherein the computer program instructions further comprise, if the amount of energy does not meet the configurable energy threshold, instructions for:

discarding the packet;

freeing any memory resources associated with maintaining the packet;

maintaining operational capabilities for the sensor node to sense and transmit data to the base station; and wherein the packet is not re-transmitted by the sensor node.

17. A tangible non-transitory computer-readable data storage medium for using in a sensor node, the sensor node for deployment in a wireless sensor network of multiple sensor nodes and a base station, the tangible computer-readable data storage medium comprising computer program instructions executable by a processor, the computer program instructions when executed by the processor for performing operations comprising:

receiving a packet transmitted by a source node of the sensor nodes, the packet being targeted for receipt by the base station;

responsive to receiving the packet, determining an amount of energy remaining in the sensor node;

if the amount of energy meets a configurable energy threshold designed to increase lifetime of the sensor node, implementing cooperative packet routing operations for conditional re-transmission of the packet to the base station, the conditional re-transmission being based on randomizing packet re-transmission criteria; and wherein operations for implementing cooperative packet routing operations comprise: calculating a timer value using an address of the sensor node and a scalar factor; decrementing the timer value at periodic intervals; and if an acknowledgement that the base station has received the packet has not been received before expiration of the timer value:

inserting an address assigned to the sensor node to the packet, the address for use by one or more other sensor nodes of the sensor nodes responsive to receipt of the packet to calculate respective timer values controlling respective re-transmission of the packet by the one or more other sensor nodes; and transmitting the packet for receipt by the base station.

18. The tangible non-transitory computer-readable data storage medium of claim 17 wherein the computer program instructions for the cooperative packet routing operations further comprise instructions for:

if the packet has already been received a duplicate factor number of times, reducing a number of sensor nodes in the wireless sensor network participating in cooperative data transfer of the packet to the base station, the reducing comprising:

not re-transmitting the packet;

canceling any prior scheduled re-transmission event associated with a duplicate of the packet received earlier by the sensor node; and freeing any memory resources associated with the packet and any duplicates of the packet; and wherein the reducing is based on a likelihood of sensor node operational redundancy in the wireless sensor network to conserve sensor node operational life and transmit the packet to the base station, the sensor node operational redundancy being a likelihood that a different node of the sensor nodes will transmit the packet to the base station.

* * * * *